United States Patent
Grip et al.

(10) Patent No.: US 10,220,972 B2
(45) Date of Patent: Mar. 5, 2019

(54) VACUUM VOLUME REDUCTION SYSTEM AND METHOD FOR A VACUUM TUBE VEHICLE STATION

(71) Applicant: The Boeing Company, Chicago, IL (US)

(72) Inventors: Robert Erik Grip, Rancho Palos Verdes, CA (US); Mark A. DeHaan, Rancho Palos Verdes, CA (US); John C. Vassberg, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/476,963

(22) Filed: Mar. 31, 2017

(65) Prior Publication Data

US 2018/0282006 A1 Oct. 4, 2018

(51) Int. Cl.
| | | |
|---|---|---|
| *B65G 51/04* | (2006.01) | |
| *B65B 31/04* | (2006.01) | |
| *G21F 5/00* | (2006.01) | |
| *G10H 1/46* | (2006.01) | |
| *B01D 21/24* | (2006.01) | |
| *G21F 5/14* | (2006.01) | |
| *B65D 81/20* | (2006.01) | |

(Continued)

(52) U.S. Cl.
CPC .......... *B65B 31/04* (2013.01); *B01D 21/2494* (2013.01); *B65D 19/36* (2013.01); *B65D 81/2007* (2013.01); *G10H 1/46* (2013.01); *G21F 5/00* (2013.01); *G21F 5/14* (2013.01); *B29L 2031/712* (2013.01)

(58) Field of Classification Search
CPC ........ B65G 51/04; B65G 51/08; B65G 51/18; B65G 51/26; B65G 51/36
USPC ................... 406/198; 104/28, 155, 161, 281
See application file for complete search history.

(56) References Cited

U.S. PATENT DOCUMENTS

| | | | | |
|---|---|---|---|---|
| 3,787,006 A | * | 1/1974 | Coanda ................. | B61B 13/122 239/318 |
| 3,797,405 A | * | 3/1974 | Carstens ................ | B65G 51/04 406/105 |

(Continued)

OTHER PUBLICATIONS

Wikipedia Article on Hyperloop, 13 web pages, from website web address at https://en.wikipedia.org/wiki/Hyperloop, as of Mar. 31, 2017.

(Continued)

*Primary Examiner* — Joseph A Dillon, Jr.

(57) ABSTRACT

A vacuum volume reduction system and method for reducing a volume to be evacuated at a vacuum tube vehicle station are provided. The system has a station vacuum tube in an interior of a station wall of the vacuum tube vehicle station. The station vacuum tube has a tube volume. The system has a volume reduction assembly coupled to the station vacuum tube, and a control system for radially moving the assembly to and from a vehicle outer surface of a vacuum transport tube vehicle, to engage around the vehicle outer surface, for loading and unloading of passengers and/or cargo. The system further has door seal(s), an air supply assembly, and a vent-to-vacuum assembly. The system displaces the tube volume between the station wall and the vehicle outer surface, and in turn, reduces a volume to be evacuated at the vacuum tube vehicle station.

15 Claims, 30 Drawing Sheets

(51) Int. Cl.
   *B65D 19/36* (2006.01)
   *B29L 31/00* (2006.01)

(56) References Cited

U.S. PATENT DOCUMENTS

| | | | | |
|---|---|---|---|---|
| 3,870,250 | A * | 3/1975 | Teodorescu | B65G 51/10 406/10 |
| 3,907,231 | A * | 9/1975 | Kreiner | B65G 51/04 406/111 |
| 3,930,450 | A * | 1/1976 | Symons | A63G 3/00 104/139 |
| 3,980,024 | A * | 9/1976 | Futer | B61B 13/10 104/138.1 |
| 3,999,487 | A * | 12/1976 | Valverde | B61B 13/10 104/138.1 |
| 4,023,500 | A * | 5/1977 | Diggs | B61B 13/10 104/138.1 |
| 4,108,077 | A * | 8/1978 | Laing | B61B 13/10 104/154 |
| 4,184,792 | A * | 1/1980 | Turnbo | B61B 13/10 406/110 |
| 4,529,335 | A * | 7/1985 | Hilbert | B65G 51/36 406/1 |
| 5,117,962 | A * | 6/1992 | Tommarello | H01J 9/2272 198/378 |
| 5,146,853 | A * | 9/1992 | Suppes | B60L 13/10 104/138.2 |
| 5,669,310 | A * | 9/1997 | Powell | B60L 13/003 104/280 |
| 5,720,174 | A * | 2/1998 | Gorinas | F04B 37/06 417/901 |
| 5,865,123 | A * | 2/1999 | Powell | B60L 13/003 104/281 |
| 6,178,892 | B1 * | 1/2001 | Harding | B60V 3/04 104/119 |
| 6,374,746 | B1 * | 4/2002 | Fiske | B61B 13/08 104/138.1 |
| 2004/0112247 | A1 * | 6/2004 | Powell | B60L 13/04 105/35 |
| 2011/0079166 | A1 * | 4/2011 | Popa-Simil | B60K 16/00 105/1.4 |
| 2013/0036935 | A1 * | 2/2013 | Bauer | E01B 25/32 104/286 |
| 2016/0121908 | A1 * | 5/2016 | Ahmad | B61B 13/10 406/50 |
| 2017/0334312 | A1 * | 11/2017 | Zhou | B23K 31/027 |

OTHER PUBLICATIONS

Wikipedia Article on Maglev, 27 web pages, from website web address at https://en.wikipedia.org/wiki/Maglev, as of Mar. 31, 2017.

* cited by examiner

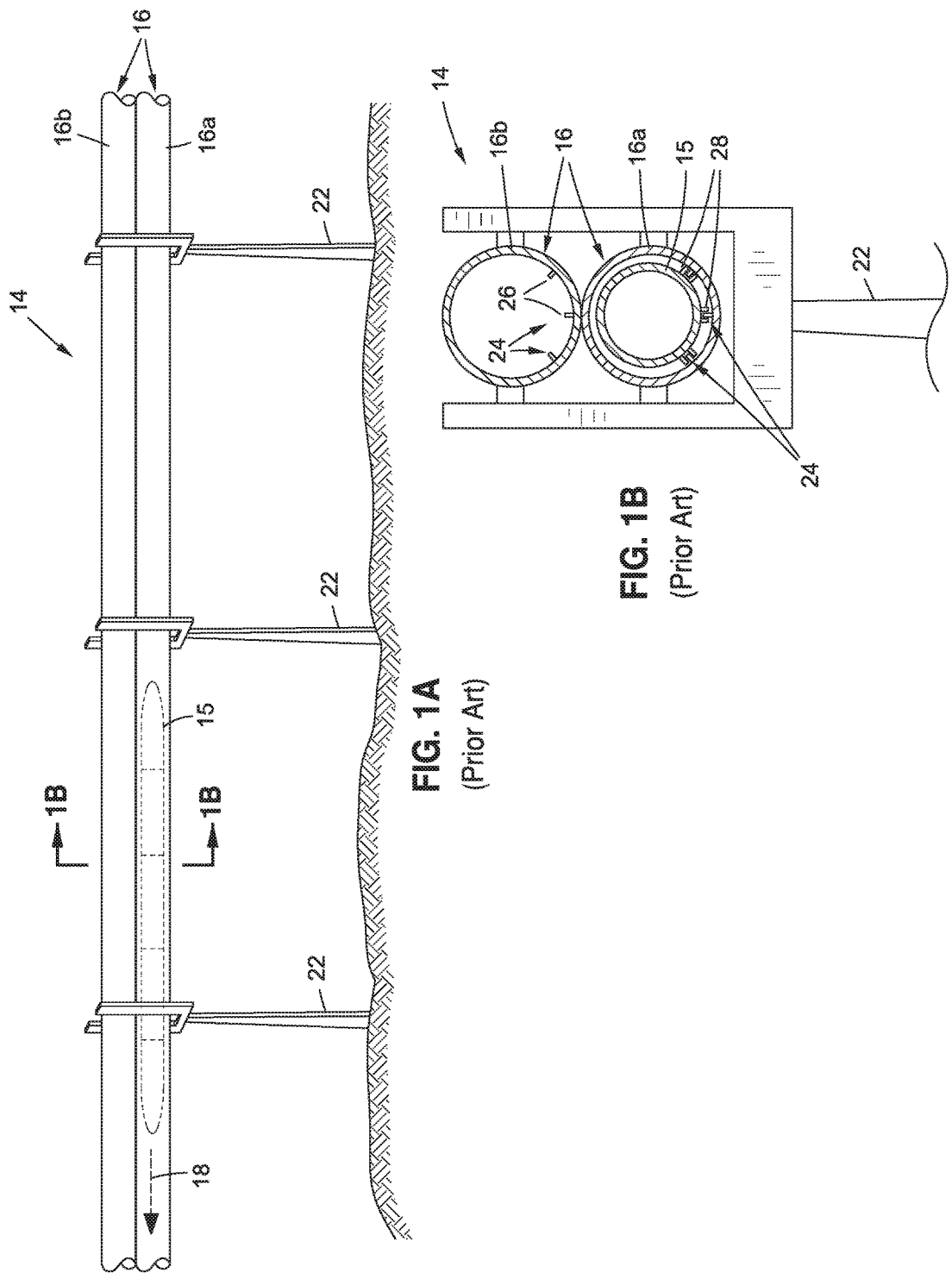

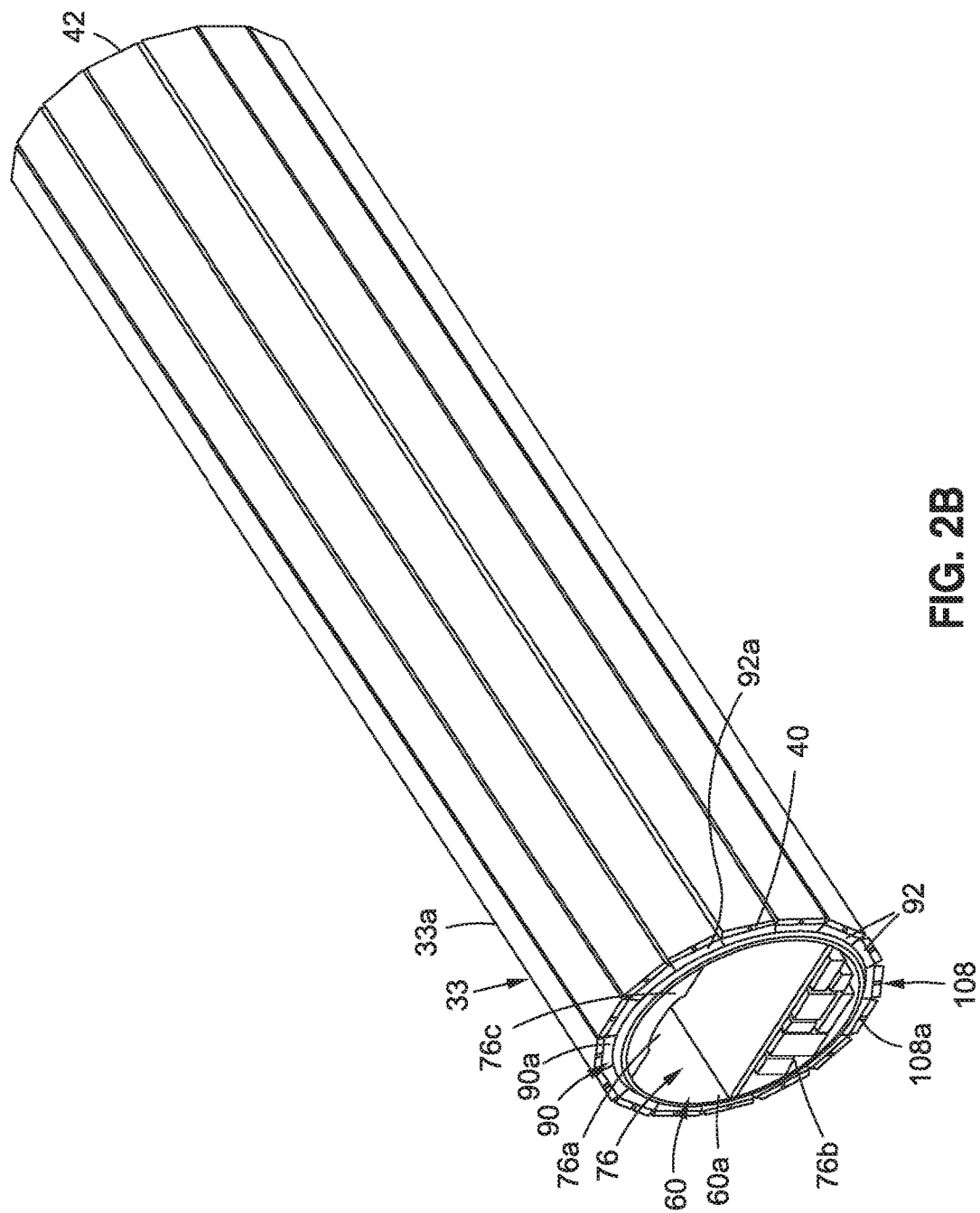

VACUUM VOLUME REDUCTION SYSTEM 10

VACUUM TUBE VEHICLE STATION 12

| STATION WALL 30 | STATION VACUUM TUBE 33 | MODULAR STATION VACUUM TUBE 33a |
| | | BUILT-IN STATION VACUUM TUBE 33b |

| PLURALITY OF CAVITIES 40 | SHAPE 104 |
| STATION DOOR(S) 68 | STATION PASSAGEWAY(S) 70 | VACUUM TUBE(S) 16 |

VACUUM TRANSPORT TUBE VEHICLE 60

| INTERIOR 76 | CABIN 76a | CARGO COMPARTMENT 76b | CEILING 76c | OUTER VEHICLE WALL 78 |
| VEHICLE OUTER SURFACE 80 | CONSTANT RADIUS PORTION 74 | CONTOUR 75 |
| VEHICLE POWER AND CONTROL SYSTEM 88 | MAG-LEV PROPULSION SYSTEM 24 |
| VEHICLE DOOR(S) 66 | DOOR SEAL(S) 122 | PERIMETER 125 |
| DOOR CAVITY 132 | DOOR SEAL CONTROL SYSTEM 124 | PRESSURE SEAL(S) 82 |

VOLUME REDUCTION ASSEMBLY 90

| MODULAR TUBE VOLUME REDUCTION ASSEMBLY 90a | SEAL 91 | SEALED ENGAGEMENT 91a |
| PLURALITY OF BLOCKS 92 | GAP 100 | GAP VOLUME 100a | GAP WIDTH 100b | LONGITUDINAL GAP(S) 160 |
| EXTENDABLE BLOCKS 92b | EXTENDABLE PORTION 99 |
| COMPLIANT MATERIAL 102 | ONE-PIECE MONOLITHIC STRUCTURE 106 | SEAM(S) 161 |

| CONTROL SYSTEM 108 | PNEUMATIC ACTUATOR CONTROL SYS. 108b |
| MECHANICAL ACTUATOR CONTROL SYS. 108a | WORM GEARS 110 | SCISSOR JACKS 112 |
| HYDRAULIC ACTUATOR CONTROL SYS. 108c | ELECTRICAL ACTUATOR CONTROL SYS. 108d |

| INFLATABLE BLADDER 114 | BLADDER INNER SIDE 116a | BLADDER OUTER SIDE 116b |
| BLADDER INTERIOR 118a | BLADDER EXTERIOR 118b | BLADDER BODY 120 |
| AIR SUPPLY ASSEMBLY 130 | AIR PUMP 134 | AIR DUCT 136 | AIR SUPPLY CONTROL VALVES 138 |
| VENT-TO-VACUUM ASSEMBLY 140 | VACUUM PUMP 142 | VACUUM DUCT 144 |
| VACUUM VALVES 146 | VACUUM RESERVOIR 148 | VENTS 149 |
| DOOR CAVITY VOLUME REDUCTION SURFACE 150 | INFLATABLE DOOR BLADDER 152 | FORCE 157 |
| PUMPING RATE 158 | EVACUATION 166 | LEAKAGE 164 |
| VOLUME 50 | TUBE VOLUME 50a | DOOR CAVITY VOLUME 50b | STATION VOLUME 50c |
| REDUCED VOLUME 50d | DISPLACED VOLUME 50e |
| VACUUM 51 | DESIRED VACUUM QUALITY 51a |
| AIR 52 | AMBIENT AIR 52a | COMPRESSED AIR 52b |

FIG. 3

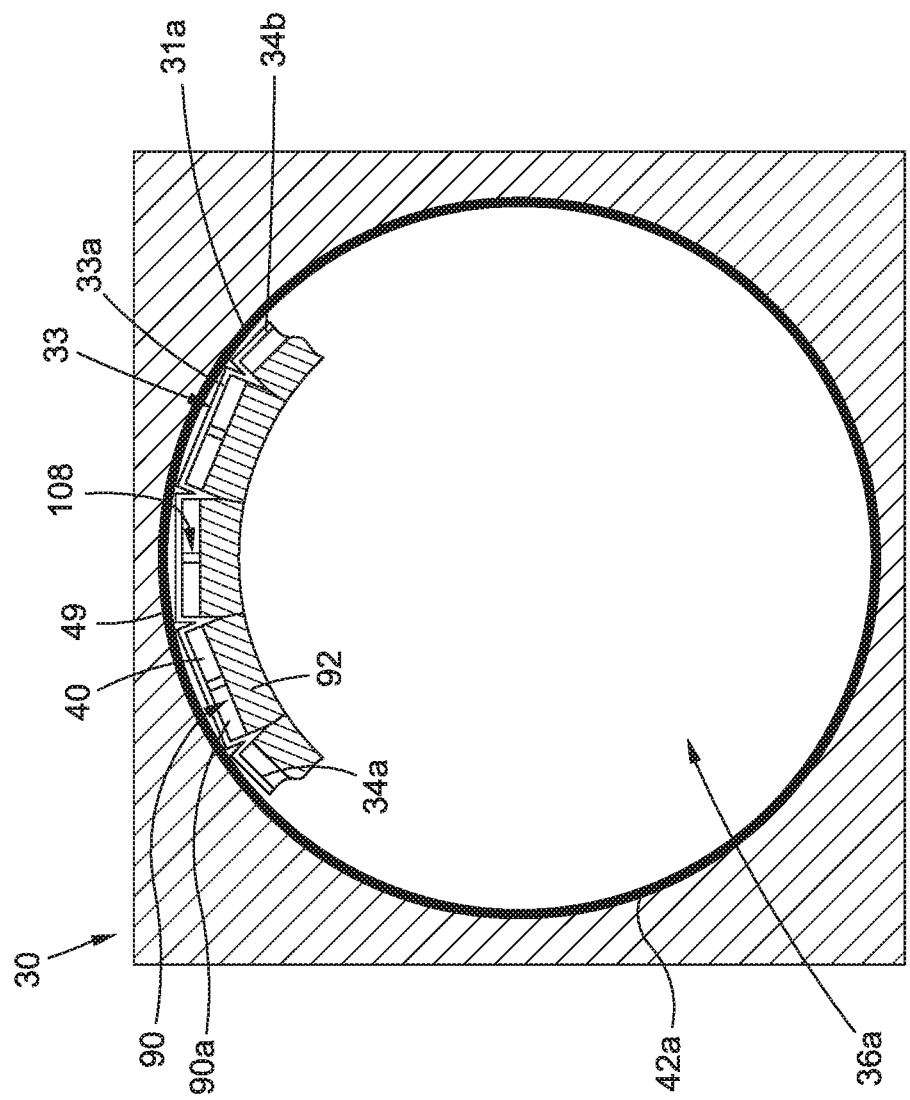

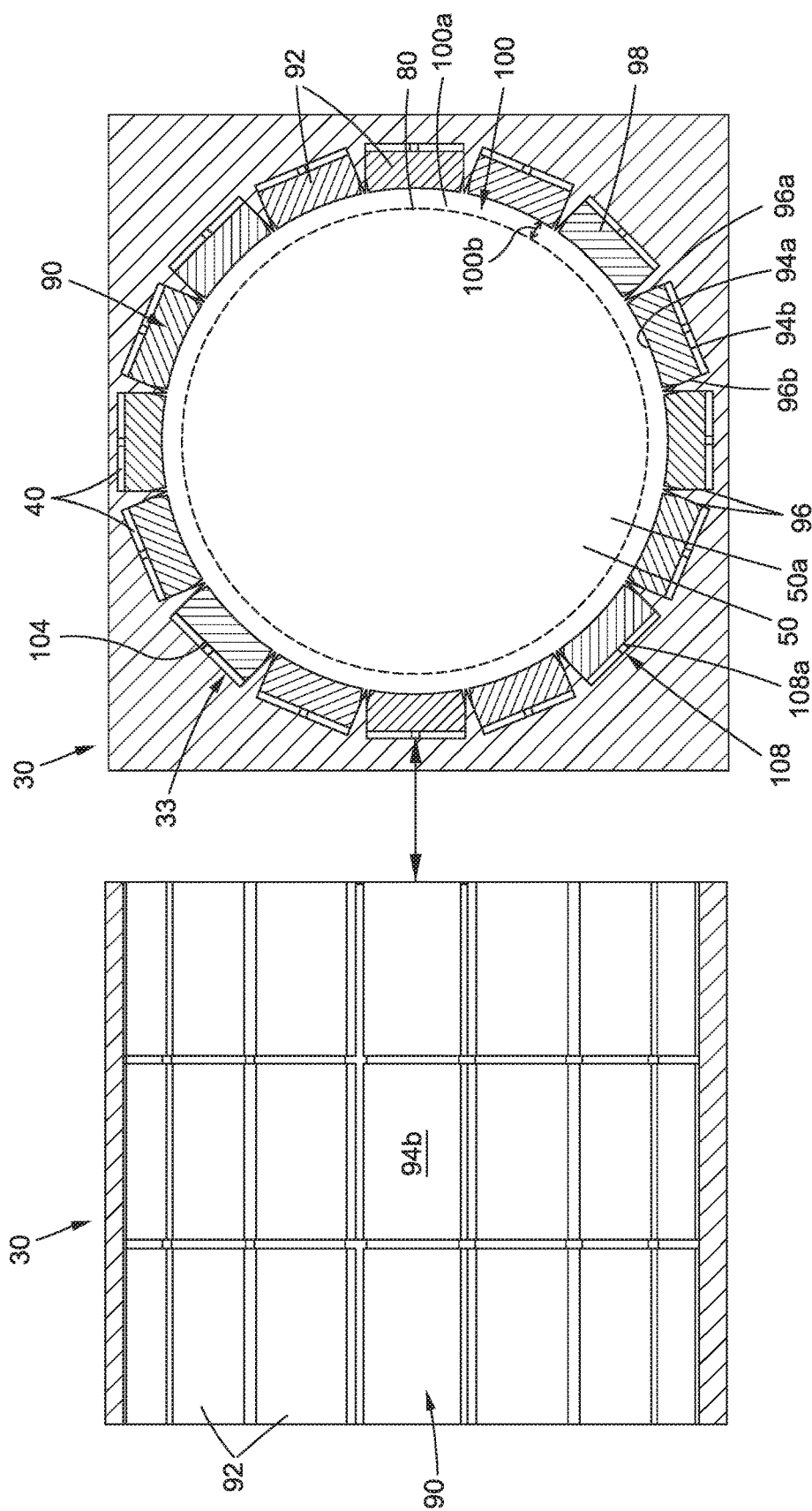

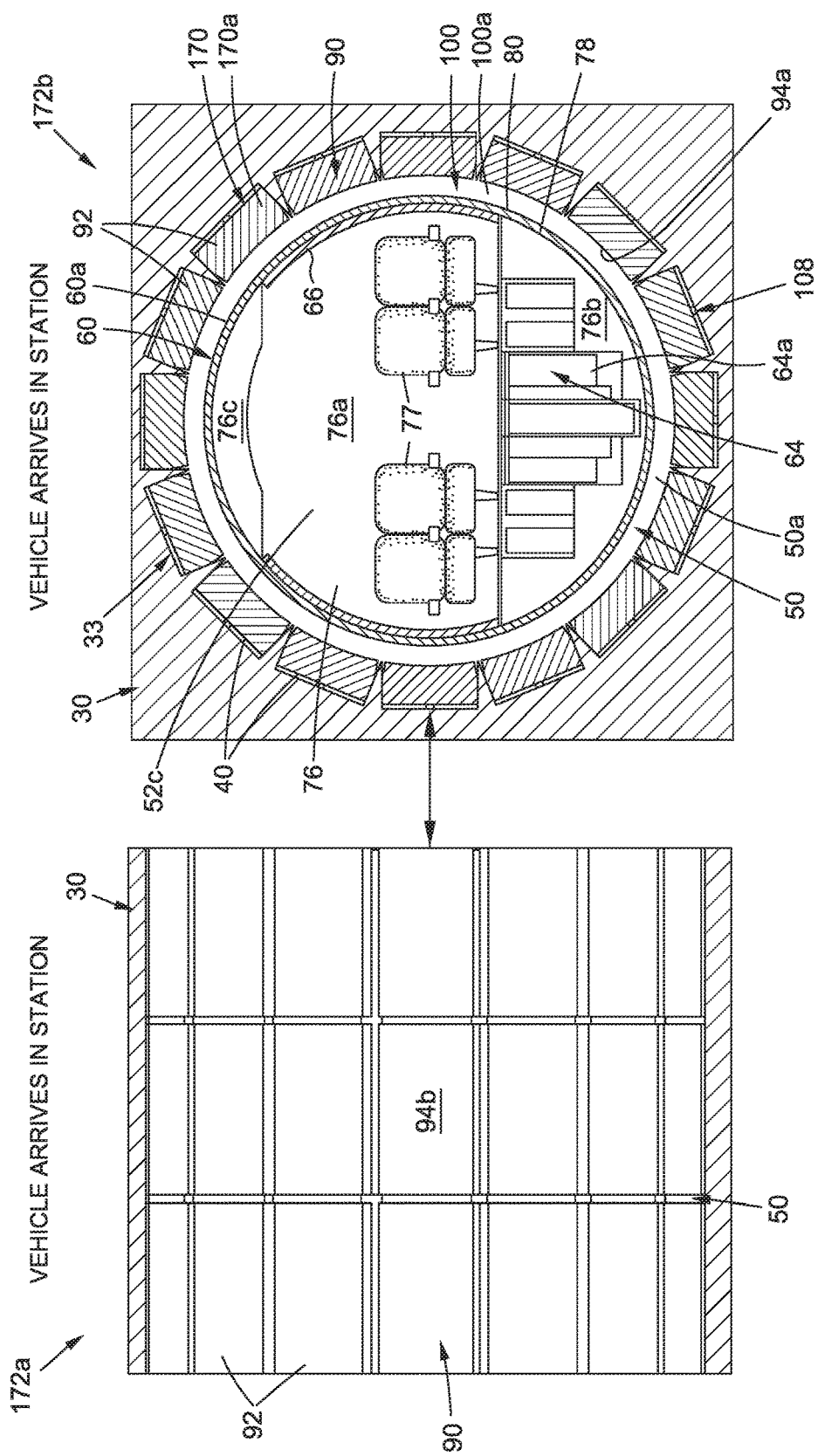

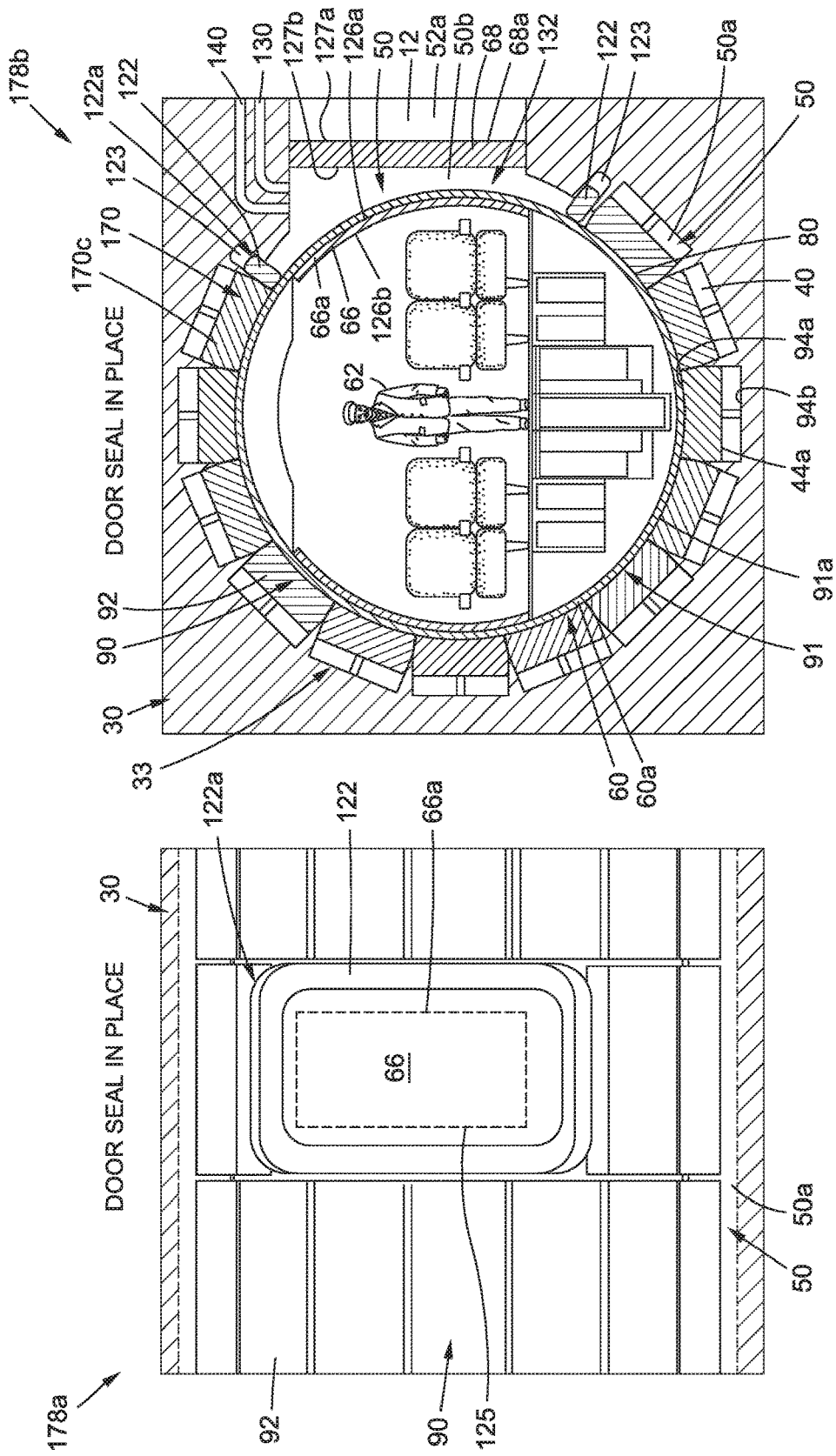

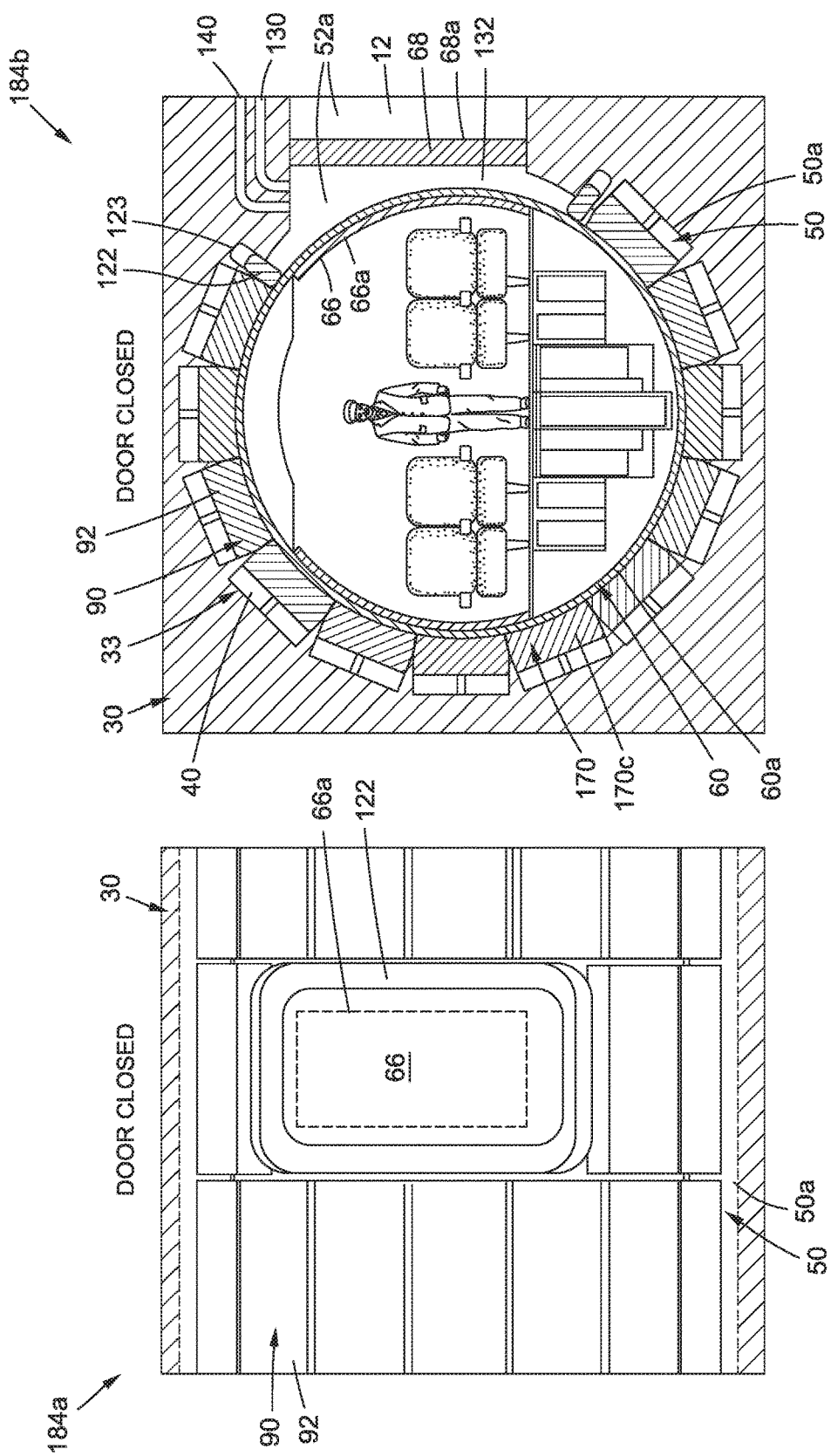

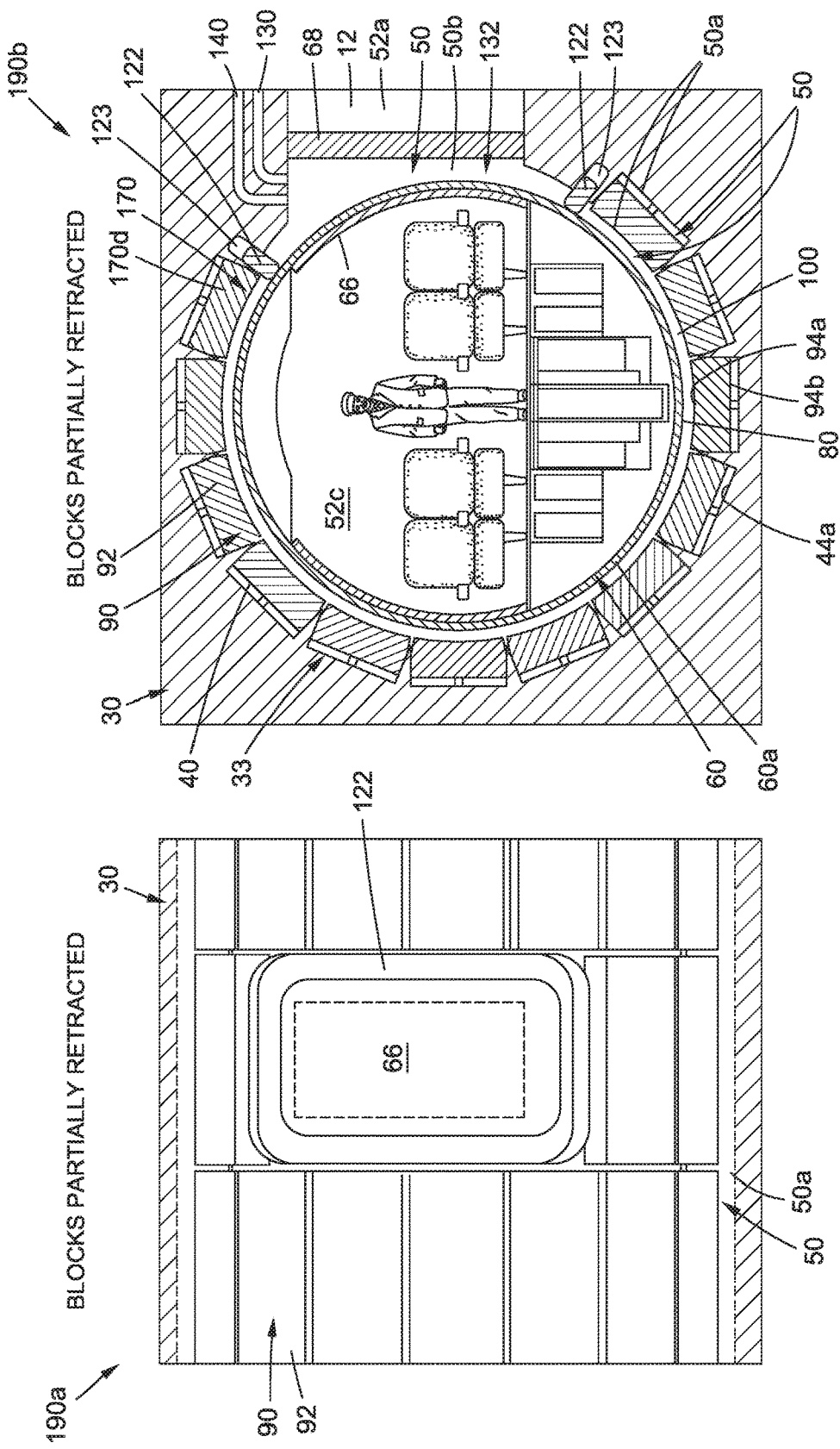

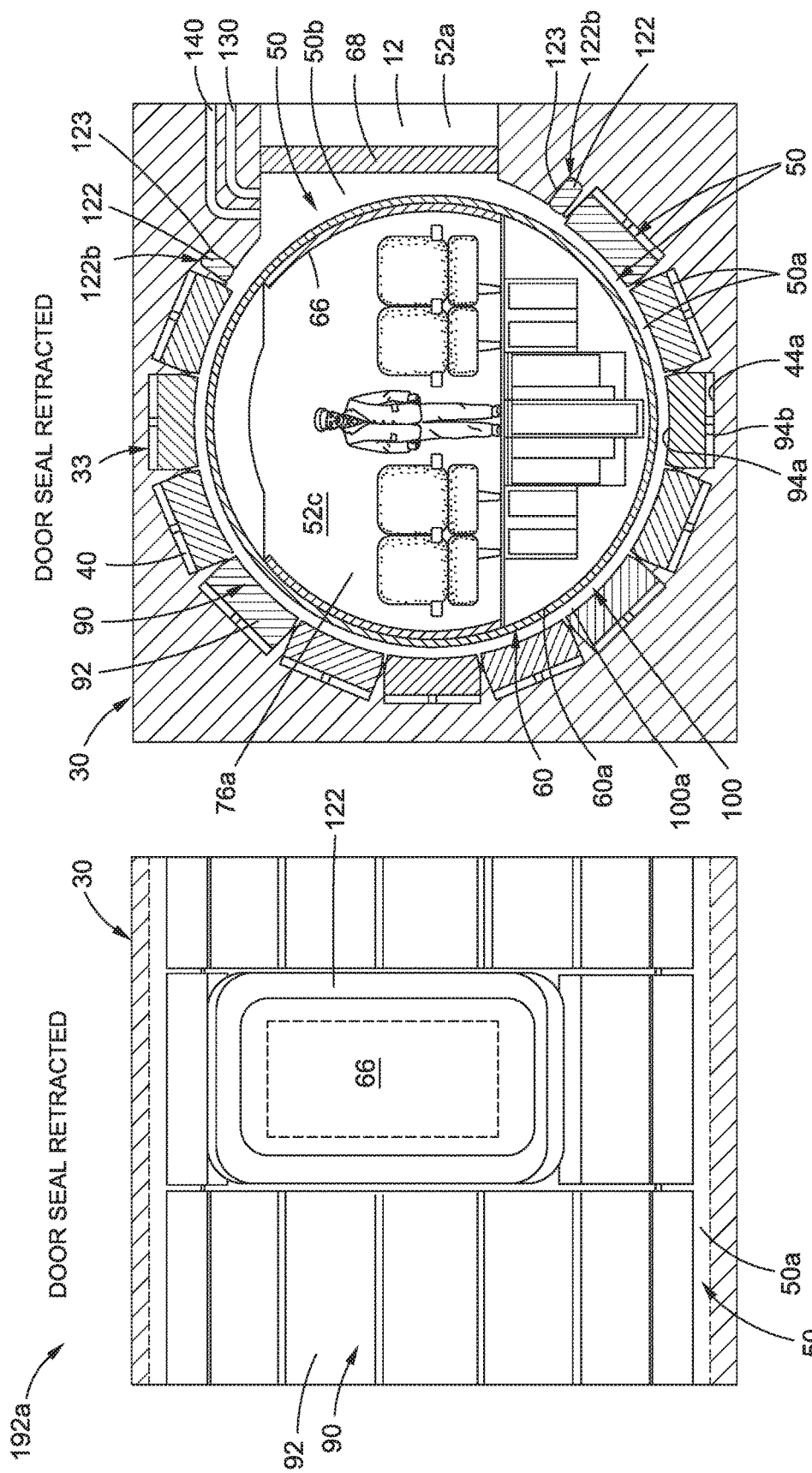

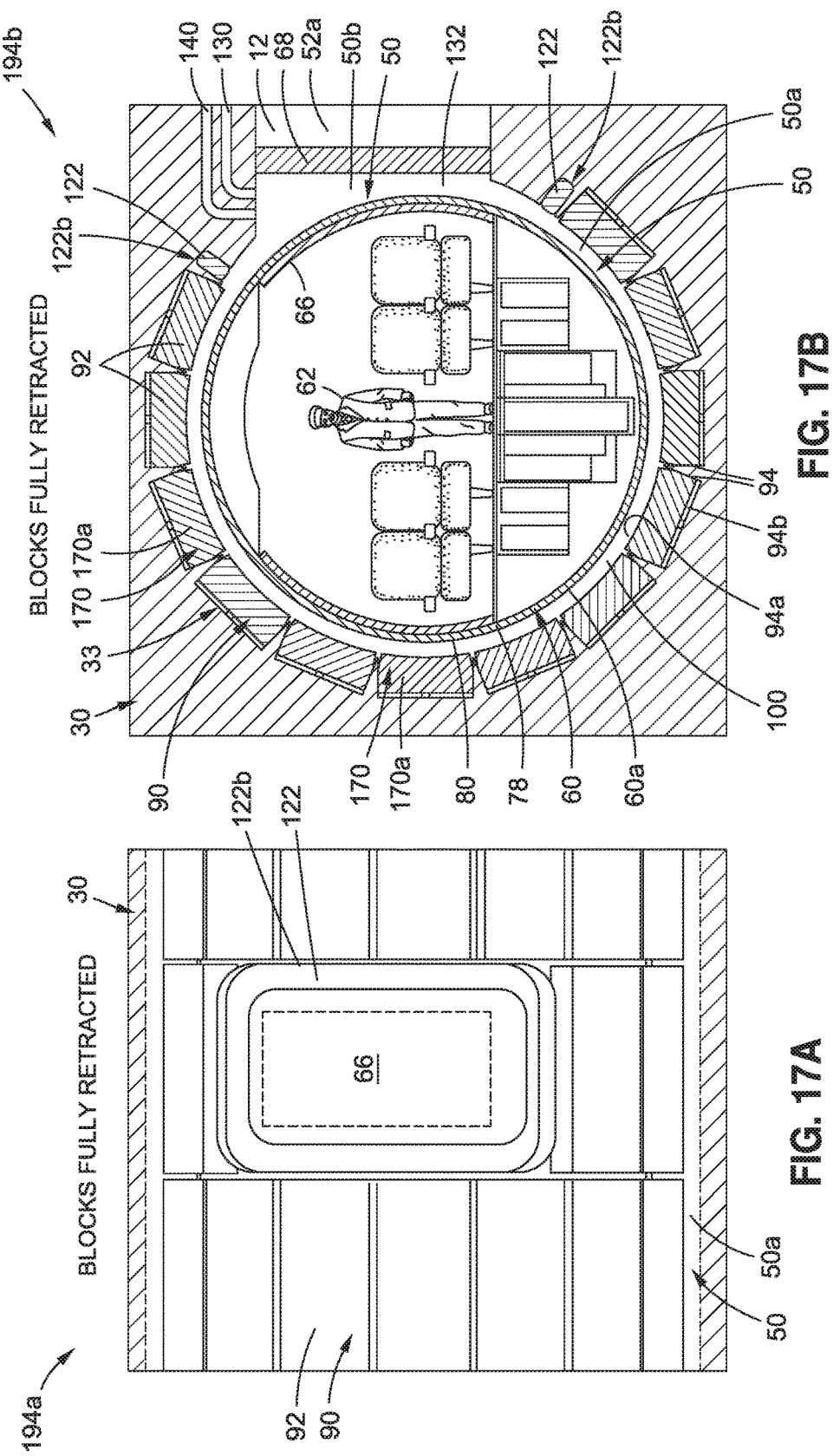

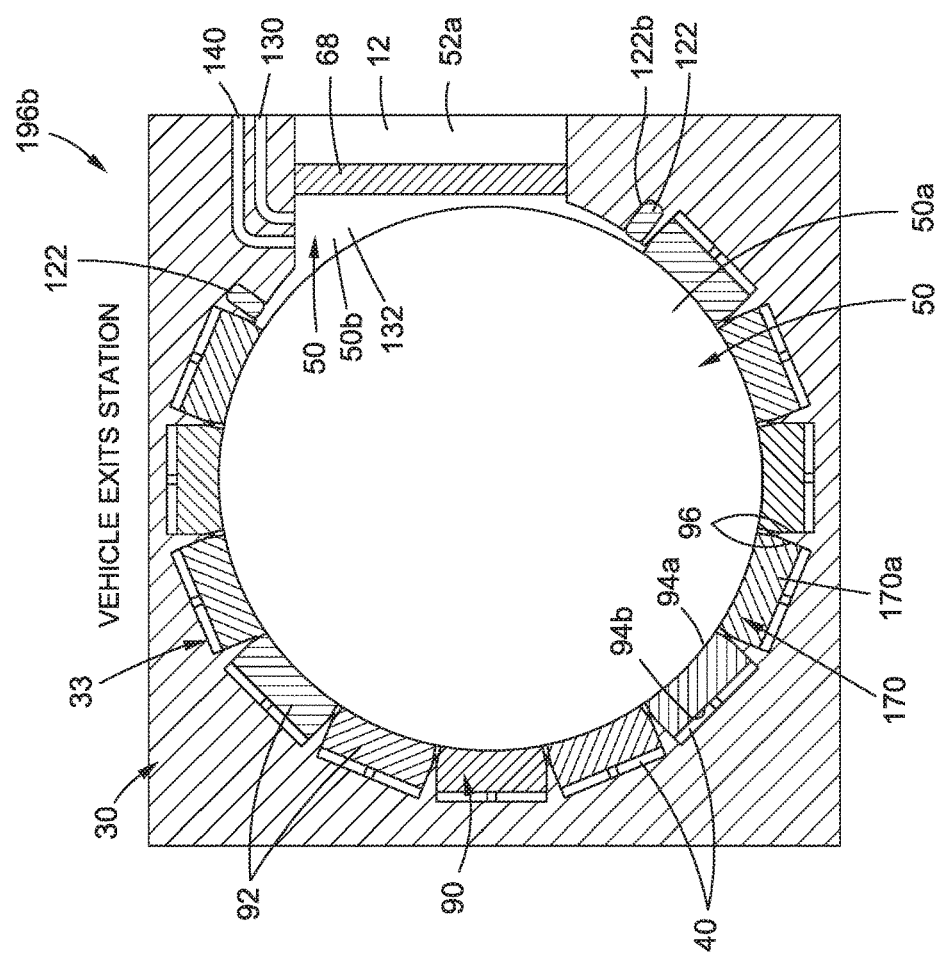
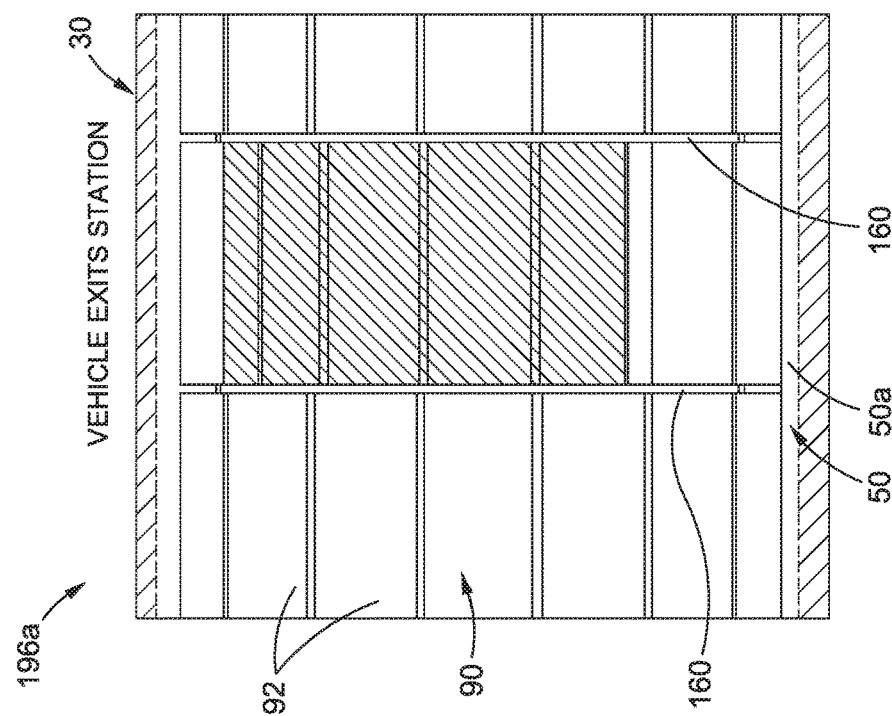
FIG. 18A
FIG. 18B

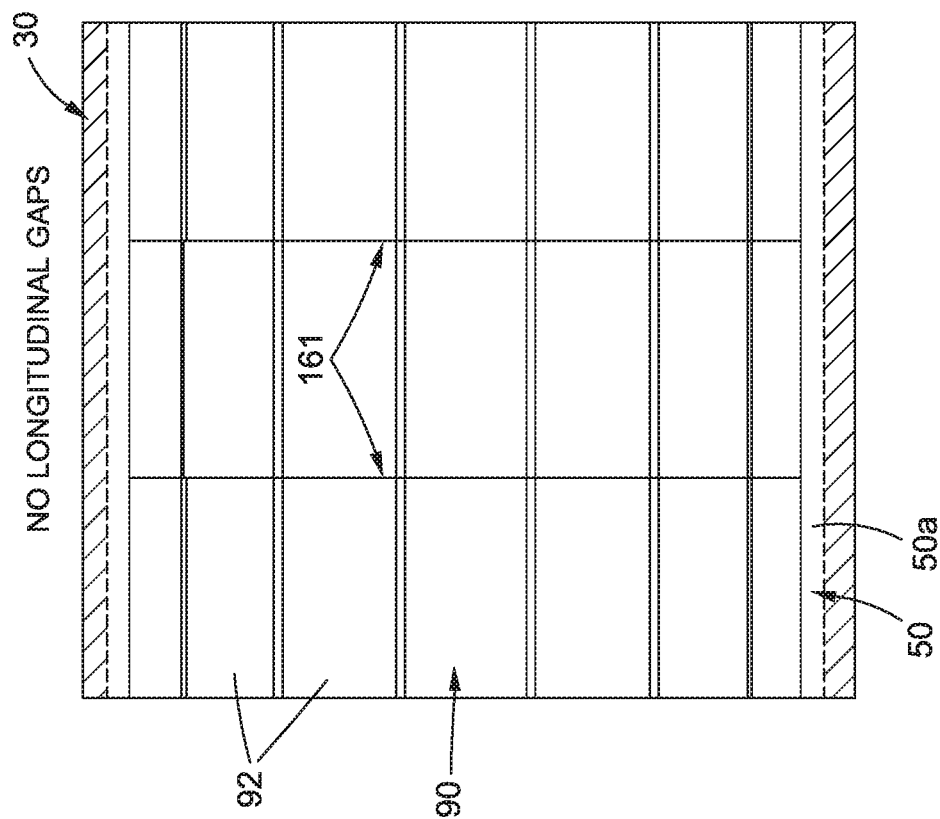

VACUUM VOLUME REDUCTION SYSTEM AND METHOD FOR A VACUUM TUBE VEHICLE STATION

BACKGROUND

1) Field of the Disclosure

The disclosure relates generally to systems and methods for evacuating tubes to create a vacuum, and more particularly, to systems and methods for evacuating air from tubes used for high-speed vacuum tube transportation systems.

2) Description of Related Art

The concept of high-speed travel through tubes has been known for years. Recently, there has been a renewed and increased interest in and investigation of high-speed vacuum or pneumatic tube transportation systems, in which a vehicle travels through an evacuated or partially evacuated tube near the surface of the earth at high speeds, e.g., 200-2000 miles per hour (mph) average speed. The high speeds may be enabled by a magnetic levitation ("mag-lev") propulsion system that eliminates or greatly reduces rolling friction, and by evacuating the tube of air so that aerodynamic drag is eliminated or greatly reduced.

After an initial evacuation of air from the tube, it is important to minimize leakage into the tube from the surrounding ambient atmosphere. If the leakage of air into the tube is minimized, less pumping capacity may be required to maintain the desired quality of vacuum in the tube. Potential sources of air leakage may occur at vacuum tube vehicle stations, such as cargo loading facilities and/or passenger stations. For passenger stations, it is necessary to provide a pathway from the vacuum tube vehicle to the station, through a space where there was previously vacuum.

Known systems for minimizing or eliminating air leakage into the tube at vacuum tube vehicle stations are known. For example, one such known system includes providing pressure seals around vehicle doors, such as passenger entrance/exit doors. After the vacuum tube vehicle pulls into the vacuum tube vehicle station and into the correct position, the pressure seals may extend from the station walls and provide a seal between the interior volume and the volume outside. When the vehicle doors are opened the interior space and the station space are connected, and the passengers may enter or exit the vehicle through the vehicle doors. However, if such pressure seals around the vehicle doors become damaged, worn, or displaced, they may leak, and may lead to air at ambient pressure flowing into the vacuum cavity, which may corrupt the quality of the vacuum along the vacuum tube route.

In addition, another known system includes surrounding the entire vacuum tube vehicle with an airlock, in which pressure barriers are deployed in front of and behind the vehicle to prevent air from flowing into the portions of the tube that are part of the vacuum tube route. Such an airlock arrangement allows for the space inside the station tube to be filled with air, so that pressure seals around vehicle doors may not be necessary. However, the volume between the vacuum tube vehicle and the vacuum tube vehicle station walls may be very large, and may require a large pumping capacity and may require costly vacuum pump equipment to evacuate the station tube in a short amount of time. This may increase the cost of such known system. In addition, the vacuum pump equipment may wear out over time and may need to be maintained, repaired, and/or eventually replaced. This may increase the costs of maintenance, repair, and replacement for such known system. Further, such known system may require the use of additional pressure seals, such as modular pressure seals, and door seals, to be used with the installed vacuum pump equipment. Such additional pressure seals and door seals may be costly to use and install, and may, in turn, increase the overall cost of such known system. Moreover, such an airlock arrangement may still have the potential for air leakage into the vacuum cavity. Such leakage over time may degrade the quality of the vacuum in the vacuum tube along the vacuum tube route.

Thus, it is desirable to provide a system and method for minimizing air leakage into the tube from the surrounding ambient environment and for minimizing the volume that needs to be evacuated in the tube for each vacuum tube vehicle arrival and departure to and from the vacuum tube vehicle station.

Accordingly, there is a need in the art for a vacuum volume reduction system and method that effectively, efficiently, and inexpensively reduces the volume that needs to be evacuated from a vacuum transport tube at a vacuum tube vehicle station, that do not require the use of expensive vacuum pump equipment and pressure seals, and that provide other advantages over known systems and methods.

SUMMARY

Example implementations of this disclosure provide one or more embodiments of a vacuum volume reduction system and a method for reducing a volume to be evacuated at a vacuum tube vehicle station. As discussed in the below detailed description, embodiments of the vacuum volume reduction system and the method may provide significant advantages over existing systems and methods.

In one exemplary embodiment, there is provided a vacuum volume reduction system for reducing a volume to be evacuated at a vacuum tube vehicle station. The vacuum volume reduction system comprises a station vacuum tube disposed in an interior of a station wall of the vacuum tube vehicle station. The station vacuum tube has a tube volume.

The vacuum volume reduction system further comprises a volume reduction assembly coupled to the station vacuum tube. The volume reduction assembly has a control system for radially moving the volume reduction assembly to and from a vehicle outer surface of a vacuum transport tube vehicle, to engage around the vehicle outer surface, for loading and unloading of one or more of, passengers and cargo, through one or more vehicle doors of the vacuum transport tube vehicle and through one or more station doors of the vacuum tube vehicle station.

The vacuum volume reduction system further comprises one or more door seals coupled to the station wall, and configured to surround a perimeter of, and to seal, each of the one or more vehicle doors, and to seal off a door cavity having a door cavity volume. The vacuum volume reduction system further comprises an air supply assembly coupled to the station wall, and configured to supply air to the door cavity.

The vacuum volume reduction system further comprises a vent-to-vacuum assembly coupled to the station wall, and configured to evacuate the air from the door cavity. The vacuum volume reduction system displaces the tube volume between the station wall and the vehicle outer surface, and in turn, reduces a volume to be evacuated at the vacuum tube vehicle station.

In another exemplary embodiment, there is provided a modular tube volume reduction assembly for use at a vacuum tube vehicle station. The modular tube volume reduction assembly comprises a modular station vacuum tube having a tube volume and a plurality of cavities longitudinally formed around a circumference of the modular station vacuum tube.

The modular tube volume reduction assembly further comprises a volume reduction assembly integrated with the modular station vacuum tube. The volume reduction assembly comprises a plurality of blocks longitudinally coupled to a cavity interior of each of the plurality of cavities.

The volume reduction assembly further comprises a control system coupled between the modular station vacuum tube and the plurality of blocks. When the modular tube volume reduction assembly is used at the vacuum tube vehicle station, the control system is configured to radially move the plurality of blocks to and from a vehicle outer surface of a vacuum transport tube vehicle, to engage around the vehicle outer surface, for loading and unloading of one or more of, passengers and cargo, through one or more vehicle doors of the vacuum transport tube vehicle and through one or more station doors of the vacuum tube vehicle station. The modular tube volume reduction assembly displaces the tube volume between the station wall and the vehicle outer surface, and in turn, reduces the volume to be evacuated at the vacuum tube vehicle station.

In another exemplary embodiment, there is provided a method for reducing a volume to be evacuated at a vacuum tube vehicle station. The method comprises the step of installing a vacuum volume reduction system in the vacuum tube vehicle station. The vacuum volume reduction system comprises a station vacuum tube disposed in an interior of a station wall of the vacuum tube vehicle station. The station vacuum tube has a tube volume.

The vacuum volume reduction system further comprises a volume reduction assembly coupled to the station vacuum tube. The vacuum volume reduction system further comprises one or more door seals coupled to the station wall. The vacuum volume reduction system further comprises an air supply assembly coupled to the station wall and a vent-to-vacuum assembly coupled to the station wall.

The method further comprises the step of deploying the volume reduction assembly, via a control system, to engage around a vehicle outer surface of a vacuum transport tube vehicle, and to displace a gap volume between the volume reduction assembly and the vehicle outer surface, when the vacuum transport tube vehicle arrives and is stopped at the vacuum tube vehicle station. The method further comprises the step of deploying the one or more door seals, via a door seal control system, to seal around a perimeter of each of one or more vehicle doors, and to seal off a door cavity positioned between each of the one or more vehicle door and each of one or more station doors.

The method further comprises the step of supplying air from the air supply assembly to the door cavity. The method further comprises the step of opening the one or more vehicle doors and the one or more station doors, to load and unload one or more of, passengers and cargo, through the one or more vehicle doors and through the one or more station doors.

The method further comprises the step of closing the one or more vehicle doors, and closing the one or more station doors. The method further comprises the step of evacuating the air from the door cavity with the vent-to-vacuum assembly, to obtain a desired vacuum quality, and closing the vent-to-vacuum assembly.

The method further comprises the step of retracting the volume reduction assembly, via the control system, from around the vehicle outer surface of the vacuum transport tube vehicle, back to the plurality of cavities of the station vacuum tube. The method further comprises the step of retracting the one or more door seals, via the door seal control system, from around each of the one or more vehicle doors, back to the station wall. The method further comprises the step of reducing the volume to be evacuated at the vacuum tube vehicle station.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein:

FIG. 1A is an illustration of a side perspective view of a proposed known high-speed vacuum tube transportation system having vacuum transport tubes that may be used with one or more embodiments of the vacuum volume reduction system and method of the disclosure;

FIG. 1B is an illustration of a cross-sectional view of the proposed known high-speed vacuum tube transportation system taken along lines 1B-1B of FIG. 1A;

FIG. 2B is an illustration of a side perspective view of an embodiment of a volume reduction assembly in the form of a modular tube volume reduction assembly of the disclosure;

FIG. 3 is an illustration of a functional block diagram of an exemplary embodiment of a vacuum volume reduction system of the disclosure;

FIG. 4C is an illustration of a cross-sectional front view of a station wall showing another embodiment of a station vacuum tube;

FIG. 5A is an illustration of a cross-sectional side view of an embodiment of a volume reduction assembly of a vacuum volume reduction system of the disclosure incorporated in a station wall;

FIG. 5B is an illustration of a cross-sectional front view of the volume reduction assembly of FIG. 5A in a station wall;

FIG. 6A is an illustration of a cross-sectional side view of an embodiment of a volume reduction assembly in the form of a plurality of blocks when a vacuum transport tube vehicle arrives at a vacuum tube vehicle station;

FIG. 6B is an illustration of a partial sectional front view of the volume reduction assembly in the form of the plurality of blocks of FIG. 6A, showing the plurality of blocks in a fully retracted position when the vacuum transport tube vehicle arrives at a vacuum tube vehicle station;

FIG. 9A is an illustration of a cross-sectional side view of an embodiment of the volume reduction assembly in the form of a plurality of blocks and showing a vehicle door and a door seal in a deployed position;

FIG. 9B is an illustration of a partial sectional front view of the volume reduction assembly of FIG. 9A showing the vehicle door and the door seal in the deployed position;

FIG. 12A is an illustration of a cross-sectional side view of an embodiment of the volume reduction assembly in the form of a plurality of blocks and showing a vehicle door in a closed position;

FIG. 12B is an illustration of a partial sectional front view of the volume reduction assembly of FIG. 12A showing the vehicle door in the closed position;

FIG. 15A is an illustration of a cross-sectional side view of an embodiment of the volume reduction assembly in the form of a plurality of blocks and showing the plurality of blocks is in a partially retracted position;

FIG. 15B is an illustration of a partial sectional front view of the volume reduction assembly of FIG. 15A showing the plurality of blocks in the partially retracted position;

FIG. 16A is an illustration of a cross-sectional side view of an embodiment of the volume reduction assembly in the form of a plurality of blocks and showing the vehicle door and showing the door seal in retracted position;

FIG. 16B is an illustration of a partial sectional front view of the volume reduction assembly of FIG. 16A showing the door seal in the retracted position;

FIG. 17A is an illustration of a cross-sectional side view of an embodiment of a volume reduction assembly in the form of a plurality of blocks and showing the plurality of blocks in a fully retracted position;

FIG. 17B is an illustration of a partial sectional front view of the volume reduction assembly of FIG. 17A showing the plurality of blocks in the fully retracted position;

FIG. 18A is an illustration of a cross-sectional side view of an embodiment of a volume reduction assembly in the form of a plurality of blocks and showing the plurality of blocks in a fully retracted position when the vacuum transport tube vehicle exits the vacuum tube vehicle station;

FIG. 18B is an illustration of a partial sectional front view of the volume reduction assembly of FIG. 18A showing the plurality of blocks in the fully retracted position when the vacuum transport tube vehicle exits the vacuum tube vehicle station;

FIG. 19 is an illustration of a cross-sectional side view of an embodiment of the volume reduction assembly in the form of a plurality of blocks and showing no longitudinal gaps in the plurality of blocks;

Figure 2A:
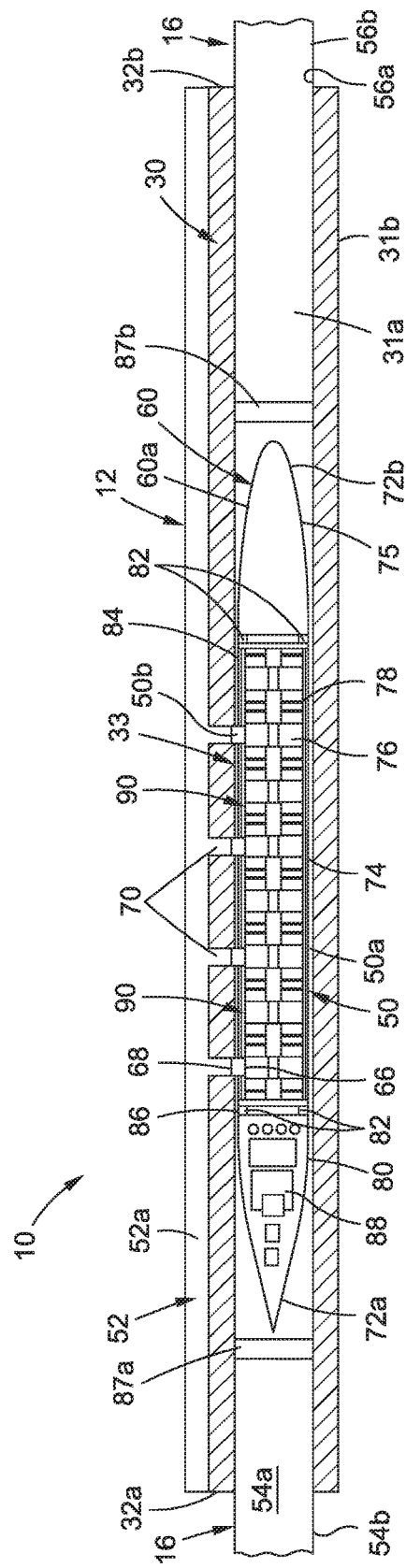
FIG. 2A is an illustration of a top sectional view of an embodiment of a vacuum volume reduction system of the disclosure used with a vacuum transport tube vehicle at a vacuum tube vehicle station.

The figures shown in this disclosure represent various aspects of the embodiments presented, and only differences will be discussed in detail.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and fully convey the scope of the disclosure to those skilled in the art.

The disclosure, as discussed in detail below, includes embodiments of a vacuum volume reduction system 10 (see FIGS. 2A, 3) and a method 300 (see FIG. 21) for reducing a volume 50 (see FIGS. 2A, 3) to be evacuated at a vacuum tube vehicle station 12 (see FIGS. 2A, 3).

Now referring to the Figures, FIG. 1A is an illustration of a side perspective view of a proposed known high-speed vacuum tube transportation system 14, e.g., 200-2000 mph (miles per hour) average speed, with a high-speed vacuum tube transportation train 15 moving or traveling through a vacuum transport tube 16, such as a first vacuum transport tube 16a, in a direction of travel 18. As shown in FIG. 1A, the proposed known high-speed vacuum tube transportation system 14 may include the first vacuum transport tube 16a and a second vacuum transport tube 16b, one or both of which may be used with one or more embodiments of the vacuum transport tube vehicle 12 and the vacuum transport tube vehicle system 10 of the disclosure. As further shown in FIG. 1A, the vacuum transport tubes 16 are elevated above a ground surface 20 via a plurality of column support structures 22. However, the vacuum transport tubes 16 may also be installed underneath the ground surface 20.

FIG. 1B is an illustration of a cross-sectional view of the proposed known high-speed vacuum tube transportation system 14 taken along lines 1B-1B of FIG. 1A. FIG. 1B shows the high-speed vacuum tube transportation train 15 within the first vacuum transport tube 16a. The first vacuum transport tube 16a (see FIG. 1B) is positioned below the second vacuum transport tube 16b (see FIG. 1B), and the column support structure 22 (see FIG. 1B) supports the vacuum transport tubes 16 (see FIG. 1B). As further shown in FIG. 1B, the high speeds of the high-speed vacuum tube transportation train 15 may be enabled by a magnetic levitation (mag-lev) propulsion system 24, which is substantially frictionless and eliminates or greatly reduces rolling friction. The mag-lev propulsion system 24 (see FIG. 1B) may include a plurality of guide magnets 26 (see FIG. 1B) and a plurality of vehicle magnets 28 (see FIG. 1B) to create both lift and substantially frictionless propulsion to move the of high-speed vacuum tube transportation train 15 (see FIG. 1B) along a guideway through the vacuum transport tube 16 (see FIG. 1B) at very high speeds.

Now referring to FIG. 2A and FIG. 3, FIG. 2A is an illustration of a top sectional view of an embodiment of a vacuum volume reduction system 10 of the disclosure used with a vacuum transport tube vehicle 60, such as a vacuum transport tube train 60a, at a vacuum tube vehicle station 12. FIG. 3 is an illustration of a functional block diagram of an exemplary embodiment of a vacuum transport tube vehicle system 10 of the disclosure for reducing a volume 50 to be evacuated at a vacuum tube vehicle station 12.

As shown in FIGS. 2A, 3, the vacuum volume reduction system 10 comprises a station vacuum tube 33 disposed in an interior 31a of a station wall 30 of the vacuum tube vehicle station 12. The station vacuum tube 33 (see FIGS. 2A, 3) has a tube volume 50a, which is part of the volume 50 that is vacuum at the vacuum tube vehicle station 12. The vacuum volume reduction system 10 (see FIGS. 2A, 3) displaces the tube volume 50a (see FIGS. 2A, 3) between the station wall 30 (see FIGS. 2A, 3) and the vehicle outer surface 80 (see FIGS. 2A, 3), and in turn, reduces a volume 50 (see FIGS. 2A, 3) to be evacuated at the vacuum tube vehicle station 12.

Figure 2C:
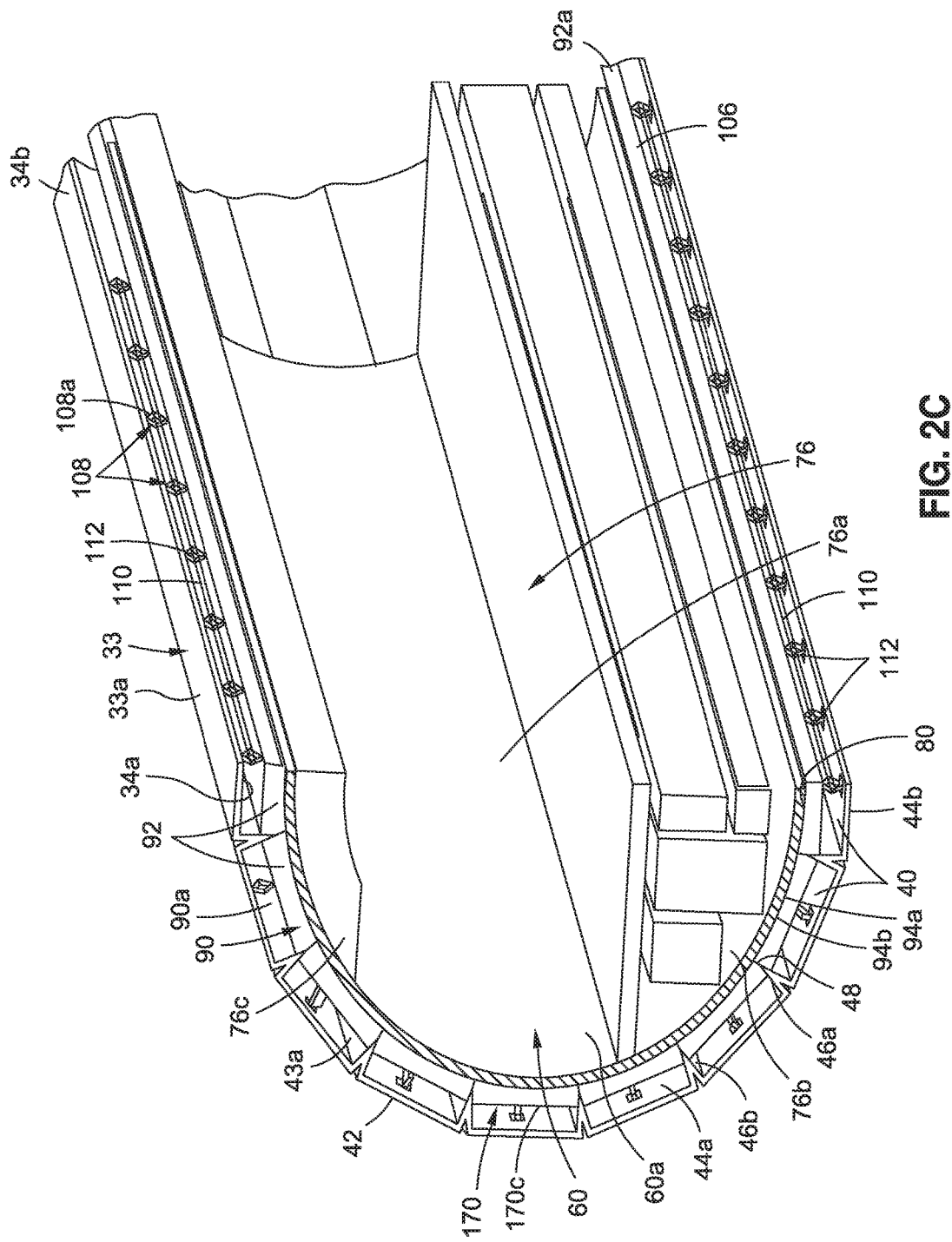
FIG. 2C is an illustration of an enlarged cut-away side perspective view of the modular tube volume reduction assembly of FIG. 2B.
Figures 4A, 4B:
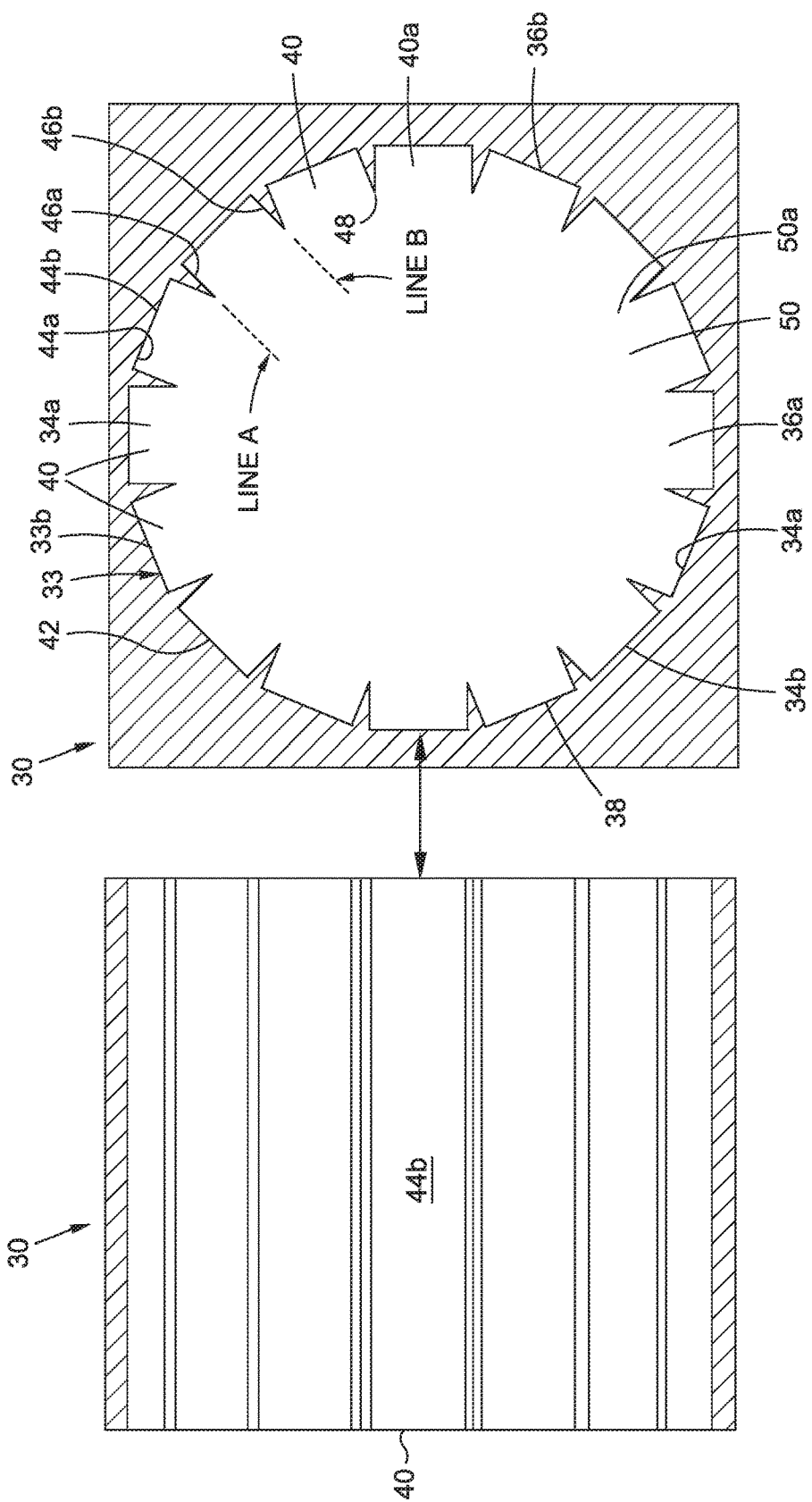
FIG. 4A is an illustration of a cross-sectional side view of a station wall of a vacuum tube vehicle station that may be used with embodiments of a vacuum volume reduction system of the disclosure.
FIG. 4B is an illustration of a cross-sectional front view of the station wall of FIG. 4A showing an embodiment of a station vacuum tube.

In one embodiment, as shown in FIGS. 2B, 2C, and discussed in further detail below, the station vacuum tube 33 is a modular station vacuum tube 33a (see also FIG. 3) that is integrated with the volume reduction assembly 90 (see also FIG. 3), to form a modular tube volume reduction assembly 90a (see also FIG. 3), configured for installation in the station wall 30 (see also FIGS. 2A, 3). In another embodiment, as shown in FIG. 4B, and discussed in further detail below, the station vacuum tube 33 is a built-in station vacuum tube 33b formed in the station wall 30, and the volume reduction assembly 90 is coupled to the built-in station vacuum tube 33b.

As further shown in FIG. 2A, the station wall 30 of the vacuum tube vehicle station 12 has an interior 31a, an exterior 31b, a first end 32a, and a second end 32b. As further shown in FIG. 2A, vacuum tubes 16 may be coupled to the first end 32a and the second end 32b, respectively, and each vacuum tube 16 has an interior 54a, an exterior 54b, an inner surface 56a, and an outer surface 56b. The interior 54a of the vacuum tubes 16 is preferably coextensive with the interior 31a of the station wall 30 and an interior 36a (see FIG. 4C) of the station vacuum tube 33.

As further shown in FIG. 2A, the vacuum transport tube vehicle 60, such as the vacuum transport tube train 60a, comprises a forward end 72a, and an aft end 72b. As further shown in FIGS. 2A, 3, the vacuum transport tube vehicle 60, such as the vacuum transport tube train 60a, comprises a constant radius portion 74, a contour portion 75, an interior 76, an outer vehicle wall 78, and a vehicle outer surface 80. The vacuum transport tube vehicle 60 (see FIGS. 2A, 3), such as the vacuum transport tube train 60a (see FIG. 2A), may be controlled and powered via a vehicle power and control system 88 (see FIGS. 2A, 3), and the vacuum transport tube vehicle 60 (see FIGS. 2A, 3) may be enabled by a magnetic levitation (mag-lev) propulsion system 24 (see FIGS. 1B, 3), which is substantially frictionless and eliminates or greatly reduces rolling friction.

As shown in FIG. 3, the interior 76 of the vacuum transport tube vehicle 60 preferably comprises a cabin 76a, a cargo compartment 76b, and a ceiling 76c. As further shown in FIGS. 2A, 3, the vacuum transport tube vehicle 60 may comprise one or more vehicle doors 66.

As shown in FIGS. 2A, 3, the vacuum tube vehicle station 12 may comprise one or more station doors 68, and one or more station passageways 70 comprising walkways from the vacuum tube vehicle station 12 to the vacuum transport tube vehicle 60. The vacuum tube vehicle station 12 has station space filled with air 52 (see FIGS. 2A, 3), such as ambient air 52a (see FIGS. 2A, 3). The vacuum tube vehicle station 12 further has a volume 50 (see FIGS. 2A, 3) comprising a tube volume 50a (see FIGS. 2A, 3) and a door cavity volume 50b (see FIGS. 2A, 3) for evacuation 166 (see FIG. 3).

As shown in FIGS. 2A, 3, the vacuum volume reduction system 10 further comprises a volume reduction assembly 90 coupled to the station vacuum tube 33. The volume reduction assembly 90 (see FIG. 3) has a control system 108 (see FIG. 3) for radially moving the volume reduction assembly 90 to and from a vehicle outer surface 80 (see FIGS. 2A, 3) of a vacuum transport tube vehicle 60 at the vacuum tube vehicle station 12. The volume reduction assembly 90 (see FIGS. 2A, 3) engages around the vehicle outer surface 80 (see FIG. 3), for loading and unloading of one or more of, passengers 62 (see FIG. 9B) and cargo 64 (see FIG. 6B), through one or more vehicle doors 66 (see FIGS. 3, 9B) of the vacuum transport tube vehicle 60 (see FIGS. 3, 9B), and through one or more station doors 68 (see FIGS. 3, 9B) of the vacuum tube vehicle station 12. Engages around may mean that the volume reduction assembly 90 may form a seal 91 (see FIG. 3) in a sealed engagement 91a (see FIG. 3) around the vehicle outer surface 80 (see FIG. 3), or may mean that the volume reduction assembly 90 engages in close or near proximity, such as ⅛ inch to ¼ inch distance, to the vehicle outer surface 80 (see FIGS. 2A, 3) of the vacuum transport tube vehicle 60.

In one embodiment, as shown in FIGS. 2B, 2C, as discussed in detail below, the volume reduction assembly 90 comprises a plurality of blocks 92 installed in a plurality of cavities 40 longitudinally formed around a circumference 42 of the station vacuum tube 33. The plurality of blocks 92 (see FIGS. 3, 2B, 2C) are configured to move to reduce a gap volume 100a (see FIGS. 3, 7B) formed between the plurality of blocks 92 and the vehicle outer surface 80, for the loading and the unloading of one or more of, the passengers 62 and the cargo 64, through the one or more vehicle doors 66 and through the one or more station doors 68. The plurality of blocks 92 (see FIGS. 2C, 3) are preferably comprised of a compliant material 102 (see FIG. 3) such as a foam, a rubber, a foam rubber, or another suitably compliant material, that allows the plurality of blocks 92 to deform to match a shape 104 (see FIGS. 3, 5B) of the plurality of cavities 40 (see FIGS. 3, 5B).

The plurality of blocks 92 may be moved with a control system 108 (see FIGS. 2C, 3). As shown in FIG. 3, the control system 108 may comprise one of, a mechanical actuator control system 108a, a pneumatic actuator control system 108b, a hydraulic actuator control system 108c, an electrical actuator control system 108d, or another suitable control system for controlling movement and actuation of the volume reduction assembly 90. In one embodiment, the control system 108 (see FIGS. 2C, 3) comprises the mechanical actuator control system 108a (see FIGS. 2C, 3) comprising one or more worm gears 110 (see FIGS. 2C, 3) coupled to one or more scissor jacks 112 (see FIGS. 2C, 3).

As shown in FIG. 3, the vacuum volume reduction system 10 further comprises one or more door seals 122 that are coupled to the station wall 30, and configured to surround a perimeter 125 of, and to seal, each of the one or more vehicle doors 66, and to seal off a door cavity 132 having a door cavity volume 50b. As shown in FIG. 9B, the door seal 122 may be deployed from and retracted into a door seal cavity 123. The door seal 122 (see FIG. 3) is preferably controlled with a door seal control system 124 (see FIG. 3).

The vacuum volume reduction system 10 (see FIG. 3) further comprises an air supply assembly 130 (see FIG. 3) coupled to the station wall 30 (see FIG. 3), and configured to supply air 52 (see FIG. 3) to the door cavity 132 (see FIG. 3). The air supply assembly 130 (see FIG. 3) is preferably configured to supply air 52 (see FIG. 3) comprising one of, ambient air 52a (see FIG. 3) or compressed air 52b (see FIG. 3), to the door cavity 132, before the loading and the unloading of one or more of, the passengers 62 and the cargo 64. The door cavity 132 (see FIG. 3) is positioned between each of the one or more vehicle doors 66 (see FIG. 3) and each of the one or more station doors 68 (see FIG. 3). As shown in FIG. 3, the air supply assembly 130 may comprise one or more air pumps 134, one or more air ducts 136, one or more air supply control valves 138, and other suitable components.

The vacuum volume reduction system 10 (see FIG. 3) further comprises a vent-to-vacuum assembly 140 (see FIG. 3) coupled to the station wall 30 (see FIG. 3), and configured to evacuate the air 52 (see FIG. 3) from the door cavity 132 (see FIG. 3). The vent-to-vacuum assembly 140 (see FIG. 3) is configured to evacuate the air 52 (see FIG. 3) comprising one of, the ambient air 52a (see FIG. 3) or the compressed air 52b (see FIG. 3), from the door cavity 132 (see FIG. 3), after the loading and the unloading of one or more of, the passengers 62 and the cargo 64. As shown in FIG. 3, the vent-to-vacuum assembly 140 may comprise one or more vacuum pumps 142, one or more vacuum ducts 144, one or more vacuum valves 146, and one or more vacuum reservoirs 148 for collected the evacuated air. The vent-to-vacuum assembly 140 (see FIG. 3) may further comprise one or more vents 149 (see FIG. 3) for venting the evacuated air.

As shown in FIG. 3 and FIGS. 20A-20E, discussed in further detail below, the vacuum volume reduction system 10 may further comprise a door cavity volume reduction surface 150 coupled to each of one or more station doors 68, such as curved station doors 69, and configured to displace the door cavity volume 50b, to further reduce the volume 50 to be evacuated at the vacuum tube vehicle station 12. The door cavity volume reduction surface 150 (see FIGS. 3, 20A) comprises an inflatable door bladder 152 (see FIGS. 3, 20A) coupled to the air supply assembly 130 (see FIGS. 3, 20A), to inflate the inflatable door bladder 152 to expand toward the one or more vehicle doors 66 (see FIGS. 3, 20A). The inflatable door bladder 152 (see FIGS. 3, 20A) is further coupled to the vent-to-vacuum assembly 140 (see FIGS. 3, 20A), to deflate the inflatable door bladder 152, to retract from the one or more vehicle doors 66. The inflatable door bladder 152 (see FIGS. 3, 20A) is further coupled to one or more of, a plurality of spring elements 154 (see FIG. 20A), or a plurality of elastic elements 156 (see FIG. 20A), to provide a force 157 (see FIG. 3) to retract the inflatable door bladder 152 (see FIGS. 3, 20A).

The vacuum volume reduction system 10 (see FIGS. 2A, 3) may further comprise one or more pressure seals 82 (see FIGS. 2A, 3) coupled to the vacuum transport tube vehicle 60 (see FIGS. 2A, 3). As shown in FIG. 2A, one or more pressure seals 82 may be coupled at a forward location 86 of the vacuum transport tube vehicle 60, and one or more pressure seals 82 may be coupled at an aft location 84 of the vacuum transport tube vehicle 60.

As shown in FIG. 2A, the vacuum volume reduction system 10 may further comprise a first pressure barrier seal 87a coupled to the station wall 30 and configured to deploy in front of the vacuum transport tube vehicle 60, after the vacuum transport tube vehicle 60 has arrived at the vacuum tube vehicle station 12, and may further comprise a second pressure barrier seal 87b coupled to the station wall 30 and configured to deploy behind the vacuum transport tube vehicle 60, after vacuum transport tube vehicle 60 has arrived at the vacuum tube vehicle station 12.

Now referring to FIGS. 2B and 2C, FIG. 2B is an illustration of a side perspective view of an embodiment of a volume reduction assembly 90, in the form of a modular tube volume reduction assembly 90a, of the disclosure. FIG. 2C is an illustration of an enlarged cut-away side perspective view of the modular tube volume reduction assembly 90a of FIG. 2B. As shown in FIGS. 2B, 2C, in another embodiment, there is provided the modular tube volume reduction assembly 90a for use at the vacuum tube vehicle station 12 (see FIG. 2A). FIGS. 2B, 2C show the modular tube volume reduction assembly 90a engaged around the vacuum transport tube vehicle 60, and show the interior 76, which includes the cabin 76a, the cargo compartment 76b, and the ceiling 76c.

The modular tube volume reduction assembly 90a (see FIGS. 2B, 2C) comprises the station vacuum tube 33 (see FIGS. 2B, 2C), such as in the form of a modular station vacuum tube 33a (see FIGS. 2B, 2C) having an inner surface 34a (see FIG. 2C) and an outer surface 34b (see FIG. 2C).

The modular tube volume reduction assembly 90a (see FIGS. 2B, 2C) further has a tube volume 50a (see FIG. 3) and a plurality of cavities 40 (see FIGS. 2B, 2C) longitudinally formed around a circumference 42 (see FIG. 2B) of the modular station vacuum tube 33a (see FIGS. 2B, 2C). As shown in FIG. 2C, each cavity 40, has a cavity interior 43a, an interior end 44a, an exterior end 44b, a first side 46a, a second side 46b, and a nominal point 48 where the first side 46a and the second side 46b join.

The modular tube volume reduction assembly 90a (see FIGS. 2B, 2C) further comprises a volume reduction assembly 90 (see FIGS. 2B, 2C) integrated with the modular station vacuum tube 33a (see FIGS. 2B, 2C). The volume reduction assembly 90 (see FIGS. 2B, 2C) comprises the plurality of blocks 92 (see FIGS. 2B, 2C) longitudinally coupled to the cavity interior 43a (see FIG. 2C) of each of the plurality of cavities 40 (see FIGS. 2B, 2C). The plurality of blocks 92 (see FIGS. 2B, 2C) may comprise longitudinal blocks 92a (see FIGS. 2B, 2C) having a longitudinal one-piece monolithic structure 106 (see FIGS. 2C, 3).

As shown in FIG. 2C, each block 92 has an inner surface 94a and an outer surface 94b. The plurality of blocks 92 (see FIGS. 2B, 2C) for the modular tube volume reduction assembly 90a (see FIGS. 2B, 2C) are preferably comprised of a compliant material 102 (see FIG. 3), as discussed above, that allows the plurality of blocks 92 to deform to match a shape 104 (see FIG. 3) of the plurality of cavities 40. As further shown in FIG. 2C, the plurality of blocks 92 are in a block position 170 comprising a fully deployed position 170c where the inner surface 94a of each block 92 is in engaged around the vehicle outer surface 80 of the vacuum transport tube vehicle 60. The plurality of blocks 92 may engage around the vehicle outer surface 80 by contacting the vehicle outer surface 80 directly to form a seal 91 (see FIG. 3) in a sealed engagement 91a (see FIG. 3) against the vehicle outer surface 80, or the plurality of blocks 92 may engage around the vehicle outer surface 80 by engaging in close or near proximity, such as ⅛ inch or ¼ inch distance, to the vehicle outer surface 80.

As shown in FIGS. 2B, 2C, the volume reduction assembly 90, in the form of a modular tube volume reduction assembly 90a, comprises a control system 108, such as a mechanical actuator control system 108a, coupled between the modular station vacuum tube 33 and the plurality of blocks 92. As shown in FIG. 2C, the mechanical actuator control system 108a comprises worm gears 110 coupled to a plurality of scissor jacks 112. However, the mechanical actuator control system 108a may comprise other suitable mechanical actuation devices.

The control system 108 (see FIGS. 2B, 2C) is configured to radially move the plurality of blocks 92 (see FIGS. 2B, 2C) to and from the vehicle outer surface 80 (see FIG. 2C) of the vacuum transport tube vehicle 60 (see FIGS. 2B, 2C), such as the vacuum transport tube train 60a (see FIGS. 2B, 2C), to engage around the vehicle outer surface 80, such as in a sealed engagement 91a (see FIG. 3) to directly contact the vehicle outer surface 80, or in a close or near proximity engagement, such as ⅛ inch to ¼ inch distance, to the vehicle outer surface 80. This occurs for loading and unloading of one or more of, passengers 62 (see FIG. 9B) and cargo 64 (see FIG. 6B) in the cargo compartment 76b (see FIGS. 2B, 2C), through one or more vehicle doors 66 (see FIGS. 2A, 3) of the vacuum transport tube vehicle 60 (see FIGS. 2A, 2B, 2C) and through one or more station doors 68 (see FIGS. 2A, 3) of the vacuum tube vehicle station 12 (see FIG. 2A), when the modular tube volume reduction assembly 90a (see FIG. 2C) is used at the vacuum tube vehicle station 12 (see FIG. 2A), such as being installed in the station wall 30 (see FIG. 2A). The modular tube volume reduction assembly 90a (see FIGS. 2B, 2C) displaces the tube volume 50a (see FIG. 2A) between the station wall 30 (see FIG. 2A) and the vehicle outer surface 80 (see FIG. 2C), and in turn, reduces the volume 50 (see FIGS. 2A, 3) to be evacuated at the vacuum tube vehicle station 12 (see FIG. 2A).

Figure 2D:
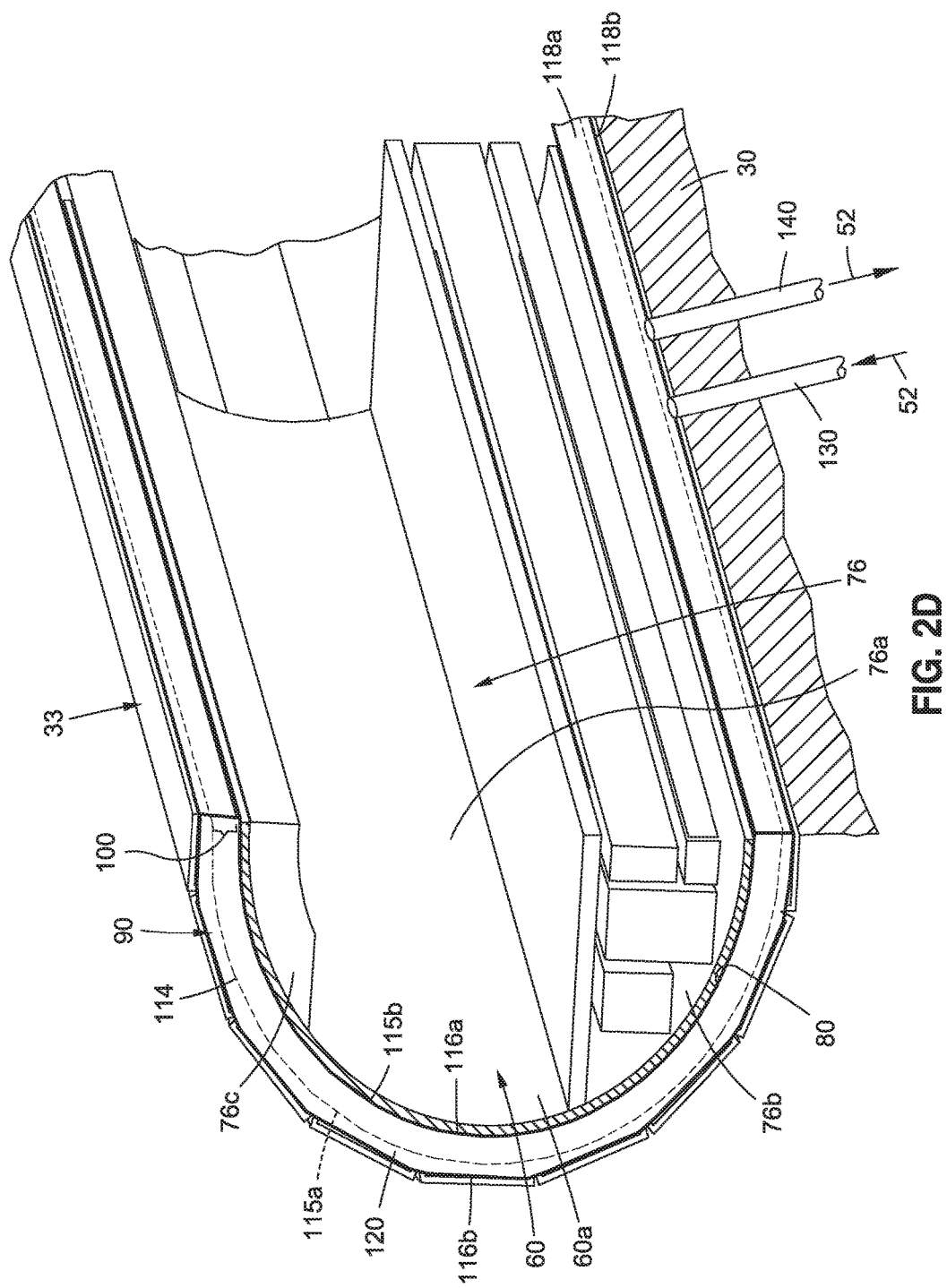
FIG. 2D is an illustration of an enlarged cut-away side perspective view of another embodiment of a volume reduction assembly in the form of an inflatable bladder of the disclosure.

Now referring to FIG. 2D. FIG. 2D FIG. 2D is an illustration of an enlarged cut-away side perspective view of another embodiment of a volume reduction assembly 90 in the form of an inflatable bladder 114 of the disclosure. The volume reduction assembly 90 (see FIG. 3) comprises one or more inflatable bladders 114 (see FIGS. 2D, 3) coupled to the station vacuum tube 33 (see FIGS. 2D, 3). The one or more inflatable bladders 114 (see FIGS. 2D, 3) are each configured to inflate to reduce a gap volume 100a (see FIG. 3) formed between the one or more inflatable bladders 114 and the vehicle outer surface 80 (see FIG. 3) of the vacuum transport tube vehicle 60 (see FIG. 2D), such as in the form of vacuum transport tube train 60a (see FIG. 2D), for the loading and the unloading of one or more of, the passengers 62 (see FIG. 9B) and the cargo 64 (see FIG. 6B), through the one or more vehicle doors 66 (see FIG. 6B) and through the one or more station doors 68 (see FIG. 9B). FIG. 2D shows the interior 76 of the vacuum transport tube vehicle 60, including the cabin 76a, the cargo compartment 76b, and the ceiling 76c.

As shown in FIG. 2D, in an inflated position 115b, the inflatable bladder 114 has a bladder inner side 116a coupled against the vacuum transport tube vehicle 60 to engage around the vehicle outer surface 80 of the vacuum transport tube vehicle 60. The inflatable bladder 114 (see FIG. 2D) may engage around the vehicle outer surface 80 (see FIG. 2D) by contacting the vehicle outer surface 80 directly to form a seal 91 (see FIG. 3) in a sealed engagement 91a (see FIG. 3) against the vehicle outer surface 80, or the inflatable bladder 114 may engage around the vehicle outer surface 80 by engaging in close or near proximity, such as ⅛ inch or ¼ inch distance, to the vehicle outer surface 80. The inflatable bladder 114 (see FIG. 2D) has a bladder outer side 116b (see FIG. 2D) coupled to station vacuum tube 33 (see FIG. 2D). FIG. 2D further shows the inflatable bladder 114 in a deflated position 115a with dotted lines in which the bladder body 120 is reduced in size with the bladder outer side 116b still coupled to station vacuum tube 33. In an inflated position 115b (see FIG. 2D), a bladder body 120 (see FIG. 2D) of the inflatable bladder 114 (see FIG. 2D) fills a gap 100 (see FIG. 2D). The gap 100 (see FIG. 2D) is between the bladder inner side 116a (see FIG. 2D), when the inflatable bladder 114 is in the deflated position 115a, and the vehicle outer surface 80 (see FIG. 2D) of the vacuum transport tube vehicle 60 (see FIG. 2D).

The inflatable bladder 114 (see FIG. 2D) is configured to inflate to reduce the gap 100 (see FIG. 2D) between the bladder inner side 116a (see FIG. 2D) and the vacuum transport tube vehicle 60 (see FIG. 2D), when the inflatable bladder 114 expands from the deflated position 115a (see FIG. 2D) to the inflated position 115b (see FIG. 2D), and to engage around the vehicle outer surface 80 (see FIG. 2C) of the vacuum transport tube vehicle 60, when the vacuum transport tube vehicle 60 arrives at and stops at the vacuum tube vehicle station 12 (see FIG. 2A). As shown in FIGS. 2D, 3, each of the one or more inflatable bladders 114 comprises the bladder inner side 116a, the bladder outer side 116b, a bladder interior 118a, a bladder exterior 118b, and the bladder body 120.

As shown in FIG. 2D, the inflatable bladder 114 may be inflated to the inflated position 115b via air 52 from the air supply assembly 130 coupled between the station wall 30 and the inflatable bladder. As further shown in FIG. 2D, the inflatable bladder 114 may be deflated to the deflated position 115a via the evacuation of air 52 out of the inflatable bladder 114 via the vent-to-vacuum assembly 140 coupled between the inflatable bladder 114 and the station wall 30. However, other suitable inflation and deflation devices or systems may also be used to inflate and deflate the inflatable bladder 114.

Figure 2E:
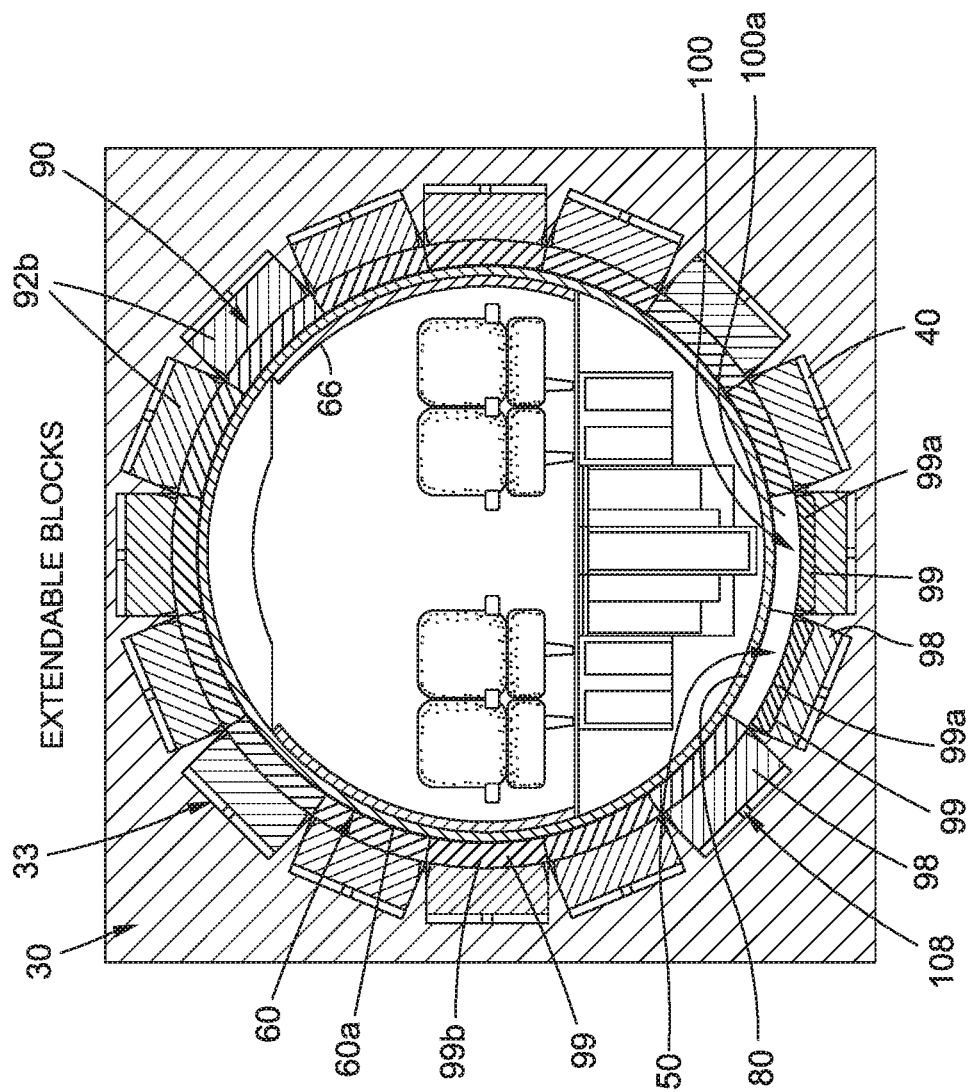
FIG. 2E is an illustration of a partial sectional front view of yet another embodiment of a volume reduction assembly in the form of a plurality of extendable blocks of the disclosure.

FIG. 2E is an illustration of a partial sectional front view of yet another embodiment of a volume reduction assembly 90 coupled to the station tube vehicle 33 in the station wall 30 of the disclosure in the form of a plurality of extendable blocks 92b of the disclosure. In this embodiment, the volume reduction assembly 90 comprises the plurality of extendable blocks 92b. Each extendable block 92b comprises an extendable portion 99 that is extendable from the main block body 98. FIG. 2E shows the extendable block 92b in a retracted position 99a with a gap 100 having a gap volume between the extendable block 92b and the outer vehicle surface 80 of the vacuum transport tube vehicle 60, such as the vacuum transport tube train 60a. The gap volume 100a (see FIG. 2E) is part of the volume 50 (see FIG. 2E). FIG. 2E further shows the extendable block 92b in an extended position 99b, where just the extendable portion 99, and not the main block body 98 is moved radially inward via the control system 108 in contact with the vehicle outer surface 80 to engage around the vehicle outer surface 80. The extendable portions 99 of the plurality of extendable blocks 92b may engage around the vehicle outer surface 80 by contacting the vehicle outer surface 80 directly to form a seal 91 (see FIG. 3) in a sealed engagement 91a (see FIG. 3) against the vehicle outer surface 80, or the extendable portions 99 of the plurality of extendable blocks 92b may engage around the vehicle outer surface 80 by engaging in close or near proximity, such as ⅛ inch or ¼ inch distance, to the vehicle outer surface 80.

Now referring to FIGS. 4A-4C, FIG. 4A is an illustration of a cross-sectional side view of a station wall 30 of a vacuum tube vehicle station 12 (see FIG. 12A) that may be used with embodiments of a vacuum volume reduction system 10 (see FIGS. 2A, 3) of the disclosure. FIG. 4B is an illustration of a cross-sectional front view of the station wall 30 of FIG. 4A showing an embodiment of a station vacuum tube. FIG. 4C is an illustration of a cross-sectional front view of a station wall showing another embodiment of a station vacuum tube 33.

FIG. 4A shows cavities and the exterior end 44b of the cavities. FIG. 4B shows the station vacuum tube 33, such as in the form of a built-in station vacuum tube 33b, that may be built into the station wall 30. FIG. 4B further shows the plurality of cavities 40, where each cavity 40 has the interior end 44a, the exterior end 44b, the first side 46a, the second side 46b, and the nominal point 48 where the first side 46a of one cavity 40 meets or joins with a second side 46b of an adjacent cavity 40a. As shown in FIG. 4B, the first side 46a shown as LINE A is extended and is parallel to extended LINE B indicating the second side 46b. FIG. 4B further shows the inner surface 34a of the station vacuum tube 33, the outer surface 34b of the station vacuum tube 33, the interior 36a of the station vacuum tube 33, and the exterior 36b of the station vacuum tube 33. The station wall interior 36a comprises a vacuum 50, such as a tube volume 50a.

FIG. 4C shows in partial view the volume reduction assembly 90, such as in the form of modular tube volume reduction assembly 90a, installed in the station wall 30. The volume reduction assembly 90, such as in the form of modular tube volume reduction assembly 90, includes the station vacuum tube 33, in the form of a modular station vacuum tube 33, with the inner surface 34a and the outer surface 34b, and shows the cavity 40, the control system 108, and the blocks 92. As further shown in FIG. 4C, the volume reduction assembly 90 may include a liner element 49 coupled to the interior 31a of the station wall 30 for contact or engagement with the outer surface 34b of the station vacuum tube 34b. The liner 49 (see FIG. 4C) may provide additional protection against leaks, as well as a protective layer for the volume reduction assembly 90.

Now referring to FIGS. 5A-5B, FIG. 5A is an illustration of a cross-sectional side view of an embodiment of a volume reduction assembly 90, such as in the form of the plurality of blocks 92, in the station wall 30, and showing the outer surface 94b of the blocks 92. FIG. 5B is an illustration of a cross-sectional front view of the volume reduction assembly 90, in the form of the plurality of blocks 92, of FIG. 5A in the station wall 30.

FIG. 5B shows the plurality of blocks 92 inserted in the cavities 40 of the station vacuum tube 33 shows each block 92 conforming to the shape 104 of each cavity 40. As shown in FIG. 5B, each block 92 comprises an inner surface 94a, an outer surface 94b, sides 96 including a first side 96a and a second side 96b, and a block body 98. FIG. 5B further shows the control system 108, such as in the form of an mechanical actuator control system 108a, for moving or actuating the blocks 92, when deployed, radially inward toward the vehicle outer surface 80, so that the inner surface 94a of each block 92 contacts or engages the vehicle outer surface 80 (shown in dotted lines in FIG. 5B) of the vacuum transport tube vehicle 60 after the vacuum transport tube vehicle 60 has arrived at the vacuum tube vehicle station 12. The actuation of the blocks 92 by the control system 108 may be mechanical, pneumatic, hydraulic, or electric. The amount of force required to move the blocks 92 inward and later outward will likely be minimal, because they are moving in a vacuum, and they are not designed to impart a large force upon the outer vehicle wall 78 (see FIG. 6B). The material of the blocks 92 is preferably a compliant material 102 (see FIG. 3), so that it can easily deform to match the contour portion 75 (see FIG. 2A) of the vacuum transport tube vehicle 60 (see FIG. 2A). FIG. 5B further shows the volume 50, such as the tube volume 50a.

Now referring to FIGS. 6A-18B, various stages of operation of an embodiment of the volume reduction assembly 90, such as in the form of a plurality of blocks 90 in cavities 40, of the vacuum volume reduction system 10 of the disclosure, are discussed, when a vacuum transport tube vehicle 60, such as a vacuum transport tube train 60a, arrives at, stops to load and unload passengers 62 and/or cargo 64, and exits from a vacuum volume vehicle station 12. It is noted that one or more of these stages of operation may also be performed with other embodiments of the volume reduction assembly 90, such as the inflatable bladder 114 (see FIG. 2D), the longitudinal blocks 92a (see FIG. 2B), the extendable blocks 92b (see FIG. 2E), and other embodiments disclosed herein.

Now referring to FIGS. 6A-6B, FIG. 6A is an illustration of a cross-sectional side view of an embodiment of a volume reduction assembly 90, in the form of a plurality of blocks 92, when a vacuum transport tube vehicle 60 (see FIG. 6B), such as a vacuum transport tube train 60a (see FIG. 6B), arrives at a vacuum tube vehicle station 12 (see FIG. 2A).

FIG. 6A shows a vehicle arrival stage side view 172a, and also shows the station wall 30, the block outer side 94b, and the volume 50.

FIG. 6B is an illustration of a partial sectional front view of the volume reduction assembly 90, such as in the form of the plurality of blocks 92, of FIG. 6A, showing the plurality of blocks 92 in a block position 170 of a fully retracted position 170a. FIG. 6B shows a vehicle arrival stage front view 172b. FIG. 6B further shows a gap 100 with a gap volume 100a between the vehicle outer surface 80 of the outer vehicle wall 78 of the vacuum transport tube vehicle 60, and the inner surface 94a of each block 92. Between the vehicle outer surface 80 (see FIG. 6B) and the inner surface 94a (see FIG. 6B) of each block 92 is the gap 100 (see FIG. 6B) having a gap width 100b (see FIG. 3) of a few inches, where the gap 100 is part of the volume 50 (see FIG. 6B), such as the tube volume 50a (see FIG. 6B). FIG. 6B further shows the station wall 30, the station vacuum tube 33, the vacuum transport tube vehicle 60 with the interior 76, including the cabin 76a having chairs 77 and cabin air 52c, the cargo compartment 76b having cargo 64, such as luggage 64a stored in the cargo compartment 76b, the ceiling 76c, and the vehicle door 66. FIG. 6B further shows the volume reduction assembly 90, such as the plurality of block 92, disposed in the cavities 40 and coupled to the control system 108 that operates movement, such as deployment and retraction, of the plurality of blocks 92.

Figure 7B:
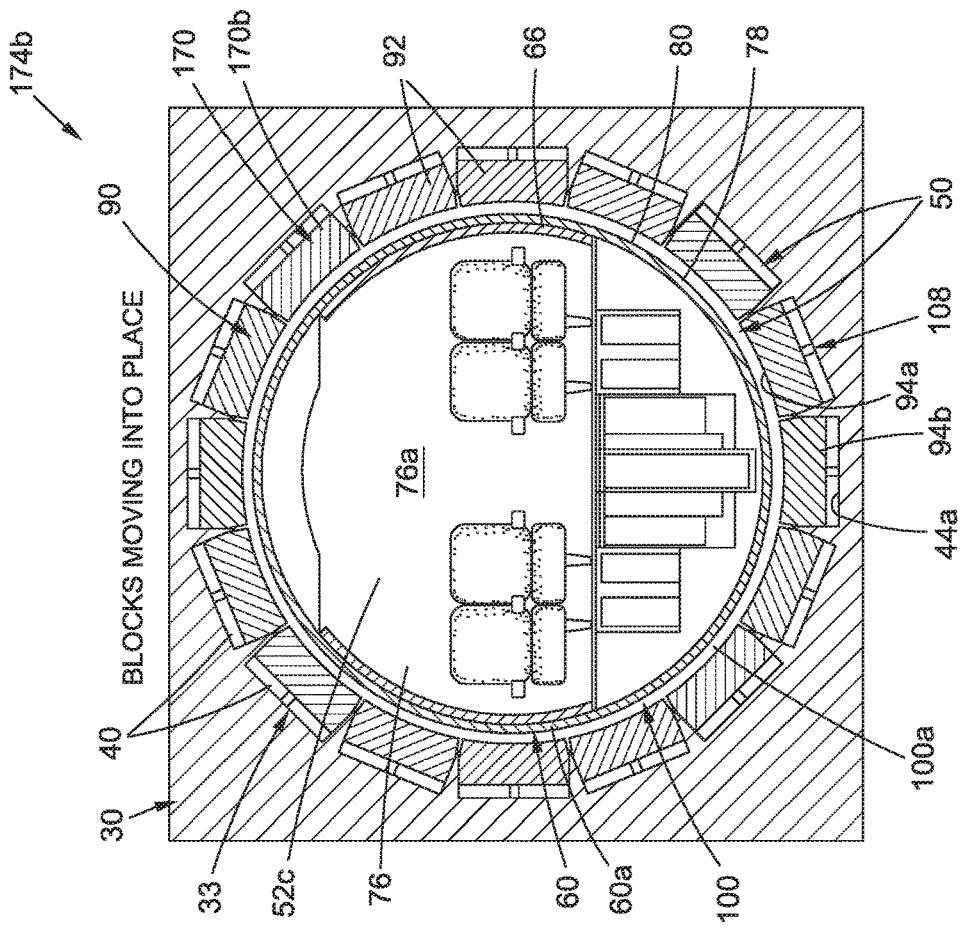
FIG. 7B is an illustration of a partial sectional front view of the volume reduction assembly of FIG. 7A showing the plurality of blocks in the partially deployed position.
Figure 7A:
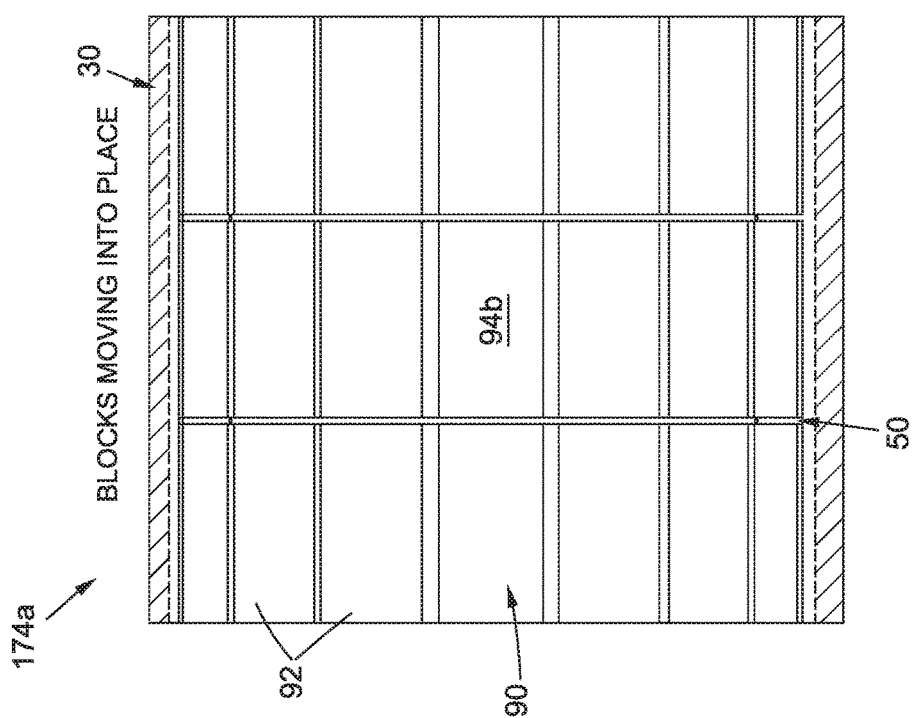
FIG. 7A is an illustration of a cross-sectional side view of an embodiment of the volume reduction assembly in the form of a plurality of blocks and showing the plurality of blocks is in a partially deployed position.

Now referring to FIGS. 7A-7B, FIG. 7A is an illustration of a cross-sectional side view of an embodiment of the volume reduction assembly 90, in the form of the plurality of blocks 92, and shows the outer surface 94b of the plurality of blocks 92 which are coupled to the station wall 30, and shows the volume 50. FIG. 7A shows a blocks moving into place stage side view 174a.

FIG. 7B is an illustration of a partial sectional front view of the volume reduction assembly 90 of FIG. 7A showing the plurality of blocks 92 in the block position 170 of a partially deployed position 170b. FIG. 7B shows a blocks moving into place stage front view 174b. FIG. 7B shows the station wall 30, the station vacuum tube 33, the cavities 40 with an interior end 44a, the control system 108, and the vacuum transport tube vehicle 60, such as the vacuum transport tube train 60a, when the vacuum transport tube vehicle 60 has arrived at the vacuum tube vehicle station 12 (see FIG. 3) and is stopped, and the plurality of blocks 92 are moving into place. FIG. 7B further shows the inner surface 94a and the outer surface 94b of the plurality of blocks 92, which move radially inward toward the vehicle outer surface 80 of the outer vehicle wall 78 of the vacuum transport tube vehicle 60, such as the vacuum transport tube train 60a. The plurality of blocks 92 preferably do not change their overall shape and size but experience a rigid body radial motion. FIG. 7B further shows the interior 76 of the vacuum transport tube vehicle 60, including the cabin 76a having cabin air 52c, and the vehicle door 66, and shows the volume 50. As the plurality of blocks 92 move radially toward the vehicle outer surface 80, via the control system 108, the gap 100 and the gap volume 100a, gets displaced and gets smaller in size. At this point, all volumes 50 (see also FIG. 3) inside the vacuum tube vehicle station 12 (see FIG. 2A) are in a vacuum. As shown in FIG. 7B, this includes the volume 50 and the gap volume 100a.

Figure 8B:
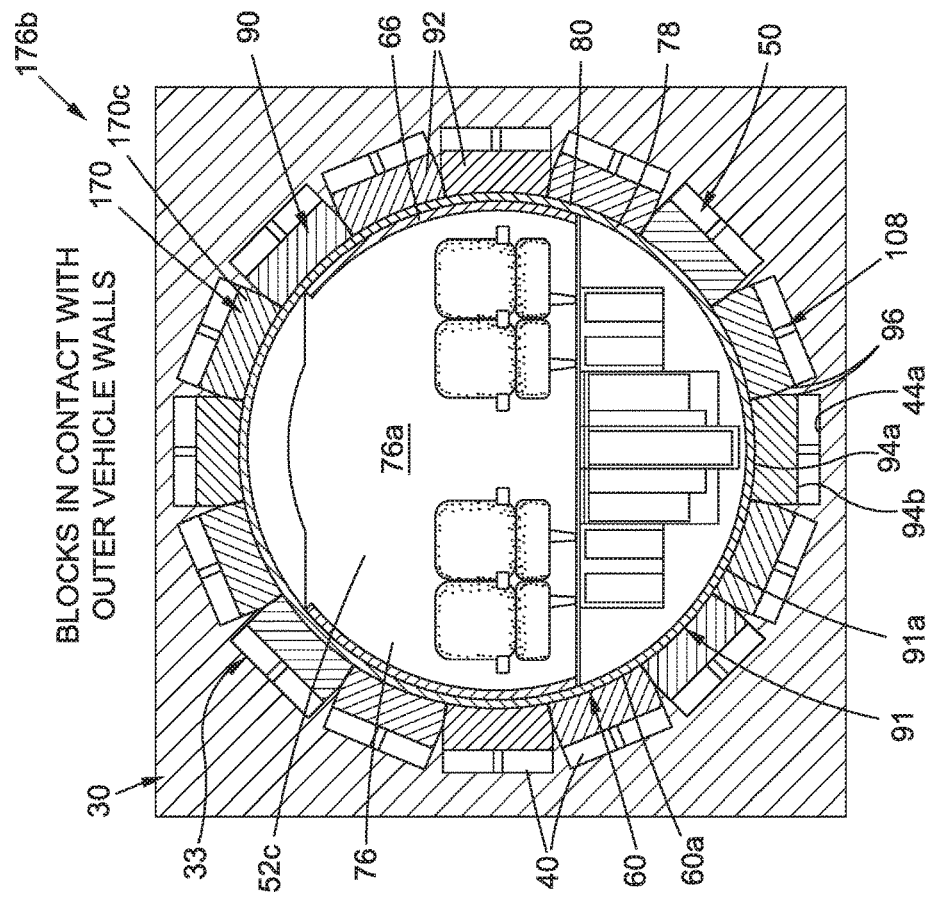
FIG. 8B is an illustration of a partial sectional front view of the volume reduction assembly of FIG. 8A showing the plurality of blocks in the fully deployed position.
Figure 8A:
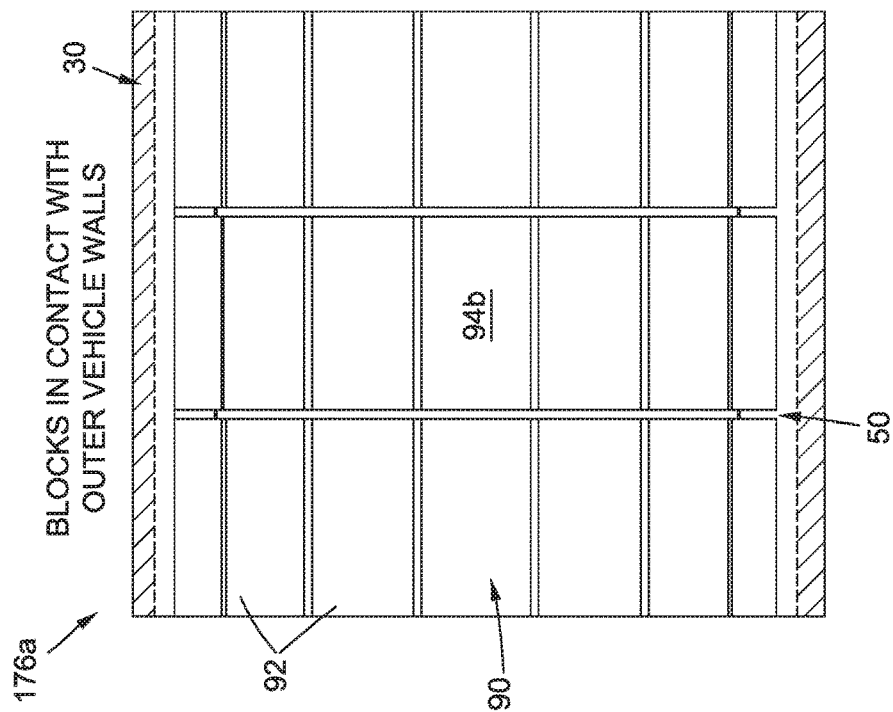
FIG. 8A is an illustration of a cross-sectional side view of an embodiment of the volume reduction assembly in the form of a plurality of blocks and showing the plurality of blocks is in a fully deployed position.

Now referring to FIGS. 8A-8B, FIG. 8A is an illustration of a cross-sectional side view of an embodiment of the volume reduction assembly 90, in the form of the plurality of blocks 92, and shows the outer surface 94b of the plurality of blocks 92, which blocks 92 are coupled to the station wall 30, and shows the volume 50. FIG. 8A shows a plurality of blocks in contact with outer vehicle walls stage side view 176a.

FIG. 8B is an illustration of a partial sectional front view of the volume reduction assembly 90 of FIG. 8A showing the plurality of blocks 92 in the block position 170 of a fully deployed position 170c. FIG. 8B shows a plurality of blocks in contact with outer vehicle walls stage front view 176b. FIG. 8B shows all of the plurality of blocks 92 have moved into place where they are contacting the vehicle outer surface 80 of the outer vehicle wall 78 of the vacuum transport tube vehicle 60, such as the vacuum transport tube train 60a, and have also moved into contact with each other. The dimensions of each block 92 may be designed such that each is slightly larger than the cavity 40 allotted for each block 92 in the fully deployed position 170c, thus causing the sides 96 to be compressed against each other. This compressive force causes the surfaces of the sides 96 to bear snugly against each other, and makes it difficult for air molecules to travel between the blocks 92 and reside there. FIG. 8B shows the plurality of blocks 92 forming a seal 91 in a sealed engagement 91a around the outer vehicle surface 80 of the vacuum transport tube vehicle 60. Alternatively, the plurality of blocks 92 may engage around the outer vehicle surface 80 in close or near proximity to the outer vehicle surface 80, such as ⅛ inch to ¼ inch distance away from the outer vehicle surface 80. FIG. 8B further shows the station wall 30, the station vacuum tube 33, the cavities 40 with an interior end 44a, the control system 108, and the vacuum transport tube vehicle 60 with the interior 76, including the cabin 76a having cabin air 52c, and the vehicle door 66, and shows the volume 50. As the plurality of blocks 92 move into place, the gap 100 and the gap volume 100a, gets displaced, and FIG. 8B shows no gap 100 (see FIG. 8B).

Now referring to FIGS. 9A-9B, FIG. 9A is an illustration of a cross-sectional side view of an embodiment of the volume reduction assembly 90, in the form of the plurality of blocks 92, and shows a vehicle door 66 in a closed position 66a, with a perimeter 125, and with a door seal 122 in a deployed position 122a. FIG. 9A is shown from the view of viewing the vacuum transport tube vehicle 60 (see FIG. 9B) from the door cavity 132 (see FIG. 9B) between the vehicle door 66 (see FIG. 9B) and the station door 68 (see FIG. 9B). FIG. 9A shows the plurality of blocks 92 in the station wall 30, and shows the volume 50, such as a tube volume 50a. FIG. 9A shows a door seal in place stage side view 178a.

FIG. 9B is an illustration of a partial sectional front view of the volume reduction assembly 90 of FIG. 9A, and FIG. 9B shows the plurality of blocks 92 in the block position 170 of a fully deployed position 170c and shows the door seal 122 in a deployed position 122a deployed from a door seal cavity 123. FIG. 9B shows a door seal in place stage front view 178b. FIG. 9B shows the station wall 30, the station vacuum tube 33, the cavities 40 with an interior end 44a, and the vacuum transport tube vehicle 60, such as the vacuum transport tube train 60a. FIG. 9B shows the inner surface 94a, the outer surface 94b, and the volume 50, such as the tube volume 50a. FIG. 9B further shows a passenger 62, the vehicle door 66 in a closed position 66a, the vehicle door outer surface 126a, the vehicle door inner surface 126b, the station door 68 in a closed position 68a, the station door outer surface 127a, the station door inner surface 127b, the door cavity 132 between the vehicle door 66 and the station door 68, the ambient air 52a in the vacuum tube vehicle station 12, the air supply assembly 130, the vent-to vacuum assembly 140, and the volume 50, including the tube volume 50*a* and the door cavity volume 50*b*. To prepare for the eventual opening of the vehicle door 66, the door seal 122 has moved inward, via a door seal control system 124 (see FIG. 3), from the station wall 30 to contact the vehicle outer surface 80, including the vehicle door outer surface 126*a*, of the vehicle door 66. The door seal 122 is shaped to form a seal around the perimeter 125 (see FIG. 9A) of the vehicle door 66.

Figure 10B:
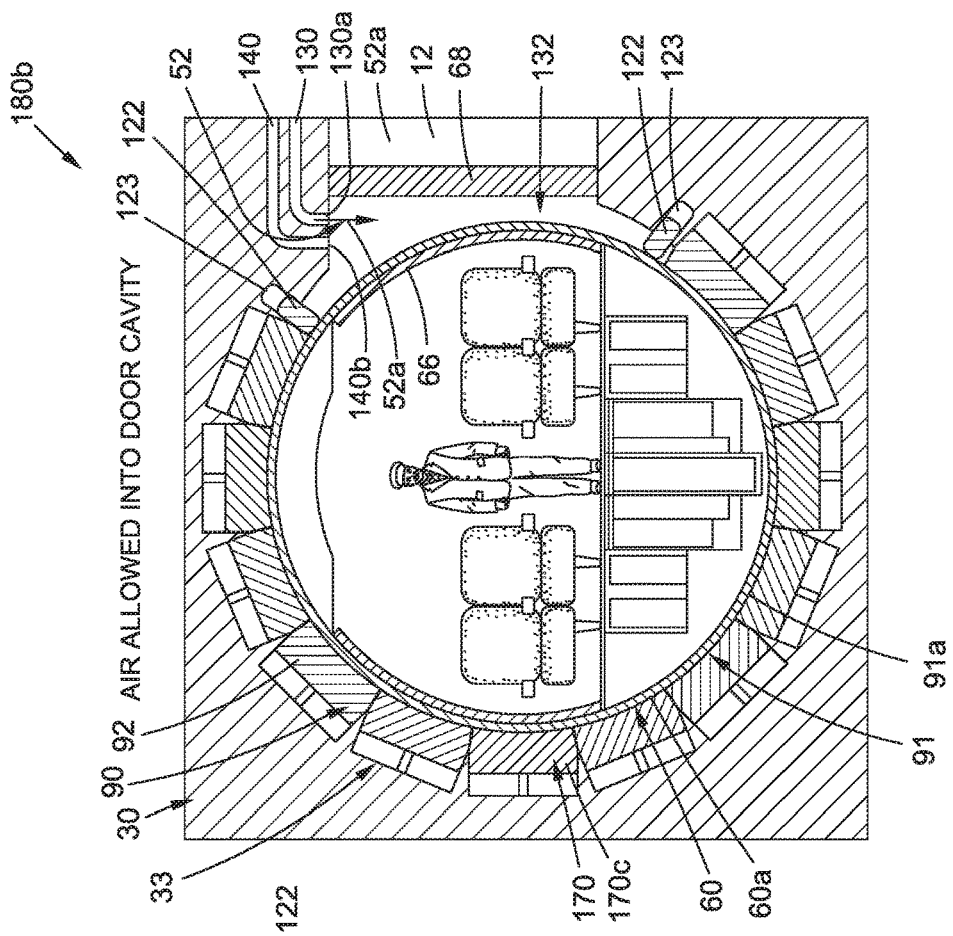
FIG. 10B is an illustration of a partial sectional front view of the volume reduction assembly of FIG. 10A showing air being supplied to a door cavity via an air supply assembly.
Figure 10A:
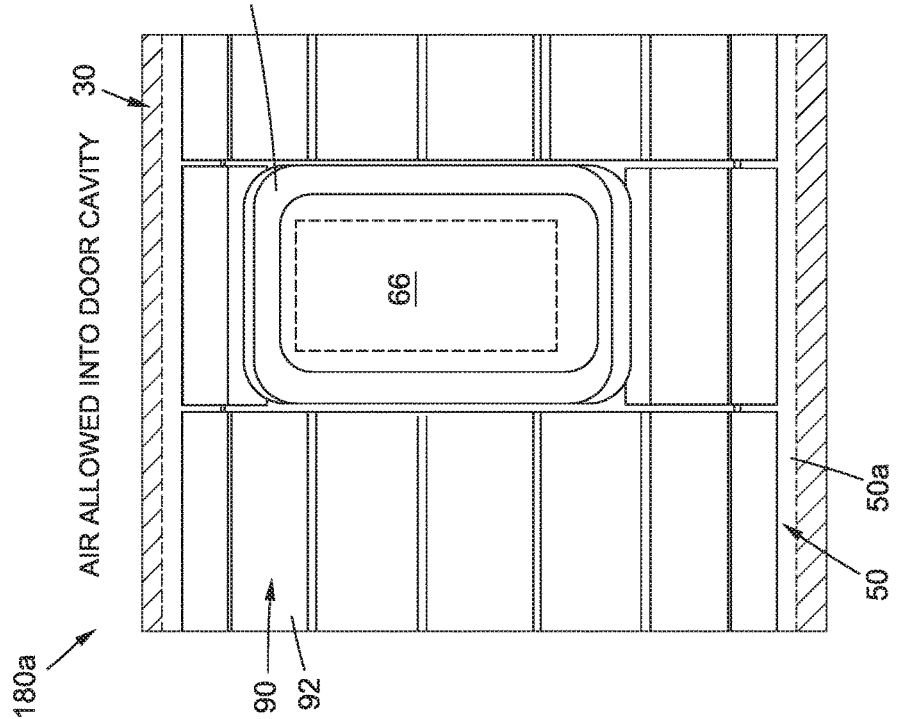
FIG. 10A is an illustration of a cross-sectional side view of an embodiment of the volume reduction assembly in the form of a plurality of blocks and showing a vehicle door.

Now referring to FIGS. 10A-10B, FIG. 10A is an illustration of a cross-sectional side view of an embodiment of the volume reduction assembly 90, in the form of the plurality of blocks 92, and shows the vehicle door 66 with the door seal 122. FIG. 10A is shown from the view of viewing the vacuum transport tube vehicle 60 (see FIG. 10B) from the door cavity 132 (see FIG. 10B) between the vehicle door 66 (see FIG. 10B) and the station door 68 (see FIG. 10B). FIG. 10A shows the plurality of blocks 92 in the station wall 30, and shows the volume 50, such as the tube volume 50*a*. FIG. 10A shows an air allowed into door cavity stage side view 180*a*.

FIG. 10B is an illustration of a partial sectional front view of the volume reduction assembly 90, such as the plurality of blocks 92, of FIG. 10A showing air 52, such as ambient air 52*a*, being supplied to the door cavity 132 via then air supply assembly 130. The supply of ambient air 52*a* may be at ambient pressure. Alternatively, compressed air 52*b* (see FIG. 3) may be supplied to the door cavity 132. If compressed air 52*b* (see FIG. 3) is used, a smaller tube may be used to quickly fill the door cavity 132 (see FIG. 10B). The diameter of each of the supply tube or tubes for the air supply assembly 130 may be designed to minimize noise. FIG. 10B shows an air allowed into door cavity stage front view 180*b*. FIG. 10B further shows the plurality of blocks 92 still in the block position 170 of the fully deployed position 170*c* and shows the door seal 122 deployed from the door seal cavity 123. FIG. 10B shows the station wall 30, the station vacuum tube 33, the vehicle door 66 and the station door 68, the ambient air 52*a* in the vacuum tube vehicle station 12, the air supply assembly 130 in an open position 130*a*, the vent-to vacuum assembly 140 in a closed position 130*b*, and the plurality of blocks 92 forming a seal 91 in a sealed engagement 91*a* with the vacuum transport tube vehicle 60, such as the vacuum transport tube train 60*a*. Alternately, the plurality of blocks 92 may engage around the outer vehicle surface 80 in close or near proximity, such as ⅛ inch or ¼ inch distance away, or another suitable proximate distance away.

Figure 11B:
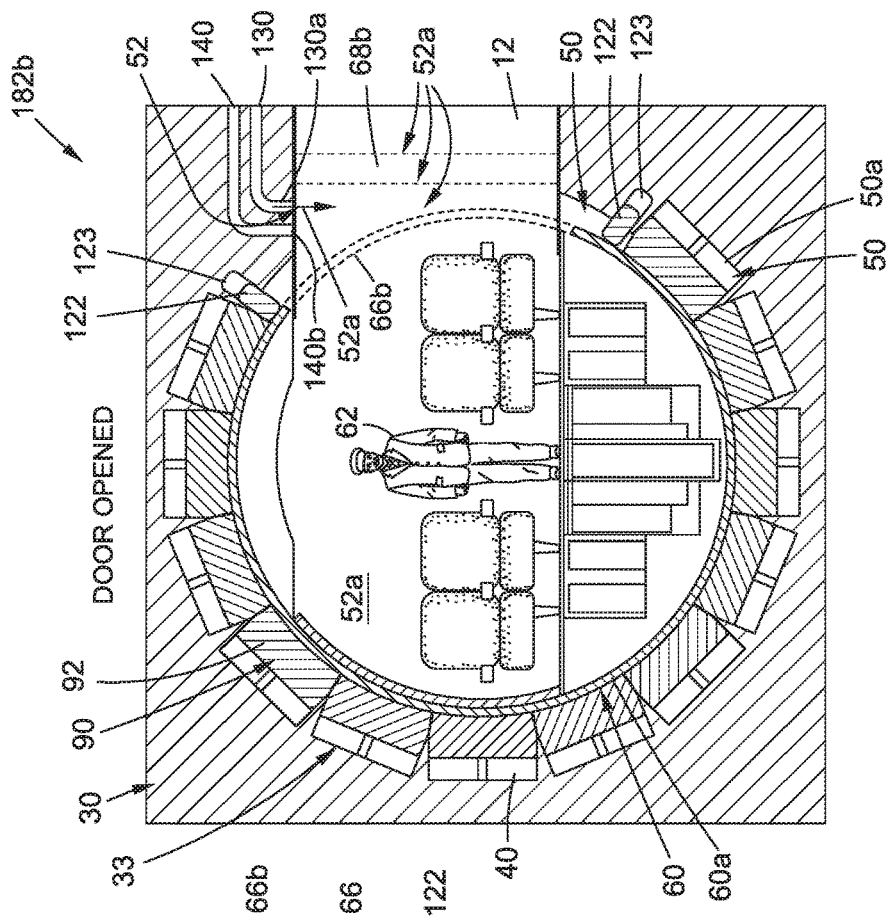
FIG. 11B is an illustration of a partial sectional front view of the volume reduction assembly of FIG. 11A showing the vehicle door in the opened position.
Figure 11A:
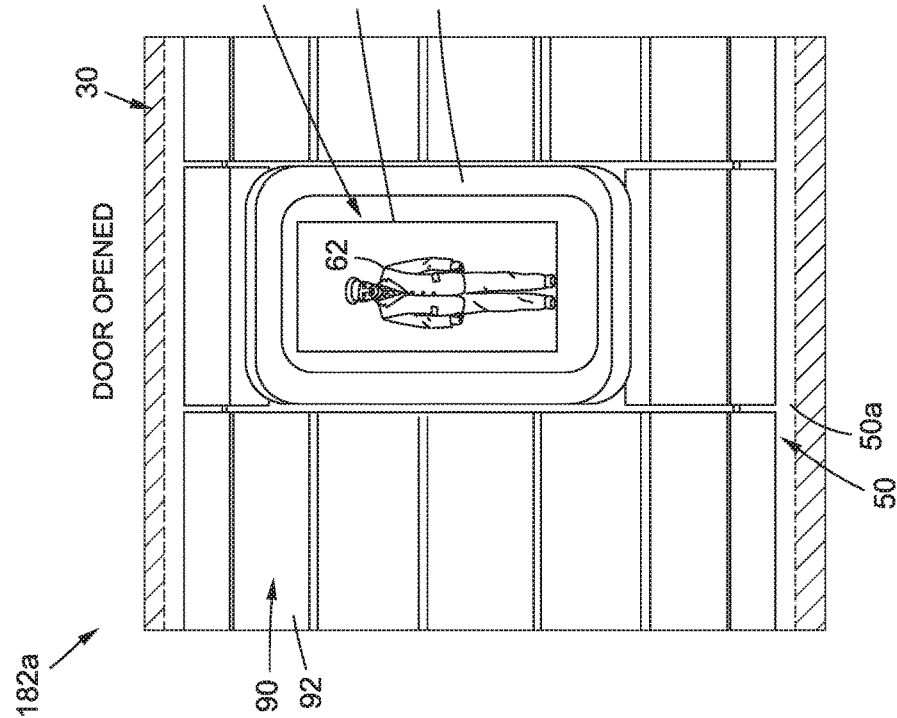
FIG. 11A is an illustration of a cross-sectional side view of an embodiment of the volume reduction assembly in the form of a plurality of blocks and showing a vehicle door in an opened position.

Now referring to FIGS. 11A-11B, FIG. 11A is an illustration of a cross-sectional side view of an embodiment of the volume reduction assembly 90, in the form of the plurality of blocks 92 and shows the vehicle door 66 in an opened position 66*b* with a passenger 62 standing in the opened vehicle door 66 and shows the door seal 122 still around the vehicle door 66. FIG. 11A is shown from the view of viewing the vacuum transport tube vehicle 60 (see FIG. 11B) from the door cavity 132 (see FIG. 10B) between the vehicle door 66 (see FIG. 10B) now in the opened position 66*b* (see also FIG. 11B) and the station door 68 (see FIG. 10B) now in the opened position 68*b* (see FIG. 11B). FIG. 11A shows the plurality of blocks 92 in the station wall 30, and shows the volume 50, such as the tube volume 50*a*. FIG. 9A shows a door opened stage side view 182*a*.

FIG. 11B is an illustration of a partial sectional front view of the volume reduction assembly 90, such as the plurality of blocks 92, of FIG. 11A, and shows the vehicle door 66 (see FIG. 66) in the opened position 66*b*. The plurality of blocks 92 are still in the fully deployed position 170*c* (see FIG. 10B). FIG. 11B shows a door opened stage front view 182*b*. FIG. 11B shows the station wall 30, the station vacuum tube 33, the cavities 40, the vacuum transport tube vehicle 60, such as the vacuum transport tube train 60*a*, and the volume 50, such as the tube volume 50*a*. FIG. 11B further shows the ambient air 52*a* in the cabin 76*a* (see FIG. 8B), and ambient air 52*a* in the vacuum tube vehicle station 12 which may flow and mix with the air in the door the door cavity 132 (see FIG. 10B), which is now open, and into the vacuum transport tube vehicle 60, which is now open. FIG. 11B further shows the air supply assembly 130 in the open position 130*a* and shows the air supply assembly 130 supplying air 52, such as ambient air 52*a*, to the door cavity 132 (see FIG. 10B) and to inside the vacuum transport tube vehicle. 60. FIG. 11B further shows the vent-to vacuum assembly 140 in the closed position 140*b*, the door seal 122 still deployed from the door seal cavity 123, and shows the volume 50, including the tube volume 50*a*. FIG. 11B shows that after the pressure in the door cavity 132 (see FIG. 10B) is at ambient pressure, the vehicle door 66 (see FIG. 11A) may be opened.

Now referring to FIGS. 12A-12B, FIG. 12A is an illustration of a cross-sectional side view of an embodiment of the volume reduction assembly 90, in the form of the plurality of blocks 92 and shows the vehicle door 66 in a closed position 66*a* and shows the door seal 122 still around the vehicle door 66. FIG. 12A is shown from the view of viewing the vacuum transport tube vehicle 60 (see FIG. 12B) from the door cavity 132 (see FIG. 12B) between the vehicle door 66 (see FIG. 12B) now in the closed position 66*a* (see also FIG. 12B) and the station door 68 (see FIG. 10B) now in the closed position 68*a* (see FIG. 12B). FIG. 12A shows the plurality of blocks 92 in the station wall 30, and shows the volume 50, such as the tube volume 50*a*. FIG. 12A shows a door closed stage side view 184*a*.

FIG. 12B is an illustration of a partial sectional front view of the volume reduction assembly 90, such as the plurality of blocks 92, of FIG. 12A showing the vehicle door 66 in the closed position 66*a*, and shows the stage after passengers 62 (see FIG. 11B) have exited and/or entered the vacuum transport tube vehicle 60. FIG. 12B shows a door closed stage front view 184*b*. FIG. 12B shows the station wall 30, the station vacuum tube 33, the cavities 40, the vacuum transport tube vehicle 60, such as the vacuum transport tube train 60*a*, and the volume 50, such as the tube volume 50*a*. FIG. 12B further shows the ambient air 52*a* in the vacuum tube vehicle station 12 and in the door cavity 132 between the vehicle door 66 which is in the closed position 66*a* and the station door 68 which is in the closed position 68*a*. FIG. 11B further shows the air supply assembly 130 and the vent-to vacuum assembly 140, the door seal 122 still deployed from the door seal cavity 123, and shows the plurality of blocks 92 still in the block position 170 of the fully deployed position 170*c*.

Figure 13B:
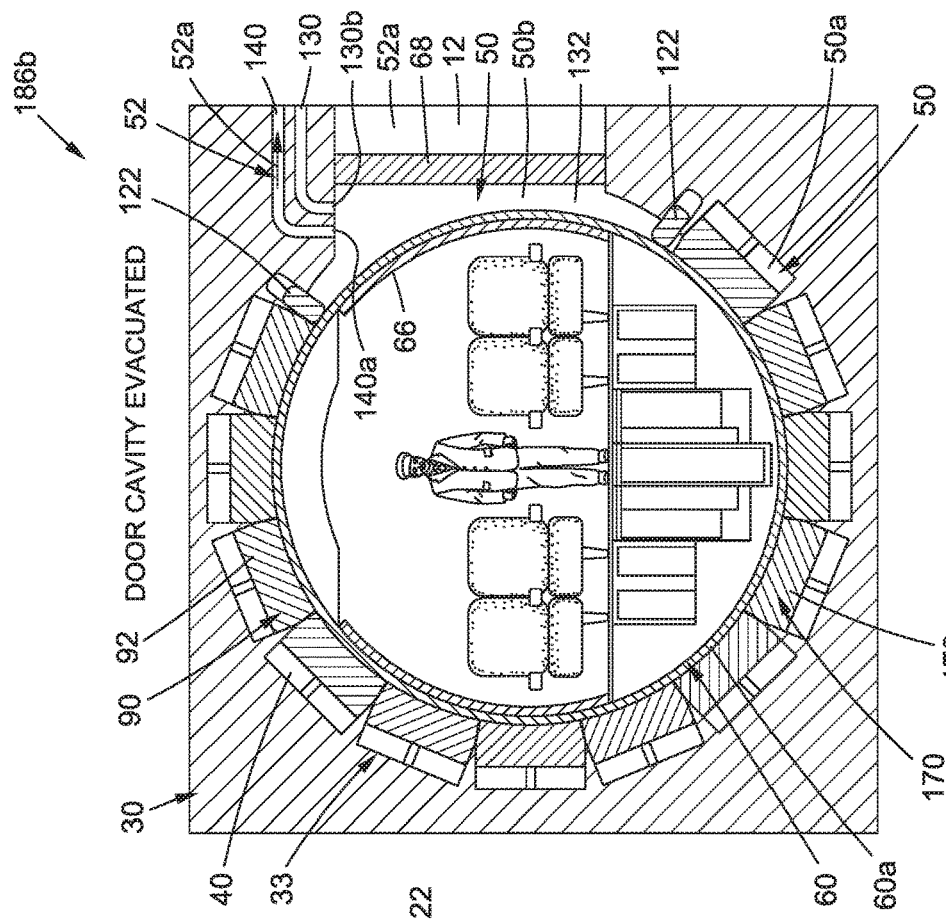
FIG. 13B is an illustration of a partial sectional front view of the volume reduction assembly of FIG. 13A showing the vehicle door in the closed position and showing air being evacuated from the door cavity via a vent-to-vacuum assembly.
Figure 13A:
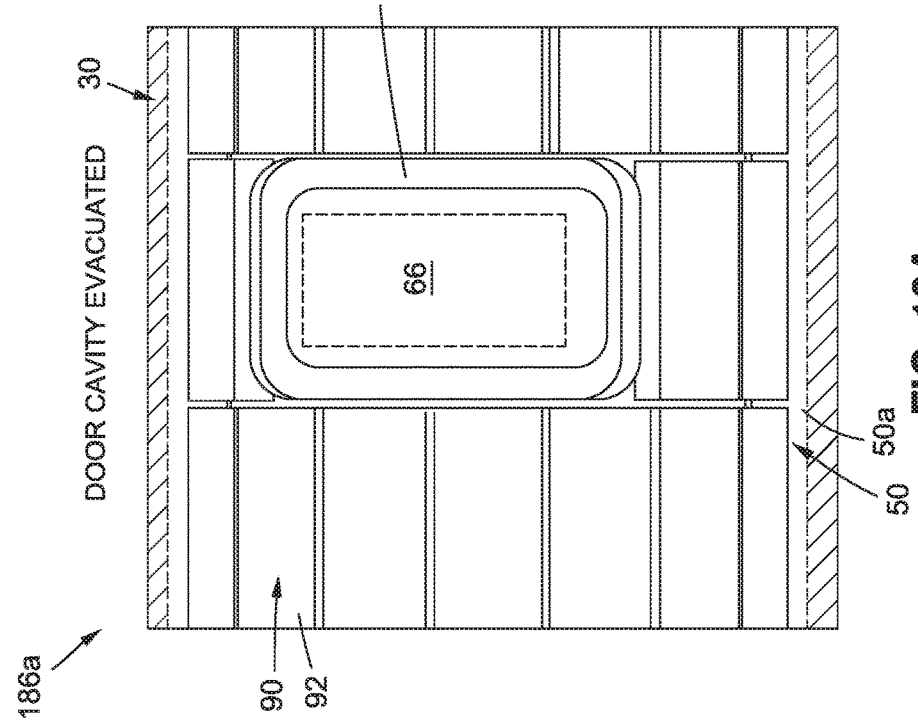
FIG. 13A is an illustration of a cross-sectional side view of an embodiment of the volume reduction assembly in the form of a plurality of blocks and showing a vehicle door in a closed position.

Now referring to FIGS. 13A-13B, FIG. 13A is an illustration of a cross-sectional side view of an embodiment of the volume reduction assembly 90, in the form of the plurality of blocks 92, and shows the vehicle door 66 with the door seal 122. The vehicle door 66 is still in the closed position 66*a* (see FIG. 12A). FIG. 13A is shown from the view of viewing the vacuum transport tube vehicle 60 (see FIG. 13B) from the door cavity 132 (see FIG. 13B) between the vehicle door 66 (see FIG. 13B) now in the closed position 66*a* (see also FIG. 12B) and the station door 68 (see FIG. 13B) now in the closed position 68*a* (see FIG. 12B). FIG. 13A shows the plurality of blocks 92 in the station wall 30, and shows the volume 50, such as the tube volume 50a. FIG. 13A shows a door cavity evacuated stage side view 186a.

FIG. 13B is an illustration of a partial sectional front view of the volume reduction assembly 90, such as the plurality of blocks 92, of FIG. 13A showing the vehicle door 66 in the closed position (see FIG. 12B), and showing the air 52, such as ambient air 52a, being evacuated from the door cavity 132 via the vent-to-vacuum assembly 140. As shown in FIG. 13B, the vent-to-vacuum assembly 140 is in the open position 140a, and the air supply assembly 130 is in the closed position 130b. FIG. 13B shows a door cavity evacuated stage front view 186b. FIG. 13B shows the station wall 30, the station vacuum tube 33, the cavities 40, the vacuum transport tube vehicle 60, such as the vacuum transport tube train 60a, and the volume 50, such as the tube volume 50a and the door cavity volume 50b. FIG. 13B further shows the ambient air 52a in the vacuum tube vehicle station 12, the station door 68, the door seal 122 still deployed from the door seal cavity 123, and shows the plurality of blocks 92 still in the block position 170 of the fully deployed position 170c.

Figure 14B:
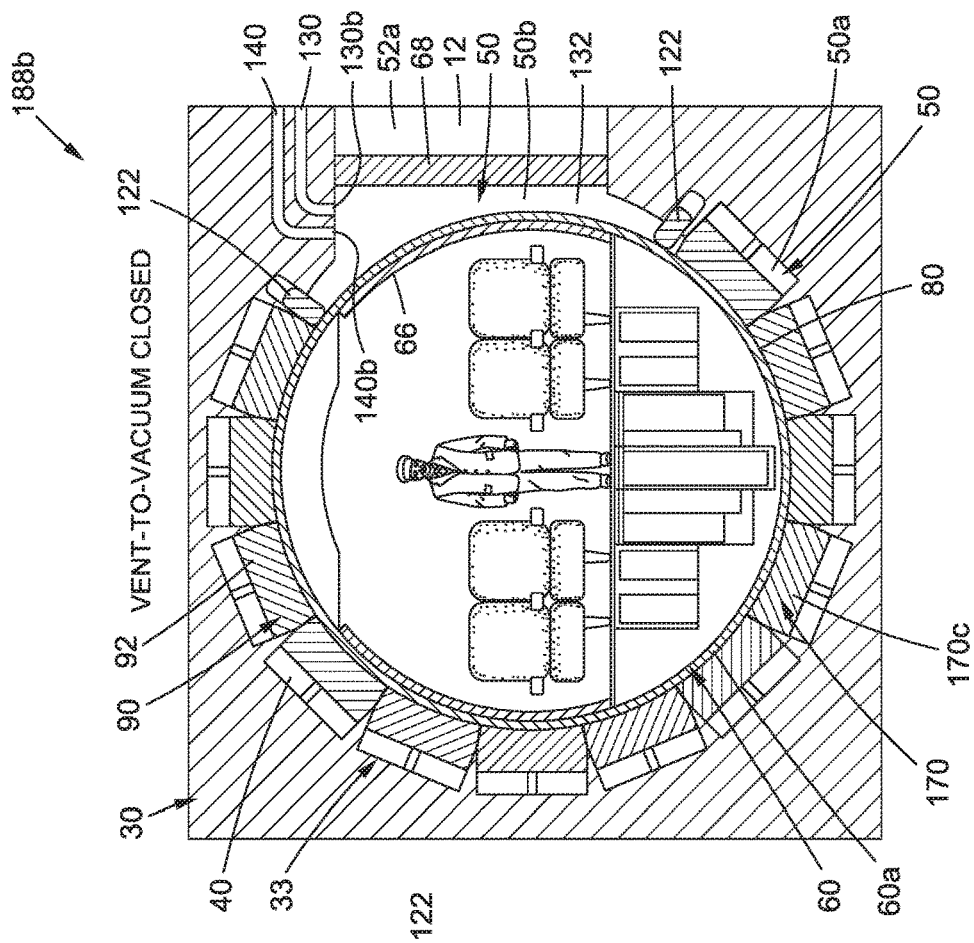
FIG. 14B is an illustration of a partial sectional front view of the volume reduction assembly of FIG. 14A showing the vehicle door in the closed position and showing the vent-to-vacuum assembly closed.
Figure 14A:
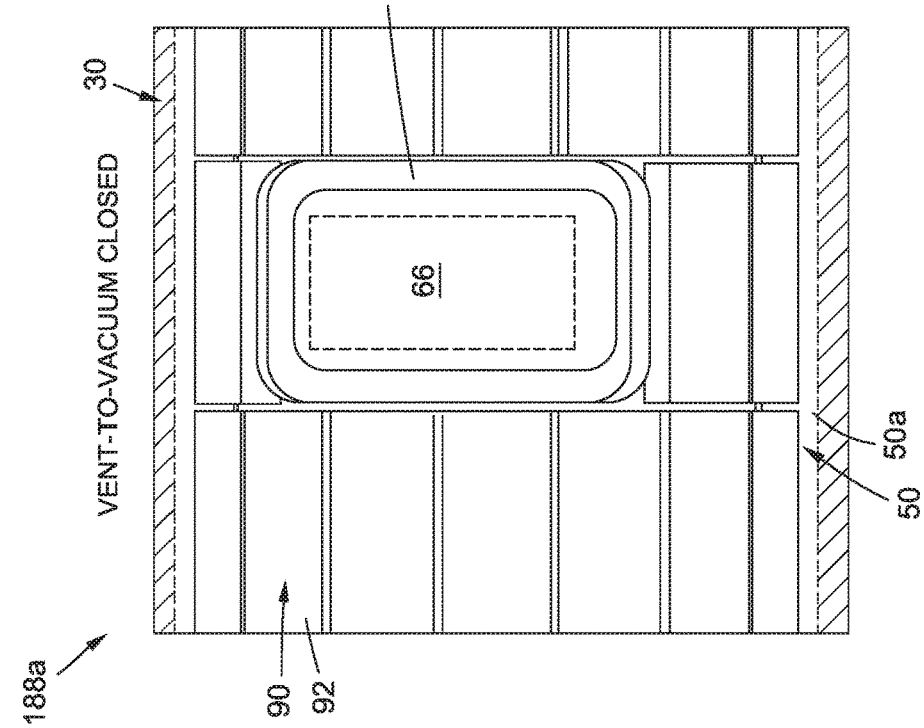
FIG. 14A is an illustration of a cross-sectional side view of an embodiment of the volume reduction assembly in the form of a plurality of blocks and showing a vehicle door in a closed position.

Now referring to FIGS. 14A-14B, FIG. 14A is an illustration of a cross-sectional side view of an embodiment of the volume reduction assembly 90 in the form of the plurality of blocks 92, and shows the vehicle door 66 with the door seal 122. The vehicle door 66 is in the closed position 66a (see FIG. 12A). FIG. 14A is shown from the view of viewing the vacuum transport tube vehicle 60 (see FIG. 14B) from the door cavity 132 (see FIG. 14B) between the vehicle door 66 (see FIG. 14B) and the station door 68 (see FIG. 14B). FIG. 14A shows the plurality of blocks 92 in the station wall 30, and shows the volume 50, such as the tube volume 50a. FIG. 14A shows a vent-to-vacuum closed stage side view 188a.

FIG. 14B is an illustration of a partial sectional front view of the volume reduction assembly 90, such as the plurality of blocks 92, of FIG. 14A, showing the vehicle door 66, which is still in the closed position 66a (see FIG. 12B) and shows the vent-to-vacuum assembly 140 in now in the closed position 140b, after the door cavity 132 has been evacuated to a desired vacuum quality 51a (see FIG. 3). The air supply assembly 130 (see FIG. 14B) is in the closed position 130b (see FIG. 14B). FIG. 14B shows a vent-to-vacuum closed stage front view 188b. FIG. 14B shows the station wall 30, the station vacuum tube 33, the cavities 40, the vacuum transport tube vehicle 60, such as the vacuum transport tube train 60a, and the volume 50, such as the tube volume 50a and the door cavity volume 50b. FIG. 14B further shows the ambient air 52a in the vacuum tube vehicle station 12, the station door 68, the door seal 122 still deployed from the door seal cavity 123 (see FIG. 13B), and shows the plurality of blocks 92 still in the block position 170 of the fully deployed position 170c.

Now referring to FIGS. 15A-15B, FIG. 15A is an illustration of a cross-sectional side view of an embodiment of the volume reduction assembly 90 in the form of the plurality of blocks 92 and shows the vehicle door 66 with the door seal 122. The vehicle door 66 (see FIG. 15A) is in the closed position 66a (see FIG. 12A). FIG. 15A is shown from the view of viewing the vacuum transport tube vehicle 60 (see FIG. 15B) from the door cavity 132 (see FIG. 15B) between the vehicle door 66 (see FIG. 15B) and the station door 68 (see FIG. 15B). FIG. 15A shows the plurality of blocks 92 in the station wall 30, and shows the volume 50, such as the tube volume 50a. FIG. 15A shows a blocks partially retracted stage side view 190a.

FIG. 15B is an illustration of a partial sectional front view of the volume reduction assembly 90, such as the plurality of blocks 92, of FIG. 15A, showing the plurality of blocks 92 in the block position 170 of a partially retracted position 170d. FIG. 15B shows a blocks partially retracted stage front view 190b. At this stage, the volume 50 (see FIG. 15B), such as the tube volume 50a, which is part of the station volume 50c (see FIG. 3), is opened to high vacuum.

The air supply assembly 130 (see FIG. 15B) is in the closed position 130b (see FIG. 14B), and the vent-to-vacuum 140 (see FIG. 15B) is in the closed position 140b (see FIG. 14B). FIG. 15B shows the station wall 30, the station vacuum tube 33, the cavities 40, the vacuum transport tube vehicle 60, such as the vacuum transport tube train 60a, and the volume 50, such as the tube volume 50a and the door cavity volume 50b. FIG. 15B further shows the ambient air 52a in the vacuum tube vehicle station 12, the station door 68, the door seal 122 still deployed from the door seal cavity 123. The plurality of blocks 92 (see FIG. 15B) are moved radially outward, so that the inner surface 94a of each block 92 is moved away from the vehicle outer surface 80 (see FIG. 15B) to increase the gap 100 (see FIG. 15B) and decrease the cavity 40 as the outer surface 94b of the block 92 gets closer to the interior end 44a of the cavity 40. At this point, the gap 100 (see FIG. 15B) may be exposed to vacuum. This optional step may be used in case a significant amount of air has escaped past the door seals 122 (see FIG. 15B). The orifice or set of orifices that vent the gap 100 may be one or two vents near the forward end 72a (see FIG. 2A) and the aft end 72b (see FIG. 2A) of the vacuum transport tube vehicle 60 (see FIG. 2A), or they may be distributed longitudinally and radially over the circumference and length of the vacuum tube vehicle station 12 (see FIG. 2A).

It is noted that the sequence of deployment of the plurality of blocks 92 and deployment of the door seal(s) 122 may be deployment of the door seal(s) 122 and then deployment of the blocks 92, or may be deployment of the blocks 92 and then deployment of the door seal(s) 122. It is further noted that the sequence of retraction of the plurality of blocks 92 and retraction of the door seal(s) 122 may be retraction of the door seal(s) and then retraction of the blocks 92, or may be retraction of the blocks 92 and then retraction of the door seal(s) 122.

Now referring to FIGS. 16A-16B, FIG. 16A is an illustration of a cross-sectional side view of an embodiment of the volume reduction assembly 90 in the form of the plurality of blocks 92 and shows the vehicle door 66 and the door seal 122, which at this stage is being retracted. The vehicle door 66 (see FIG. 16A) is in the closed position 66a (see FIG. 12A). FIG. 16A is shown from the view of viewing the vacuum transport tube vehicle 60 (see FIG. 16B) from the door cavity 132 (see FIG. 15B) between the vehicle door 66 (see FIG. 16B) and the station door 68 (see FIG. 16B). FIG. 16A shows the plurality of blocks 92 in the station wall 30, and shows the volume 50, such as the tube volume 50a. FIG. 16A shows a door seal retracted stage side view 192a.

FIG. 16B is an illustration of a partial sectional front view of the volume reduction assembly 92, such as the plurality of blocks 92, of FIG. 16A, showing the door seal 122 in a retracted position 122b back into the door seal cavity 123. FIG. 16B shows the station wall 30, the station vacuum tube 33, the cavities 40, the vacuum transport tube vehicle 60, such as the vacuum transport tube train 60a, and the volume 50, such as the tube volume 50a and the door cavity volume 50b. FIG. 16B further shows the ambient air 52a in the vacuum tube vehicle station 12, the station door 68, the air supply assembly 130, the vent-to-vacuum assembly 140, the vehicle door 66, and the cabin 76a with cabin air 52c. FIG. 16B shows the inner surface 94a of each block 92 moved away from the vehicle outer surface 80 (see FIG. 15B) of the vacuum transport tube vehicle 60, and shows the gap 100 with the gap volume 100a. FIG. 16B further shows the outer surface 94b of the block 92 in relation to the interior end 44a of the cavity 40.

Now referring to FIGS. 17A-17B, FIG. 17A is an illustration of a cross-sectional side view of an embodiment of the volume reduction assembly 90, in the form of the plurality of blocks 92, and shows the vehicle door 66 with the seal 122 in a retracted position 122b. FIG. 17A is shown from the view of viewing the vacuum transport tube vehicle 60 (see FIG. 17B) from the door cavity 132 (see FIG. 17B) between the vehicle door 66 (see FIG. 17B) and the station door 68 (see FIG. 17B). FIG. 17A shows the plurality of blocks 92 in the station wall 30, and shows the volume 50, such as a tube volume 50a. FIG. 17A shows a blocks fully retracted stage side view 194a.

FIG. 17B is an illustration of a partial sectional front view of the volume reduction assembly 90, such as the plurality of blocks 92, of FIG. 17A showing the plurality of blocks 92 in the position 170 of a fully retracted position 170a. The vacuum transport tube vehicle 60 (see FIG. 17B), such as the vacuum transport tube train 60a (see FIG. 17B) is preparing to exit or leave the vacuum tube vehicle station 12, and the blocks 92 are fully retracted. FIG. 17B shows a blocks fully retracted stage front view 194b. FIG. 17B shows the station wall 30, the station vacuum tube 33, the inner surface 94a, the outer surface 94b, and the sides 96 of the blocks 92, and shows the volume 50, such as the tube volume 50a and the door cavity volume 50b. FIG. 17B further shows the ambient air 52a in the vacuum tube vehicle station 12, the station door 68, the air supply assembly 130, the vent-to-vacuum assembly 140, the door cavity 132, the vehicle door 66, a passenger 62, and the door seal 122 in the retracted position 122b. FIG. 17B shows the inner surface 94a of each block 92 moved further away from the vehicle outer surface 80 of the outer vehicle wall 78 of the vacuum transport tube vehicle 60, and shows the gap 100. FIG. 17B further shows the outer surface 94b of the block 92 in relation to the interior end 44a of the cavity 40.

Now referring to FIGS. 18A-18B, FIG. 18A is an illustration of a cross-sectional side view of an embodiment of the volume reduction assembly 90, in the form of the plurality of blocks 92, as the vacuum transport tube vehicle 60 (see FIG. 17B) exits the vacuum tube vehicle station 12 (see FIG. 18B). FIG. 18A is shown from the view of viewing the volume reduction assembly 90 (see FIG. 18B) from the door cavity 132 (see FIG. 18B). FIG. 18A shows the plurality of blocks 92 in the station wall 30, and shows the volume 50, such as a tube volume 50a. FIG. 17A further shows longitudinal gaps 160 between the columns of blocks 92. FIG. 18A shows a vehicle exit stage side view 196a.

FIG. 18B is an illustration of a partial sectional front view of the volume reduction assembly 90, such as the plurality of blocks 92, of FIG. 18A showing the plurality of blocks in the block position 170 of the fully retracted position 170a, when the vacuum transport tube vehicle 60 (see FIG. 17B) has exited the vacuum tube vehicle station 12. FIG. 18B shows a vehicle exit stage front view 196b. FIG. 18B shows the station wall 30, the station vacuum tube 33, the cavities 40, the inner surface 94a, the outer surface 94b, and the sides 96 of the blocks 92, and shows the volume 50, such as the tube volume 50a and the door cavity volume 50b. FIG. 18B further shows the ambient air 52a in the vacuum tube vehicle station 12, the station door 68, the air supply assembly 130, the vent-to-vacuum assembly 140, the door cavity 132, and the door seal 122.

Depending on the location of the vent-to-vacuum assembly 140 (see FIG. 18B) vacuum vents, the vacuum vents may be adjusted. If the vent-to-vacuum assembly 140 vacuum vents are the same vents that evacuated the door cavity 132 (see FIG. 18B), they can remain open while the door seal 122 (see FIG. 18B) is retracted, and as the blocks 92 (see FIG. 18B) are in a partially retracted position 170d (see FIG. 15B).

Now referring to FIG. 19, FIG. 19 is an illustration of a cross-sectional side view of an embodiment of the volume reduction assembly 90, in the form of the plurality of blocks 92 and shows, in another embodiment, the blocks 92 having a plurality of seams 161 between the columns of blocks 92, and having no longitudinal gaps 160, as shown in FIG. 18A, between the columns of blocks 92. FIG. 19 further shows the blocks 92 coupled to the station wall 30 and the volume 50, such as the tube volume 50a. Having longitudinal gaps 160 (see FIG. 18A) between the blocks 92 may facilitate manufacturing them and installing them. Having the plurality of seams 161 may provide improved efficiency of evacuation of the air from the vacuum tube vehicle station 12. For example, if the blocks 92 (see FIG. 5B) are 12.0 inches long, and the longitudinal gaps are 0.1 inches wide, this may allow a vacuum of approximately $10^{-2}$ atmospheres to be present after the blocks 92 (see FIG. 5B) have been retracted. This is improved over evacuating that volume starting at an ambient pressure of 1.0 atmosphere, since it may reduce the required flow rate from 32,800 ft$^3$/min to about 16,400 ft$^3$/min, with a commensurate reduction in pump equipment cost. While this may be improved over evacuating that volume starting at ambient pressure of 1.0 atmosphere, such calculation underscores the importance of removing as much volume as possible for the vacuum equipment to evacuate. Thus, in one embodiment, the blocks 92 (see FIG. 19) may be constructed with the plurality of seams 161 (see FIG. 19) and no longitudinal gaps 160, as shown in FIG. 18A, which may reduce the volume 50 (see FIG. 3) between the station wall 30 (see FIG. 19) and the outer vehicle wall 78 (see FIG. 7B) of the vacuum transport tube vehicle 60 (see FIG. 7B), so that it may effectively be zero.

Now referring to FIGS. 20A-20E, FIGS. 20A-20E show a door cavity volume reduction surface operation process 200 (see FIG. 2A). It may be advantageous to take measures to reduce the volume 50 (see FIG. 3), such as the door cavity volume 50b (see FIGS. 2A, 3). One way to accomplish this is to design the station door 68, such as a curved station door 69 (see FIG. 20A) having one curved side, to contain an inflatable bladder 152 (see FIG. 20) that may occupy the door cavity volume 50b between the station door 68, such as the curved station door 69 (see FIG. 20A) at the vacuum tube vehicle station 12 (see FIG. 20A), and the vehicle door 66 (see FIG. 20A). The inflatable bladder 152 (see FIG. 20) may be attached or contained in the station door 68. When the station door or doors close, for example, similar to elevator doors, the inflatable bladder 152 (see FIG. 20) may be already be in place or position to start the door cavity volume reduction surface operation process 200.

Figure 20A:
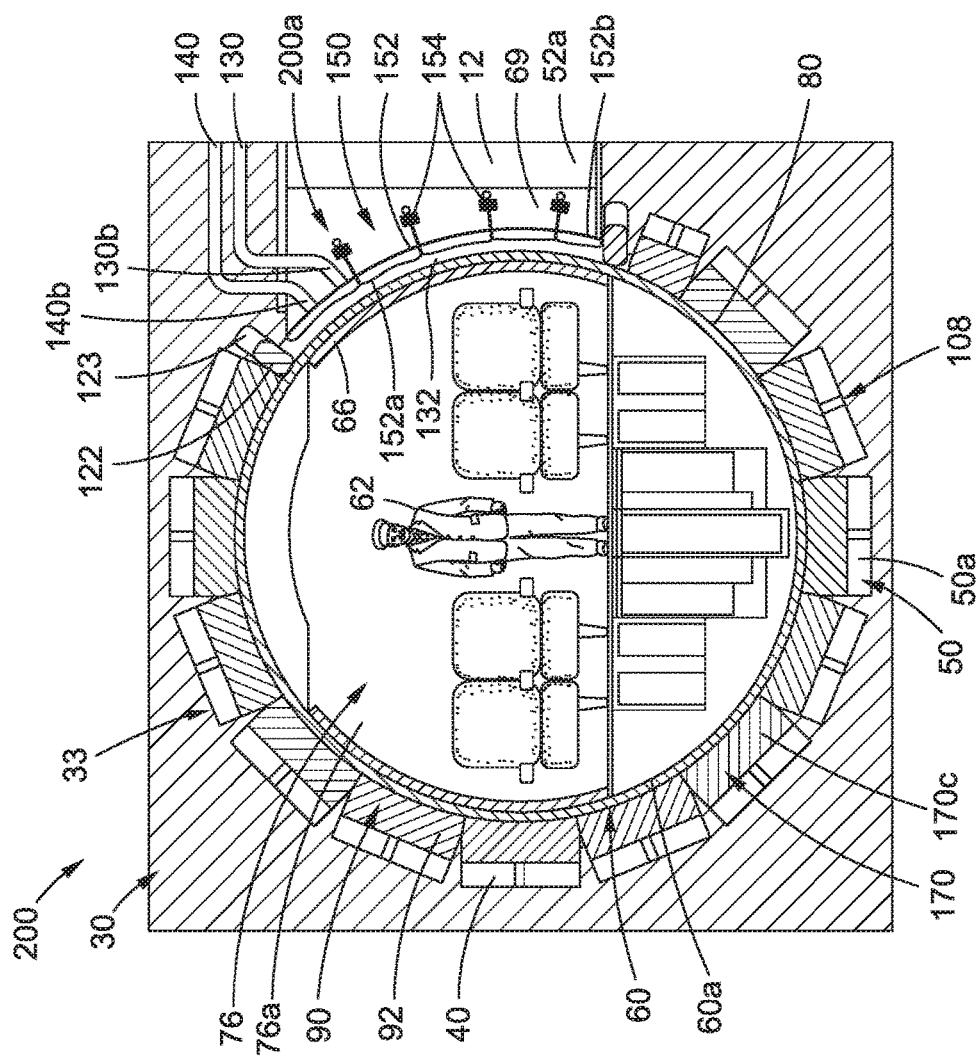
FIG. 20A is an illustration of a partial sectional front view of door cavity volume reduction surface operation process showing an embodiment of a door cavity volume reduction surface in an initial fully retracted inflatable door bladder position.

FIG. 20A is an illustration of a partial sectional front view of the door cavity volume reduction surface operation process 200 showing an embodiment of a door cavity volume reduction surface 150 coupled to a curved station doors 69 and in an initial fully retracted inflatable door bladder position 200a. As shown in FIG. 20A, the door cavity volume reduction surface 150 comprises an inflatable door bladder 152, having a bladder inner surface 152a and a bladder outer surface 152b. As shown in FIG. 20A, the inflatable door bladder 152 is connected to the air supply assembly 130, which preferably supplies compressed air 52b (see FIG. 3) to the inflatable door bladder 152. The air supply assembly 130 inflates the inflatable door bladder 152 to expand toward the one or more vehicle doors 66. FIG. 20A shows the air supply assembly 130 in a closed position 130b.

As further shown in FIG. 20A, the inflatable door bladder 152 is connected to the vent-to-vacuum assembly 140 to deflate the inflatable door bladder 152 to retract from the one or more vehicle doors 66. As further shown in FIG. 20A, the inflatable door bladder 152 is coupled to one or more of, a plurality of spring elements 154, or a plurality of elastic elements 156, to provide a force 157 (see FIG. 3) to retract the inflatable door bladder 152. FIG. 20A shows the vent-to-vacuum assembly 140 in a closed position 140b.

FIGS. 20A-20E show the door cavity volume reduction surface 150 configured, via the door cavity 132, to contact the vehicle outer surface 80 of the vehicle door 66 of the vacuum transport tube vehicle 60, such as the vacuum transport tube train 60a, stopped in the station wall 30, and show the door cavity volume reduction surface 150, such as the inflatable door bladder 152 having the bladder inner surface 152a and the bladder outer surface 152b, connected to the air supply assembly 130, the vent-to-vacuum assembly 140, and the curved station door 69 at the vacuum tube vehicle station 12, and show the station vacuum tube 33.

FIG. 20A further shows the volume reduction assembly 90, such as in the form of the plurality of blocks 92 in the block position 170 such as the fully deployed position 170c, the cavities 40, the control system 108, the interior 76, such as the cabin 76a with a passenger 62, and the vehicle outer surface 80, of the vacuum transport tube vehicle 60, the door seal 122 and door seal cavity 123, the volume 50, such as the tube volume 50a, and the ambient air 52a at the vacuum tube vehicle station 12.

Figure 20B:
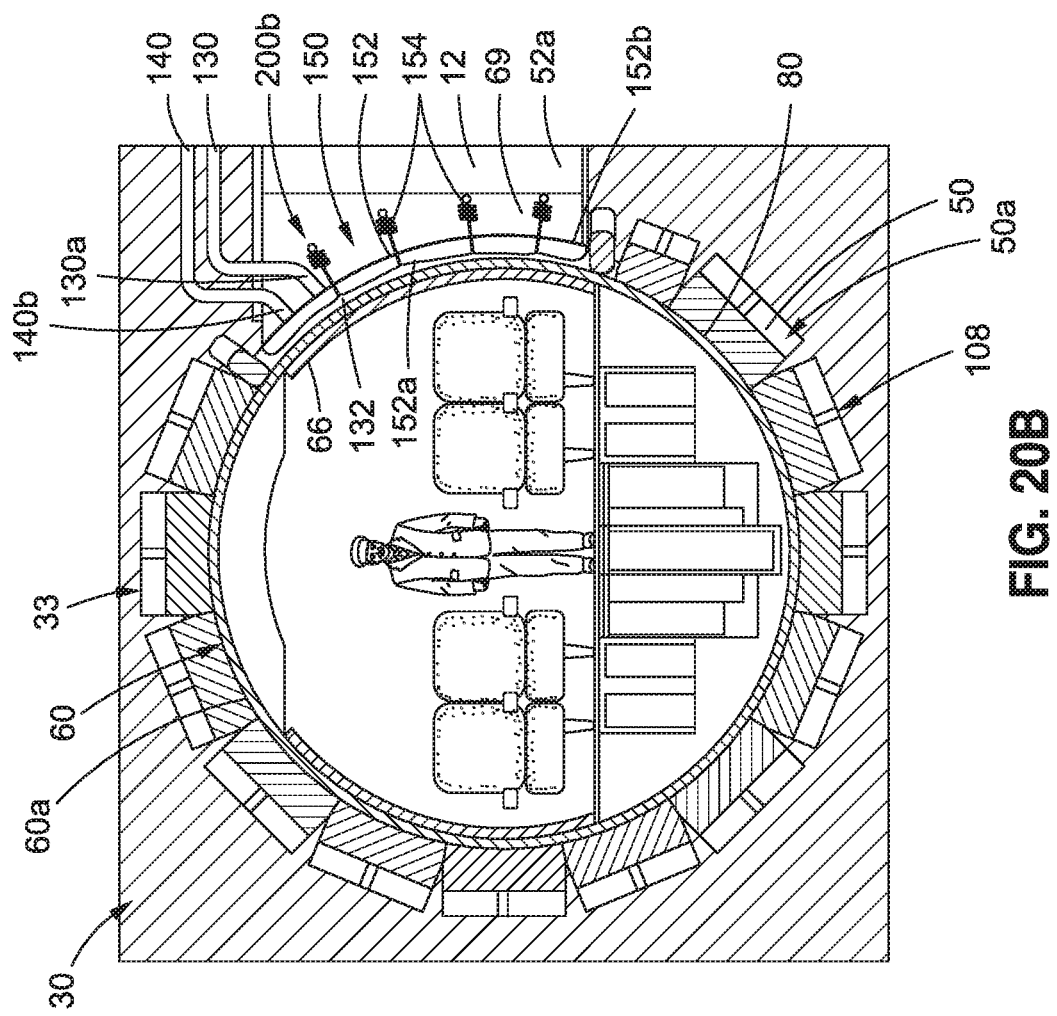
FIG. 20B is an illustration of a partial sectional front view of the door cavity volume reduction surface of FIG. 20A in a partially deployed inflatable door bladder position.

FIG. 20B is an illustration of a partial sectional front view of the door cavity volume reduction surface of FIG. 20A in a partially deployed inflatable door bladder position 200b. As shown in FIG. 20B, the air supply assembly 130 is in an open position 130a and the vent-to-vacuum assembly 140b is in a closed position. The air supply assembly 130 (see FIG. 20B) supplies air 52 (see FIG. 3), such as compressed air 52b (see FIG. 3), to the inflatable door bladder 152, which causes the inflatable door bladder 152 to inflate. This inflation causes the bladder inner surface 152a (see FIG. 20B) to move towards the vehicle door 66 (see FIG. 20B) of the vacuum transport tube vehicle 60 (see FIG. 20B). The pressure of the compressed air is sufficient to overcome the force 157 (see FIG. 3) in the spring elements 154 (see FIG. 20B) or the elastic elements 156 (see FIG. 20B) that would tend to pull the bladder outer surface 152b (see FIG. 20B) in the opposite direction towards the curved station door 69 (see FIG. 20B). FIG. 20B further shows the control system 108, the volume 50, such as the tube volume 50a, and the ambient air 52a at the vacuum tube vehicle station 12.

Figure 20C:
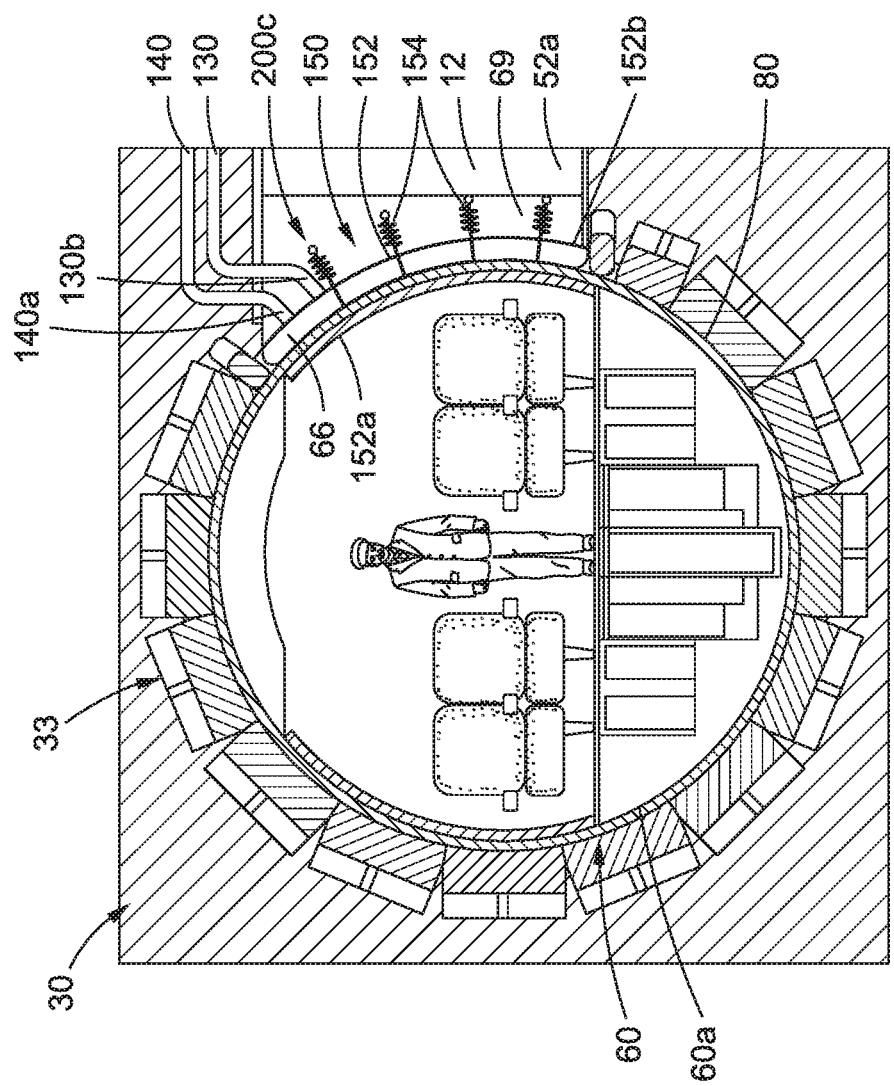
FIG. 20C is an illustration of a partial sectional front view of the door cavity volume reduction surface of FIG. 20A in a fully deployed inflatable door bladder position.

FIG. 20C is an illustration of a partial sectional front view of the door cavity volume reduction surface 150 of FIG. 20A, such as the inflatable door bladder 152, in a fully deployed inflatable door bladder position 200c. FIG. 20C shows the air supply assembly 130 in a closed position 130b and shows the vent-to-vacuum assembly 140 in an open position 140a.

After the inflatable door bladder 152 has completely inflated, so that it contacts the vehicle outer surface 80 of the vehicle door 66, the air supply assembly 130 is closed. At this point, the inflated bladder has displaced the air 52 (see FIG. 3) that was previously in the door cavity 132 (see FIG. 20A) between the curved station door 69 (see FIG. 20C) and the vehicle door 66 (see FIG. 20C). Depending on the design of the inflatable door bladder 152, the percentage of the door cavity volume 50b (see FIG. 3) that has been displaced is approximately 95% (ninety-five percent) to 99% (ninety-nine percent) of the door cavity 132 (see FIG. 20A), leaving a maximum of 5% (five percent) and a minimum of 1% (one percent) of the air 52 (see FIG. 3) in the door cavity 132 (see FIG. 20A).

Figure 20D:
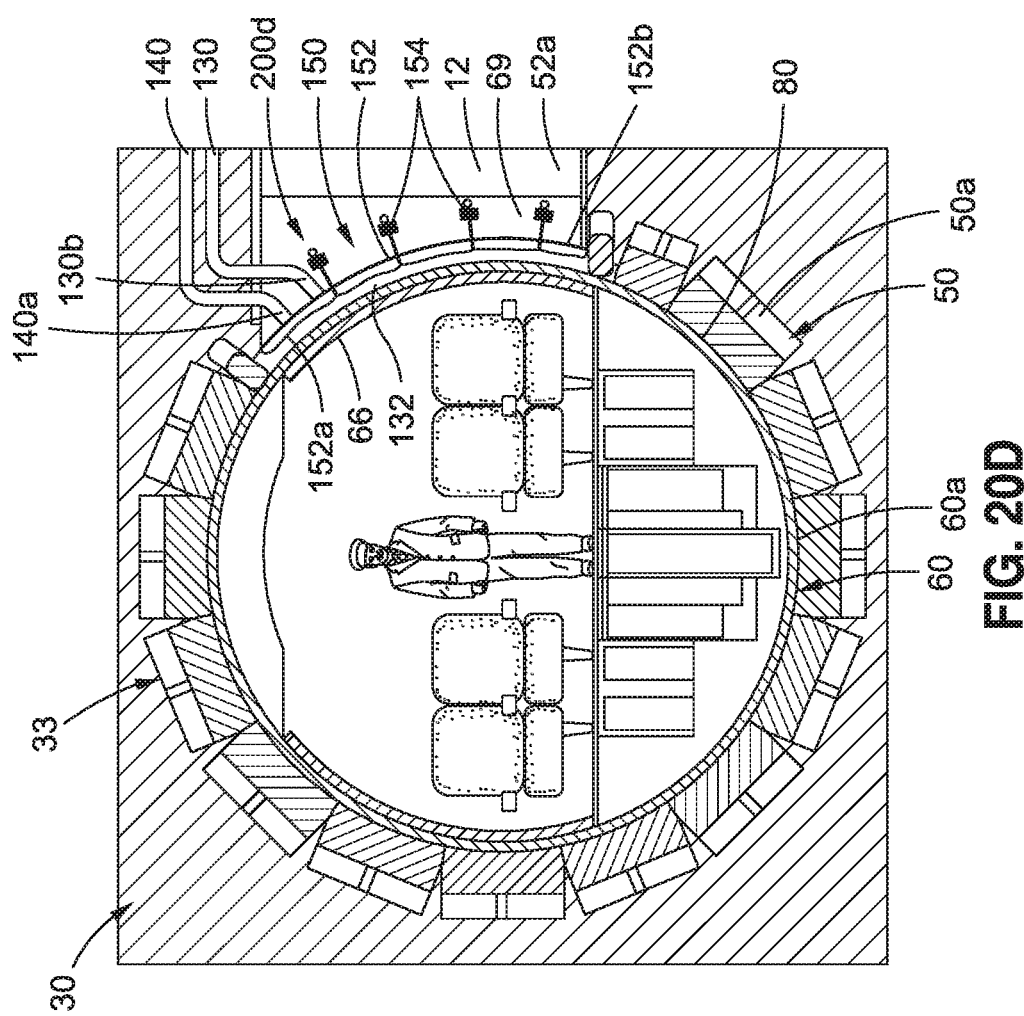
FIG. 20D is an illustration of a partial sectional front view of the door cavity volume reduction surface of FIG. 20A in a partially retracted inflatable door bladder position.

FIG. 20D is an illustration of a partial sectional front view of the door cavity volume reduction surface 150 of FIG. 20A in a partially retracted inflatable door bladder position 200d. FIG. 20D shows the air supply assembly 130 in a closed position 130b and shows the vent-to-vacuum assembly 140 in an open position 140a. In FIG. 20D, the inflatable door bladder 152 is retracting. The vent-to-vacuum assembly 140 (see FIG. 20D) is open, which will allow the air to escape from the inflatable door bladder 152. However, since there is no pressure in the door cavity 132 (see FIG. 20D) between the inflatable door bladder 152 (see FIG. 20D) and the vehicle door 66 (see FIG. 20D), there is no force 157 (see FIG. 3) to push the inflatable door bladder 152 (see FIG. 20D) back. For this reason, the spring elements 154 (see FIG. 20D) or the elastic elements 156 (see FIG. 20D) provide a tension force to pull the bladder outer surface 152b (see FIG. 20D) back to the curved station door 69 (see FIG. 20D). The amount of force needed is likely very modest. The spring elements 154 (see FIG. 20D) or the elastic elements 156 (see FIG. 20D) may be arranged so that they are more or less distributed.

Figure 20E:
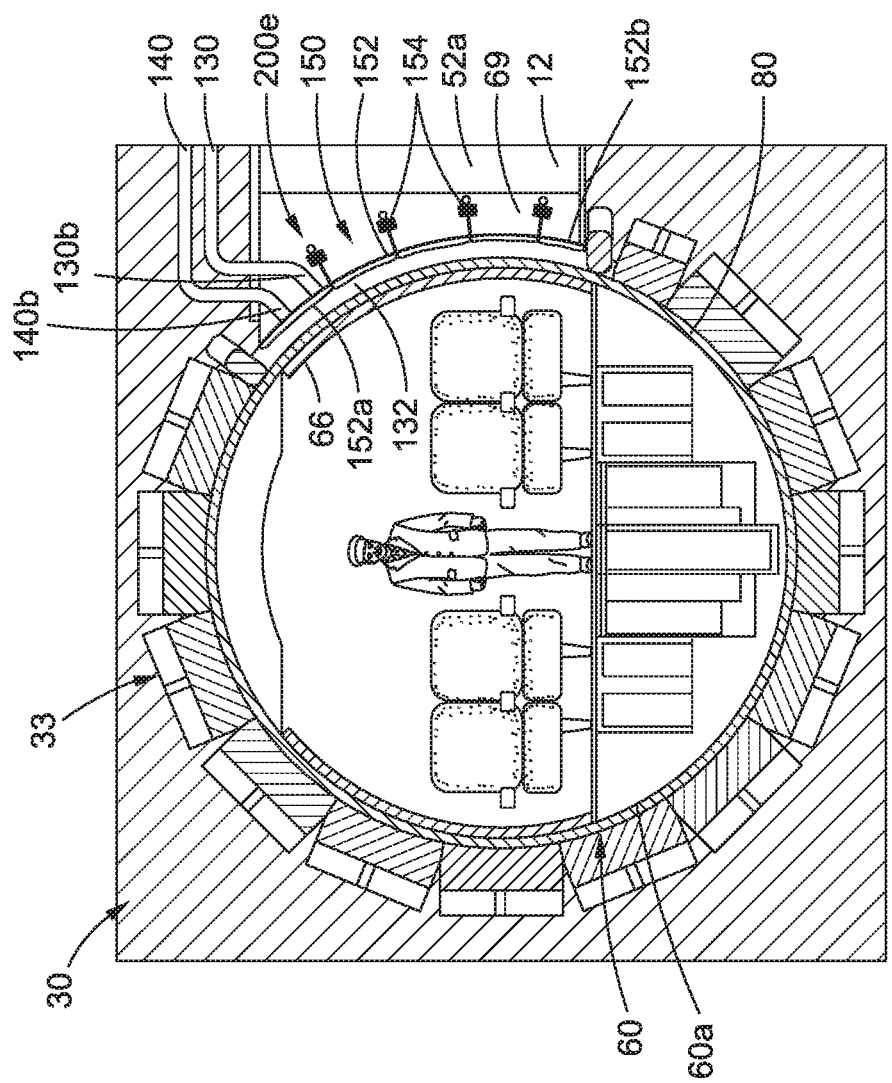
FIG. 20E is an illustration of a partial sectional front view of the door cavity volume reduction surface of FIG. 20A in a final fully retracted inflatable door bladder position.

FIG. 20E is an illustration of a partial sectional front view of the door cavity volume reduction surface 150 of FIG. 20A in a final fully retracted inflatable door bladder position 200e. FIG. 20E shows the air supply assembly 130 in a closed position 130b and shows the vent-to-vacuum assembly 140b in a closed position. The inflatable door bladder 152 (see FIG. 20E) is now in a position to have the cycle repeated.

If the door cavity volume reduction surface 150, such as in the form of inflatable door bladder 152, removes 95% (ninety-five percent), a pumping rate 158 (see FIG. 3) corresponding to ten (10) passenger exits is reduced to 39.9 ft$^3$/min, which significantly reduces the cost of pumping equipment. The following equation shows:

$$Q=(V/t)(\ln(P_0/P_1))=((0.05)(86.7)/1)(\ln(1/0.0001))$$
$$=39.9 \text{ ft}^3/\text{min}$$

If the bladder removes 99% (ninety-nine percent), the pumping rate 158 (see FIG. 3) corresponding to ten (10) passenger exits is reduced to 6.0 ft$^3$/min, which reduces the cost of the pumping equipment even further. The following equation shows:

$$Q=(V/t)(\ln(P_0/P_1))=((0.01)(86.7)/1)(\ln(1/0.0001))=6.0 \text{ ft}^3/\text{min}$$

FIGS. 20A-20E show just one door cavity, but it is likely that each vacuum transport tube vehicle 60 may have more than one entrance/exit. Instead of entering and exiting to just one side, entrances and exits may be present on the other side also. To allow for faster boarding and deboarding times, a vacuum transport tube vehicle may have as many as ten (10), or more, exits. The volume associated with each door cavity may be estimated by the following equation. For a doorway 4.0 ft wide by 6.5 feet high, and a 4 inch gap between the station door 68 (see FIG. 9B) and the vehicle door 66 (see FIG. 9B), the volume of the door cavity is 8.67 feet.

$$V_{door}=(w_{door})(h_{door})(d_{door})=(4.0)(6.5)(0.33)=8.67 \text{ ft}^3$$

Ten (10) entrances/exits would result in a volume per car of 86.7 ft$^3$. The flow rate required per car is then given by the following equation:

$$Q=(V/t)(\ln(P_0/P_1))=(86.7/1)(\ln(1/0.0001))=798.5 \text{ ft}^3/\text{min}$$

Figure 21:
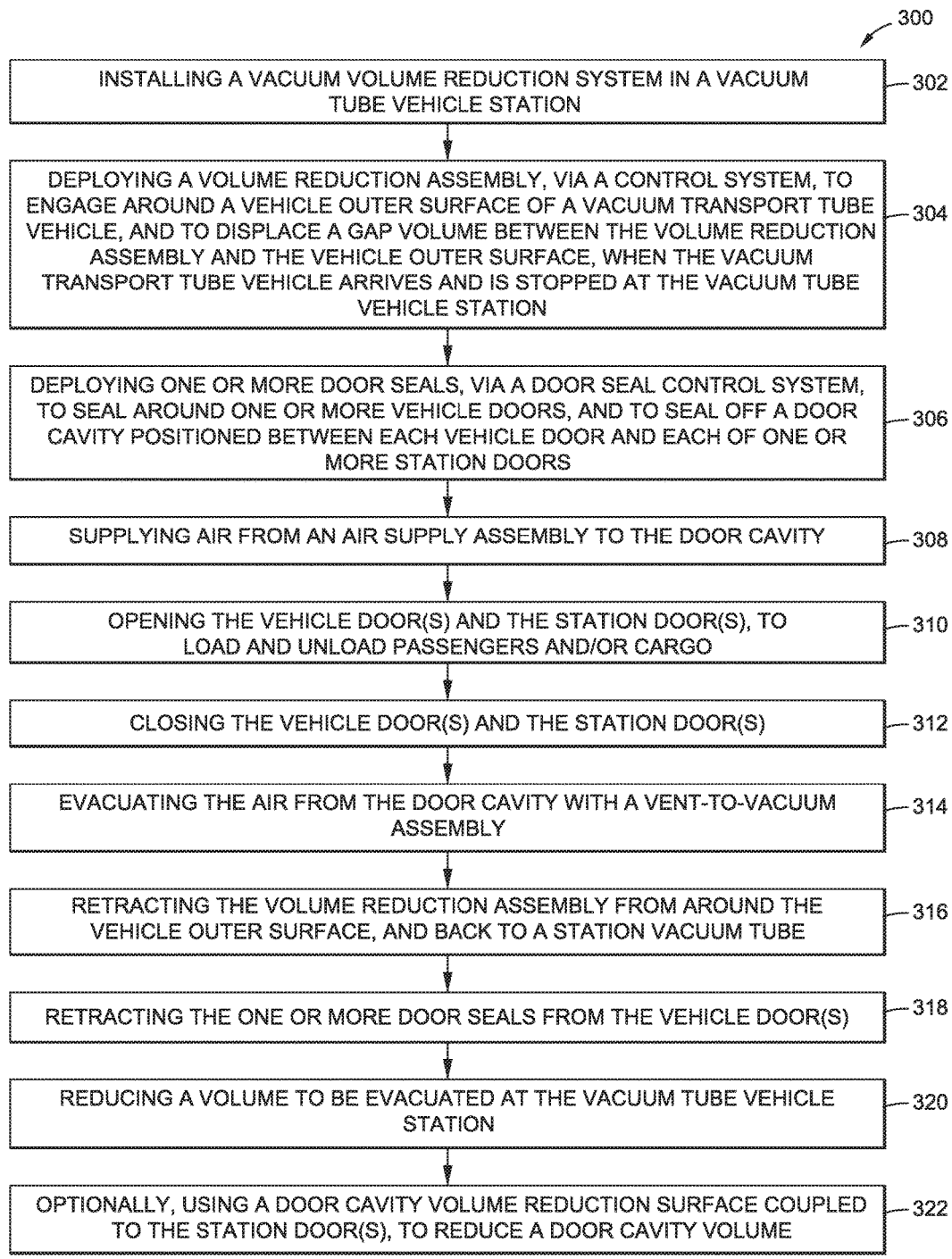
FIG. 21 is an illustration of a flow diagram showing an exemplary embodiment of a method of the disclosure.

Now referring to FIG. 21, FIG. 21 is an illustration of a flow diagram showing an exemplary embodiment of a method 300 of the disclosure. In another embodiment, there is provided the method 300 (see FIG. 21) for reducing a volume 50 (see FIGS. 2A, 3) to be evacuated at a vacuum tube vehicle station 12 (see FIGS. 2A, 3).

As shown in FIG. 21, the method 300 comprises step 302 of installing a vacuum volume reduction system 10 (see FIGS. 2A-2C, 3) in the vacuum tube vehicle station 12. As discussed in detail above, the vacuum volume reduction system 10 (see FIGS. 2A, 3) comprises a station vacuum tube 33 (see FIGS. 2A-2C, 3, 4B) disposed in an interior 31a (see FIG. 2A) of a station wall 30 (see FIG. 2A) of the vacuum tube vehicle station 12 (see FIG. 2A). The station vacuum tube 33 (see FIGS. 2A-2C, 3, 4B) has a tube volume 50a (see FIGS. 2A, 3, 4B).

The step 302 (see FIG. 21) of installing the vacuum volume reduction system 10 (see FIGS. 2A, 3) in the vacuum tube vehicle station 12 (see FIGS. 2A, 3) comprises in one embodiment integrating the volume reduction assembly 90 (see FIGS. 2B-2C) and the station vacuum tube 33 (see FIGS. 2B-2C) comprising a modular station vacuum tube 33a (see FIGS. 2B-2C) to form a modular tube volume reduction assembly 90a (see FIGS. 2B-2C) configured for installation in the station wall 30 (see FIGS. 2A, 4C).

The step 302 (see FIG. 21) of installing the vacuum volume reduction system 10 (see FIGS. 2A, 3) in the vacuum tube vehicle station 12 (see FIGS. 2A, 3) comprises in another embodiment coupling the volume reduction assembly 90 (see FIG. 5B) to the station vacuum tube 33 (see FIGS. 4B, 5B) comprising a built-in station vacuum tube 33b (see FIG. 4B) formed in the station wall 30 (see FIG. 4B).

As discussed in detail above, the vacuum volume reduction system 10 (see FIGS. 2A, 3) further comprises a volume reduction assembly 90 (see FIGS. 2A-2C, 3, 5B) coupled to the station vacuum tube 33 (see FIGS. 2A-2C, 3, 4B). The step 302 (see FIG. 21) of installing the vacuum volume reduction system 10 (see FIGS. 2A, 3) in the vacuum tube vehicle station (12) comprises in one embodiment installing the vacuum volume reduction system 10 (see FIGS. 2A, 3) comprising the volume reduction assembly 90 (see FIGS. 2B-2C, 3, 5B) comprising a plurality of blocks 92 (see FIGS. 2B-2C, 3, 5B) installed in a plurality of cavities 40 (see FIGS. 2B-2C, 3, 5B) that are longitudinally formed around a circumference 42 (see FIGS. 2B, 4B) of the station vacuum tube 33 (see FIGS. 2B, 4B).

The plurality of blocks 92 (see FIGS. 2B-2C, 3, 5B) are preferably comprised of a compliant material 102 (see FIG. 3) that allows the plurality of blocks 92 to deform to match a shape 104 (see FIGS. 3, 5B) of the plurality of cavities 40 (see FIGS. 3, 5B). In one embodiment, each of the plurality of blocks 92 (see FIG. 2C) may comprise a longitudinal one-piece monolithic structure 106 (see FIG. 2C). In another embodiment, each of the plurality of blocks 92 may comprise an extendable portion 99 (see FIG. 2E) that extends to engage around the vehicle outer surface 80 (see FIG. 2E) of the vacuum transport tube vehicle 60 (see FIG. 2E), such as the vacuum transport tube train 60a (see FIG. 2E).

The step 302 (see FIG. 21) of installing the vacuum volume reduction system 10 (see FIGS. 2A, 3) in the vacuum tube vehicle station (12) comprises in another embodiment installing the vacuum volume reduction system 10 (see FIGS. 2A, 3) comprising the volume reduction assembly 90 (see FIG. 2D) comprising one or more inflatable bladders 114 (see FIG. 2D) coupled to the station vacuum tube 33 (see FIG. 2D). As shown in FIG. 2D, the inflatable bladder 114 is used instead of the plurality of blocks 92 (see FIG. 2C) and the inflatable bladder 114 is shown from a deflated position 115a to an inflated position 115b, and is inflated with air 52 from the air supply assembly 130 coupled to the station wall 30 and is deflated with the vent-to-vacuum assembly 140 coupled to the station wall 30.

As discussed in detail above, the vacuum volume reduction system 10 (see FIGS. 2A, 3) further comprises one or more door seals 122 (see FIGS. 3, 9B) coupled to the station wall 30 (see FIG. 9B). As discussed in detail above, the vacuum volume reduction system 10 (see FIGS. 2A, 3) further comprises an air supply assembly 130 (see FIGS. 3, 9B) coupled to the station wall 30 (see FIG. 9B). As discussed in detail above, the vacuum volume reduction system 10 (see FIGS. 2A, 3) further comprises a vent-to-vacuum assembly 140 (see FIGS. 3, 9B) coupled to the station wall 30 (see FIG. 9B).

As shown in FIG. 21, the method 300 further comprises step 304 of deploying the volume reduction assembly 90 (see FIGS. 7B, 8B), via a control system 108 (see FIGS. 7B, 8B), engage around the vehicle outer surface 80 (see FIG. 8B) of the vacuum transport tube vehicle 60 (see FIG. 8B), and to displace a gap volume 100a (see FIG. 7B) between the volume reduction assembly 90 (see FIG. 7B) and the vehicle outer surface 80 (see FIG. 7B), when the vacuum transport tube vehicle 60 (see FIGS. 6B, 7B, 8B) arrives and is stopped at the vacuum tube vehicle station 12 (see FIG. 2A). The volume reduction assembly 90 may form a seal 91 (see FIG. 3) in a sealed engagement 91a (see FIG. 3) around the vehicle outer surface 80 (see FIG. 3), or may engage in close or near proximity, such as ⅛ inch to ¼ inch distance, to the vehicle outer surface 80 (see FIGS. 2A, 3) of the vacuum transport tube vehicle 60.

As shown in FIG. 21, the method 300 further comprises step 306 of deploying the one or more door seals 122, via a door seal control system 124 (see FIG. 3), to seal around a perimeter 125 of each of one or more vehicle doors 66, and to seal off a door cavity 132 positioned between each of the one or more vehicle door 66 and each of one or more station doors 68. As shown in FIG. 21, the method 300 further comprises step 308 of supplying air 52 from the air supply assembly 130 to the door cavity 132. The step 308 (see FIG. 21) of supplying the air 52 from the air supply assembly 130 to the door cavity 132 comprises supplying one of, ambient air 52a, or compressed air 52b, to the door cavity 132.

As shown in FIG. 21, the method 300 further comprises step 310 of opening the one or more vehicle doors 66 and the one or more station doors 68, to load and unload one or more of, passengers 62 and cargo 64, through the one or more vehicle doors 66 and through the one or more station doors 68. As shown in FIG. 21, the method 300 further comprises step 312 of closing the one or more vehicle doors 66, and closing the one or more station doors 68.

As shown in FIG. 21, the method 300 further comprises step 314 of evacuating the air 52, such as the ambient air 52a or compressed air 52b, from the door cavity 132 with the vent-to-vacuum assembly 140, to obtain a desired vacuum quality 51a (see FIG. 3), and closing the vent-to-vacuum assembly 140. The vent-to-vacuum assembly 140 is configured to evacuate the air 52 comprising one of, the ambient air 52a or the compressed air 52b, from the door cavity 132, after the loading and the unloading of one or more of, the passengers 62 and the cargo 64.

As shown in FIG. 21, the method 300 further comprises step 316 of retracting the volume reduction assembly 90, via the control system 108, from around the vehicle outer surface 80 of the vacuum transport tube vehicle 60, back to station vacuum tube 33, such as back to the plurality of cavities 40 of the station vacuum tube 33.

As shown in FIG. 21, the method 300 further comprises step 318 of retracting the one or more door seals 122, via the door seal control system 124 (see FIG. 3), from around each of the one or more vehicle doors 66, back to the station wall 30. As shown in FIG. 21, the method 300 further comprises step 320 of reducing the volume 50 to be evacuated at the vacuum tube vehicle station.

As shown in FIG. 21, the method 300 may further comprise optional step 322 of using a door cavity volume reduction surface 150 (see FIGS. 20A-20E) comprising an inflatable door bladder 152 (see FIGS. 20A-20E) coupled to each of the one or more curved station doors 69 (see FIGS. 20A-20E), to displace a door cavity volume 50b (see FIG. 20A) of the door cavity 132 (see FIG. 20A), to further reduce the volume 50 (see FIG. 20A) to be evacuated at the vacuum tube vehicle station 12 (see FIG. 2A). As shown in FIGS. 20A-20E, the door cavity volume reduction surface 150 comprises an inflatable door bladder 152 coupled to the air supply assembly 130, to inflate the inflatable door bladder 152 to expand toward the one or more curved vehicle doors 69. As further shown in FIGS. 20A-20E, the inflatable door bladder 152 is coupled to the vent-to-vacuum assembly 140, to deflate the inflatable door bladder 152, to retract from the one or more curved vehicle doors 69. As shown in FIGS. 20A-20E, the inflatable door bladder 152 is coupled to one or more of, a plurality of spring elements 154, or a plurality of elastic elements 156, to provide a force 157 (see FIG. 3) to retract the inflatable door bladder 152.

Disclosed embodiments of the vacuum volume reduction system 10 (see FIGS. 2A, 3) and method 300 (see FIG. 21) for reducing a volume 50 (see FIGS. 2A, 3) to be evacuated at a vacuum tube vehicle station 12 (see FIGS. 2A, 3), provide a vacuum volume reduction system 10 within a station vacuum tube 33 (see FIGS. 2A, 3) where the vacuum volume reduction system 10 engages a vacuum transport tube vehicle 60 (see FIGS. 2A, 3) in order to allow for the loading and unloading of passengers 62 (see FIG. 3) and/or cargo 64 (see FIG. 3) into the vacuum transport tube vehicle 60, where the vacuum volume reduction system 10 comprises a volume reduction assembly 90 (see FIGS. 2A, 3) comprising in one embodiment, a plurality of blocks 92 coupled to the station vacuum tube 33 and extending longitudinally along the length of vacuum transport tube vehicle 60, and comprising in another embodiment an inflatable bladder 114 coupled to the station vacuum tube 33. The vacuum volume reduction system 10 (see FIGS. 2A, 3) and method 300 (see FIG. 21) provide a relatively simple method for entering and exiting the vacuum transport tube vehicle 60 (see FIGS. 2A, 3). The vacuum volume reduction system 10 (see FIGS. 2A, 3) and method 300 (see FIG. 21) essentially reduces the volume 50 (see FIGS. 2A, 3) before the vehicle doors 66 (see FIGS. 3, 7B) are opened, thus reducing the volume or space needed to be pressurized or in vacuum, which may make the vacuum volume reduction system 10 (see FIGS. 2A, 3) and method 300 (see FIG. 21) significantly less expensive to operate than known systems and methods using expensive pumping equipment, pressure seals, and airlock arrangements. In addition, if a few of the plurality of blocks 92, such as one or two or three blocks, do not deploy for some reason, and the other blocks 92 still deploy, it may not be detrimental to the operation of the vacuum volume reduction system 10 (see FIGS. 2A, 3), as pumping equipment, such as the size of the plenums of the air supply assembly 130 and/or vent-to-vacuum assembly 140, may be sized accordingly to take into account any possible issues or leaks. The plurality of blocks 92 (see FIG. 5B) that move radially inward from the station vacuum tube 33 to the vacuum transport tube vehicle 60, and back again, may significantly reduce the volume of the station enclosure, thus reducing or eliminating the pumping requirements. Reduction in volume may preferably result in reduced pumping requirements. Such plurality of blocks 92 (see FIG. 5B), or inflatable bladders 114 (see FIG. 2D), are shaped to conform to the vehicle outer surface 80 (see FIG. 2A) of the vacuum transport tube vehicle 60 (see FIG. 2A) to displace the volume 50 (see FIGS. 2A, 3), such as the gap volume 100a (see FIGS. 6B, 7B), between the station wall 30 (see FIGS. 6B, 7B) and the vehicle outer wall 80 (see FIGS. 6B, 7B), thus greatly reducing or substantially eliminating the volume 50 (see FIGS. 2A, 3) to be evacuated at the vacuum tube vehicle station (see FIG. 2A).

Moreover, disclosed embodiments of the vacuum volume reduction system 10 (see FIGS. 2A, 3) and method 300 (see FIG. 21) may minimize leakage 164 (see FIG. 3) of air from the surrounding ambient atmosphere into the station vacuum tube 33 (see FIGS. 2A, 3) and the vacuum tube 16 (see FIG. 2A), which, in turn, may result in less pumping capacity required to maintain a desired vacuum quality 51a (see FIG. 3) in the station vacuum tube 33 (see FIGS. 2A, 3) and/or the vacuum tube 16 (see FIG. 2A). In addition, the vacuum volume reduction system 10 (see FIGS. 2A, 3) and method 300 (see FIG. 21) may reduce the cost to maintain the vacuum inside the tube or tubes at the vacuum tube vehicle station 12 (see FIG. 2A). Further, the vacuum volume reduction system 10 (see FIGS. 2A, 3) and method 300 (see FIG. 21) may provide for improved safety because there is no large chamber with zero pressure for air to be drawn into if there is a leak or another issue with a seal. For example, the inclusion and use of the volume reduction assembly 90, such as the plurality of blocks 92, may eliminate any possible large vacuum to which the air may flow into, and may avoid or greatly minimize a large flow of air if a leak occurs.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation. Any claimed embodiment of the disclosure does not necessarily include all of the embodiments of the disclosure.

What is claimed is:

1. A vacuum volume reduction system for reducing a volume to be evacuated at a vacuum tube vehicle station, the vacuum volume reduction system comprising:
   a station vacuum tube disposed in an interior of a station wall of the vacuum tube vehicle station, the station vacuum tube having a tube volume;

a volume reduction assembly coupled to the station vacuum tube, the volume reduction assembly having a control system for radially moving the volume reduction assembly to and from a vehicle outer surface of a vacuum transport tube vehicle at the vacuum tube vehicle station, to engage around the vehicle outer surface, for loading and unloading of one or more of, passengers and cargo, through one or more vehicle doors of the vacuum transport tube vehicle and through one or more station doors of the vacuum tube vehicle station;

one or more door seals coupled to the station wall, and configured to surround a perimeter of, and to seal, each of the one or more vehicle doors, and to seal off a door cavity having a door cavity volume;

an air supply assembly coupled to the station wall, and configured to supply air to the door cavity; and a vent-to-vacuum assembly coupled to the station wall, and configured to evacuate the air from the door cavity, wherein the vacuum volume reduction system displaces the tube volume between the station wall and the vehicle outer surface, and in turn, reduces the volume to be evacuated at the vacuum tube vehicle station.

2. The system of claim 1 further comprising a door seal control system coupled to the one or more door seals, the door seal control system configured to move the one or more door seals between the station wall and the vehicle outer surface of the vacuum transport tube vehicle.

3. The system of claim 1 wherein the one or more door seals are deployed from and retracted into a door seal cavity formed in the station wall.

4. The system of claim 1 wherein the station vacuum tube is a modular station vacuum tube that is integrated with the volume reduction assembly, to form a modular tube volume reduction assembly configured for installation in the station wall.

5. The system of claim 1 further comprising a liner element coupled to the interior of the station wall, the liner element disposed between the interior of the station wall and an outer surface of the station vacuum tube.

6. The system of claim 1 wherein the volume reduction assembly comprises a plurality of blocks installed in a plurality of cavities longitudinally formed around a circumference of the station vacuum tube, the plurality of blocks configured to move to reduce a gap volume formed between the plurality of blocks and the vehicle outer surface, for the loading and the unloading of one or more of, the passengers and the cargo, through the one or more vehicle doors and through the one or more station doors.

7. The system of claim 6 wherein the plurality of blocks are comprised of a compliant material that allows the plurality of blocks to deform to match a shape of the plurality of cavities.

8. The system of claim 6 wherein each of the plurality of blocks is a longitudinal one-piece monolithic structure.

9. The system of claim 6 wherein each of the plurality of blocks comprises an extendable portion that extends to the vehicle outer surface to engage around the vehicle outer surface.

10. The system of claim 1 wherein the control system comprises one of, a mechanical actuator control system, a pneumatic actuator control system, a hydraulic actuator control system, or an electrical actuator control system, for controlling movement of the volume reduction assembly.

11. The system of claim 10 wherein the control system comprises the mechanical actuator control system comprising one or more worm gears coupled to one or more scissor jacks.

12. The system of claim 6 wherein the plurality of blocks comprise a plurality of extendable blocks.

13. The system of claim 1 wherein the air supply assembly is configured to supply air comprising one of, ambient air or compressed air, to the door cavity, before the loading and the unloading of one or more of, the passengers and the cargo, the door cavity positioned between each of the one or more vehicle doors and each of the one or more station doors.

14. The system of claim 13 wherein the vent-to-vacuum assembly is configured to evacuate the air comprising one of, the ambient air or the compressed air, from the door cavity, after the loading and the unloading of one or more of, the passengers and the cargo.

15. The system of claim 1 further comprising one or more of, one or more pressure seals coupled to the vacuum transport tube vehicle, a first pressure barrier seal coupled to the station wall and configured to deploy in front of the vacuum transport tube vehicle, and a second pressure barrier seal coupled to the station wall and configured to deploy behind the vacuum transport tube vehicle.

* * * * *